US011924409B2

(12) United States Patent
Li et al.

(10) Patent No.: US 11,924,409 B2
(45) Date of Patent: Mar. 5, 2024

(54) SYSTEMS AND METHODS FOR INTER PREDICTION COMPENSATION

(71) Applicant: Alibaba (China) Co., Ltd., Zhejiang (CN)

(72) Inventors: Xinwei Li, Beijing (CN); Jie Chen, Beijing (CN); Ru-Ling Liao, Beijing (CN); Yan Ye, San Mateo, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 17/651,639

(22) Filed: Feb. 18, 2022

(65) Prior Publication Data

US 2022/0272323 A1 Aug. 25, 2022

Related U.S. Application Data

(60) Provisional application No. 63/160,774, filed on Mar. 13, 2021, provisional application No. 63/151,786, filed on Feb. 21, 2021.

(51) Int. Cl.

| | |
|---|---|
| ***H04N 19/105*** | (2014.01) |
| ***H04N 19/132*** | (2014.01) |
| ***H04N 19/159*** | (2014.01) |
| ***H04N 19/176*** | (2014.01) |

(52) U.S. Cl.

CPC ......... *H04N 19/105* (2014.11); *H04N 19/132* (2014.11); *H04N 19/159* (2014.11); *H04N 19/176* (2014.11)

(58) Field of Classification Search

None

See application file for complete search history.

(56) References Cited

U.S. PATENT DOCUMENTS

| | | | | |
|---|---|---|---|---|
| 2019/0320167 | A1 | 10/2019 | Abe et al. | |
| 2020/0228796 | A1 | 7/2020 | Seregin et al. | |
| 2020/0344482 | A1 | 10/2020 | Zhang et al. | |
| 2021/0051345 | A1* | 2/2021 | Tsai | H04N 19/159 |

(Continued)

FOREIGN PATENT DOCUMENTS

| | | | |
|---|---|---|---|
| EP | 3706423 | A1 | 9/2020 |
| WO | WO2020149770 | A1 | 7/2020 |
| WO | WO2020192717 | A1 | 10/2020 |

OTHER PUBLICATIONS

PCT International Search Report and Written Opinion dated May 11, 2022, issued in corresponding International Application No. PCT/CN2022/077047 (6 pgs.).

*Primary Examiner* — Chikaodili E Anyikire

(74) *Attorney, Agent, or Firm* — Finnegan, Henderson, Farabow, Garrett & Dunner, LLP

(57) ABSTRACT

A video processing method includes: determining whether an inter predictor correction is enabled for a coding block; and when the inter predictor correction is enabled for the coding block, performing the inter predictor correction by: obtaining a plurality of predicted samples from a top boundary and a left boundary of a predicted block corresponding to the coding block; obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block.

17 Claims, 25 Drawing Sheets

2400

START

2410 Is local luma compensation enabled? N / Y 2422 determining sample position restriction values 2424 obtaining predicted luma samples and reconstructed luma samples 2426 deriving model parameters for the local luma compensation 2428 applying the local luma compensation

END

(56) References Cited

U.S. PATENT DOCUMENTS

2021/0377517 A1* 12/2021 Chen .................... H04N 19/105
2022/0038711 A1* 2/2022 Leleannec ............ H04N 19/102
2022/0094940 A1* 3/2022 Bandyopadhyay .. H04N 19/132
2022/0124343 A1* 4/2022 Filippov ................ H04N 19/51
2022/0159277 A1* 5/2022 Urban .................. H04N 19/132

* cited by examiner 1210
1220
1230
1240
1250
1260
1270

| 2011 | 2012 | 2013 | 2014 |
|---|---|---|---|
| 2021 | 2022 | 2023 | 2024 |
| 2031 | 2032 | 2033 | 2034 |
| 2041 | 2042 | 2043 | 2044 |

FIG. 20

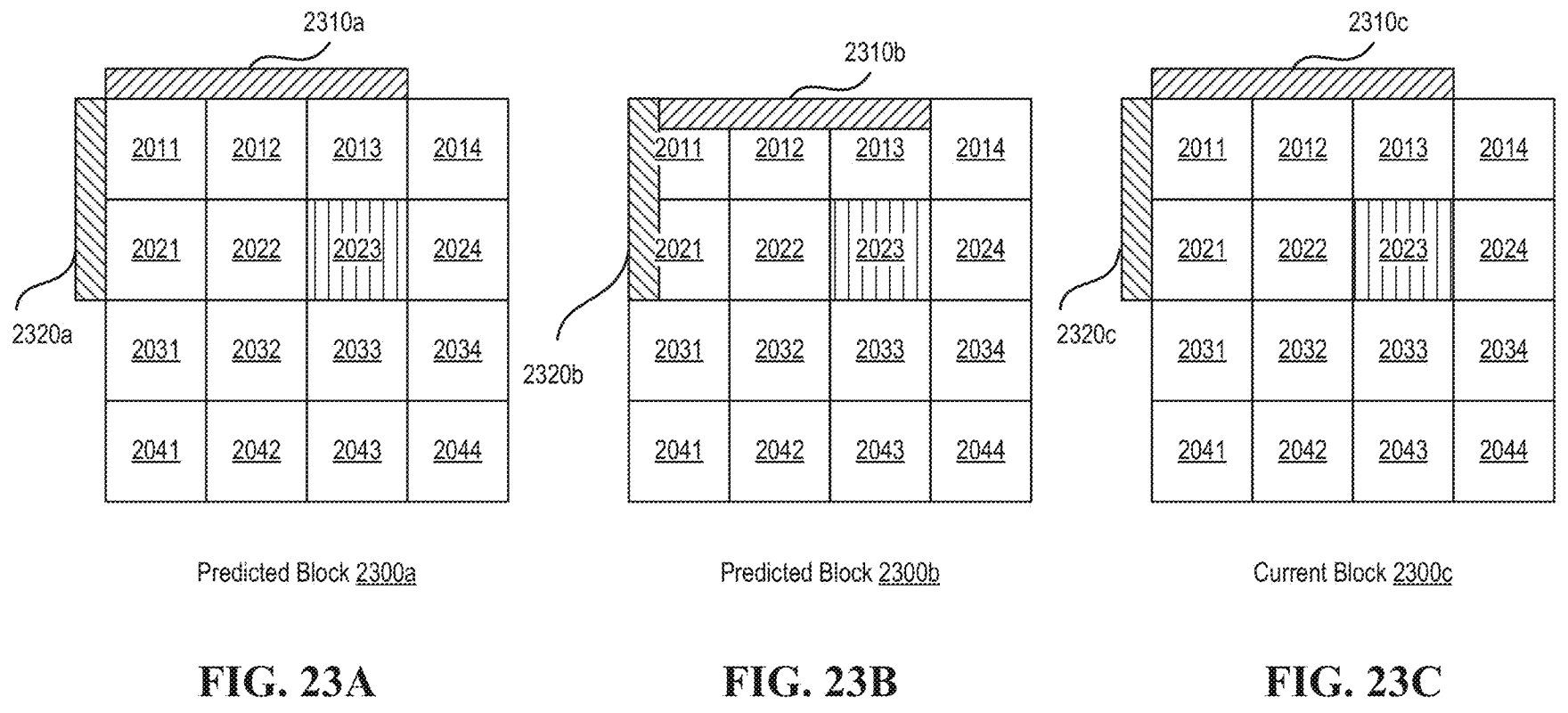

2310a
2320a
2011 2012 2013 2014
2021 2022 2023 2024
2031 2032 2033 2034
2041 2042 2043 2044
Predicted Block 2300a

FIG. 23A 2310b
2320b
2011 2012 2013 2014
2021 2022 2023 2024
2031 2032 2033 2034
2041 2042 2043 2044
Predicted Block 2300b

FIG. 23B 2310c
2320c
2011 2012 2013 2014
2021 2022 2023 2024
2031 2032 2033 2034
2041 2042 2043 2044
Current Block 2300c

FIG. 23C

SYSTEMS AND METHODS FOR INTER PREDICTION COMPENSATION

CROSS-REFERENCE TO RELATED APPLICATIONS

This application is based upon and claims priority to U.S. Provisional Patent Application No. 63/151,786, filed Feb. 21, 2021, and entitled "SYSTEMS AND METHODS FOR INTER PREDICTION COMPENSATION," and U.S. Provisional Patent Application No. 63/160,774, filed Mar. 13, 2021, and entitled "SYSTEMS AND METHODS FOR INTER PREDICTION COMPENSATION," which are incorporated herein by reference in their entireties.

TECHNICAL FIELD

The present disclosure generally relates to video processing, and more particularly, to systems and methods for inter prediction compensation.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE PRESENT DISCLOSURE

Embodiments of the present disclosure provide methods and apparatus for video processing. In some exemplary embodiments, a computer-implemented method for video processing is provided. The video processing method includes: determining whether an inter predictor correction is enabled for a coding block; and when the inter predictor correction is enabled for the coding block, performing the inter predictor correction by: obtaining a plurality of predicted samples from a top boundary and a left boundary of a predicted block corresponding to the coding block; obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block.

In some exemplary embodiments, an apparatus is provided. The apparatus includes: a memory configured to store instructions; and a processor coupled to the memory and configured to execute the instructions to cause the apparatus to: determine whether an inter predictor correction is enabled for a coding block; and when the inter predictor correction is enabled for the coding block, perform the inter predictor correction by: obtaining a plurality of predicted samples from a top boundary and a left boundary of a predicted block corresponding to the coding block; obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block.

In some exemplary embodiments, a non-transitory computer-readable storage medium is provided. In some embodiments, the non-transitory computer-readable storage medium stores a set of instructions that are executable by one or more processors of a device to cause the device to perform the video processing method mentioned above.

BRIEF DESCRIPTION OF THE DRAWINGS

Embodiments and various aspects of the present disclosure are illustrated in the following detailed description and the accompanying figures. Various features shown in the figures are not drawn to scale.

FIG. 12 is a schematic diagram illustrating seven different weight arrays in the AWP mode, consistent with some embodiments of the present disclosure.

FIG. 20 is a schematic diagram illustrating subblock level inter prediction, consistent with some embodiments of the present disclosure.

FIGS. 23A-23C are schematic diagrams illustrating samples to derive LIC model parameters, consistent with some embodiments of the present disclosure.

DETAILED DESCRIPTION

Figure 1:
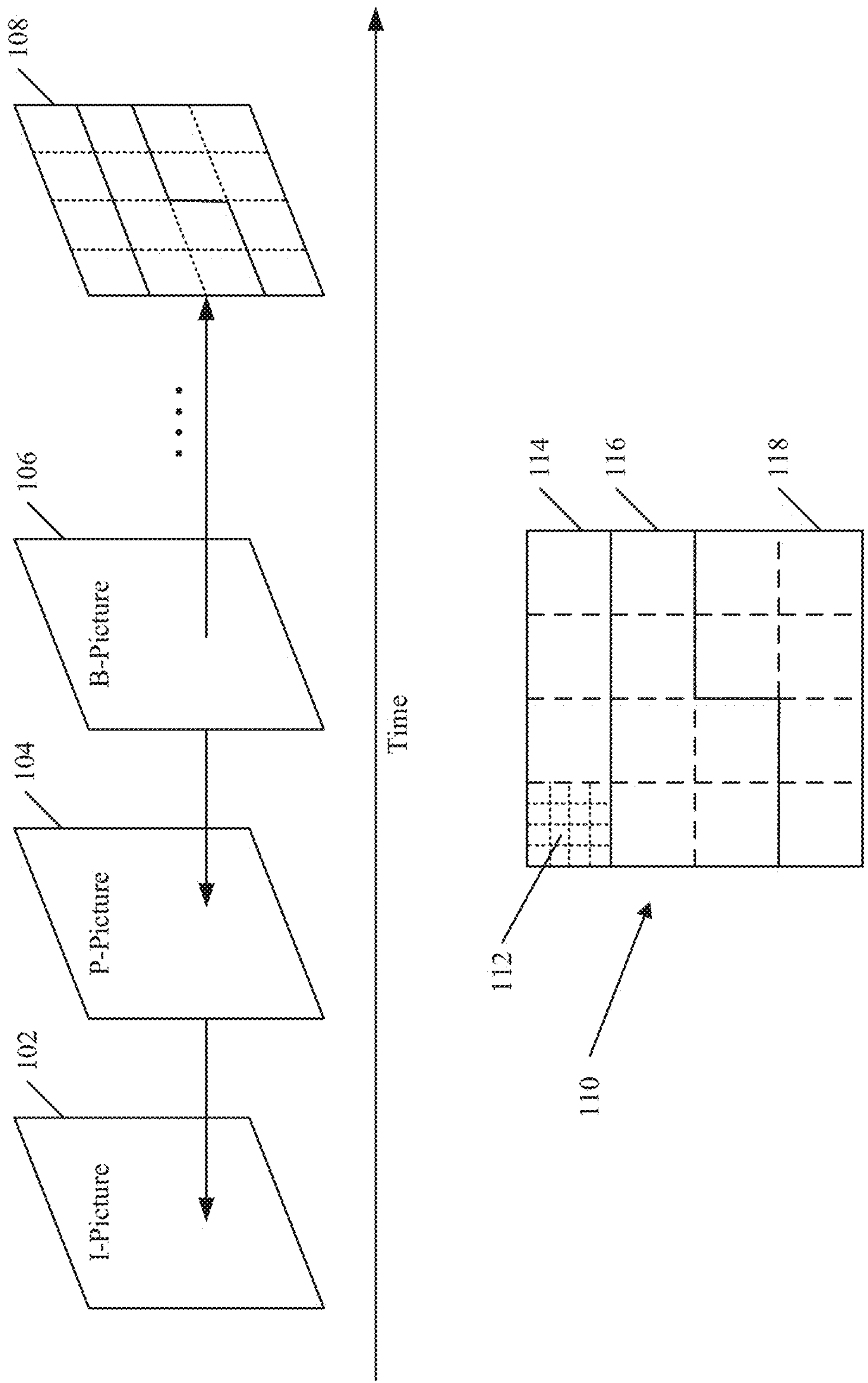
FIG. 1 illustrates structures of an exemplary video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Audio Video Coding Standard (AVS) Workgroup is a standard setting organization for the AVS family of video standards. AVS Workgroup is developing the AVS3 video standard, the third generation of the AVS family of video standards. The predecessor of AVS3, AVS1 and AVS2, were issued in 2006 and 2016, respectively. AVS3 standard is based on the same hybrid video coding system that has been used in modern video compression standards such as AVS1, AVS2, H.264/AVC, H.265/HEVC, etc.

High Performance Model (HPM) was chosen by the AVS Workgroup as a new reference software platform for AVS3 standard development. The initial technologies in the HPM were inherited from the AVS2 standard, which were then modified and augmented with new advanced video coding technologies to improve the compression performance. The coding performance of the finalized first phase of AVS3 was improved by over 20%, compared with its predecessor AVS2. AVS is continuing to include coding technologies that improve compression performance, and the second phase of AVS3 standard is being developed on top of the first phase of AVS3 to improve the coding efficiency.

A video is a set of static pictures (or frames) arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module or circuitry for compression is generally referred to as an "encoder," and the module or circuitry for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors ("DSPs"), application-specific integrated circuits ("ASICs"), field-programmable gate arrays ("FPGAs"), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, AVS standard, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

In the present disclosure, a simplified local luma compensation (LIC) process can be applied for the encoder and the decoder for the inter prediction process during the encoding or decoding of the video. In the simplified local luma compensation, the samples used for LIC model parameter derivation are restricted according to the positions of the samples, in order to reduce the memory required for storing the unrefined predicted samples and reduce the pipeline latency for LIC operations. In some embodiments, a local chroma compensation (LCC) process can be applied to extend the compensation to chroma components of the coding block, to compensate the chrominance changes between the current block and the predicted block for the inter prediction process. As both LIC and LCC are applied on the inter predicted block to further correct the predicted sample values by compensating luminance or chrominance changes between the current block and the predicted block, LIC and LCC are also called inter predictor correction in the present disclosure.

FIG. 1 illustrates structures of an exemplary video sequence, consistent with some embodiments of the present disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider. As shown in FIG. 1, video sequence 100 can include a series of pictures arranged temporally along a timeline, including pictures 102, 104, 106, and 108. Pictures 102-106 are continuous, and there are more pictures between pictures 106 and 108.

When a video is being compressed or decompressed, useful information of a picture being encoded (referred to as a "current picture") include changes with respect to a reference picture (e.g., a picture previously encoded and reconstructed). Such changes can include position changes, luminosity changes, or color changes of the pixels. For example, position changes of a group of pixels can reflect the motion of an object represented by these pixels between two pictures (e.g., the reference picture and the current picture).

For example, as shown in FIG. 1, picture 102 is an I-picture, using itself as the reference picture. Picture 104 is a P-picture, using picture 102 as its reference picture, as indicated by the arrow. Picture 106 is a B-picture, using pictures 104 and 108 as its reference pictures, as indicated by the arrows. In some embodiments, the reference picture of a picture may be or may be not immediately preceding or following the picture. For example, the reference picture of picture 104 can be a picture preceding picture 102, i.e., a picture not immediately preceding picture 104. The above-described reference pictures of pictures 102-106 shown in FIG. 1 are merely examples, and not meant to limit the present disclosure.

Due to the computing complexity, in some embodiments, video codecs can split a picture into multiple basic segments and encode or decode the picture segment by segment. That is, video codecs do not necessarily encode or decode an entire picture at one time. Such basic segments are referred to as basic processing units ("BPUs") in the present disclosure. For example, FIG. 1 also shows an exemplary structure 110 of a picture of video sequence 100 (e.g., any of pictures 102-108). For example, structure 110 may be used to divide picture 108. As shown in FIG. 1, picture 108 is divided into 4×4 basic processing units. In some embodiments, the basic processing units can be referred to as "coding tree units" ("CTUs") in some video coding standards (e.g., AVS3, H.265/HEVC or H.266/VVC), or as "macroblocks" in some video coding standards (e.g., MPEG family, H.261, H.263, or H.264/AVC). In AVS3, a CTU can be the largest block unit, and can be as large as 128×128 luma samples (plus the corresponding chroma samples depending on the chroma format).

The basic processing units in FIG. 1 is for illustrative purpose only. The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards. Operations performed to a basic processing unit can be repeatedly performed to its luma and chroma components.

During multiple stages of operations in video coding, the size of the basic processing units may still be too large for processing, and thus can be further partitioned into segments referred to as "basic processing sub-units" in the present disclosure. For example, at a mode decision stage, the encoder can split the basic processing unit into multiple basic processing sub-units and decide a prediction type for each individual basic processing sub-unit. As shown in FIG. 1, basic processing unit 112 in structure 110 is further partitioned into 4×4 basic processing sub-units. For example, in AVS3, a CTU may be further partitioned into coding units (CUs) using quad-tree, binary tree, or extended binary tree. The basic processing sub-units in FIG. 1 is for illustrative purpose only. Different basic processing units of the same picture can be partitioned into basic processing sub-units in different schemes. The basic processing sub-units can be referred to as "coding units" ("CUs") in some video coding standards (e.g., AVS3, H.265/HEVC or H.266/VVC), or as "blocks" in some video coding standards (e.g., MPEG family, H.261, H.263, or H.264/AVC). The size of a basic processing sub-unit can be the same or smaller than the size of a basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Operations performed to a basic processing sub-unit can be repeatedly performed to its luma and chroma components. Such division can be performed to further levels depending on processing needs, and in different stages, the basic processing units can be partitioned using different schemes. At the leaf nodes of the partitioning structure, coding information such as coding mode (e.g., intra prediction mode or inter prediction mode), motion information (e.g., reference index, motion vectors (MVs), etc.) required for corresponding coding mode, and quantized residual coefficients are sent.

In some cases, a basic processing sub-unit can still be too large to process in some stages of operations in video coding, such as a prediction stage or a transform stage. Accordingly, the encoder can further split the basic processing sub-unit into smaller segments (e.g., referred to as "prediction blocks" or "PBs"), at the level of which a prediction operation can be performed. Similarly, the encoder can further split the basic processing sub-unit into smaller segments (e.g., referred to as "transform blocks" or "TBs"), at the level of which a transform operation can be performed. The division schemes of the same basic processing sub-unit can be different at the prediction stage and the transform stage. For example, the prediction blocks (PBs) and transform blocks (TBs) of the same CU can have different sizes and numbers. Operations in the mode decision stage, the prediction stage, the transform stage will be detailed in later paragraphs with examples provided in FIG. 2 and FIG. 3.

Figure 2:
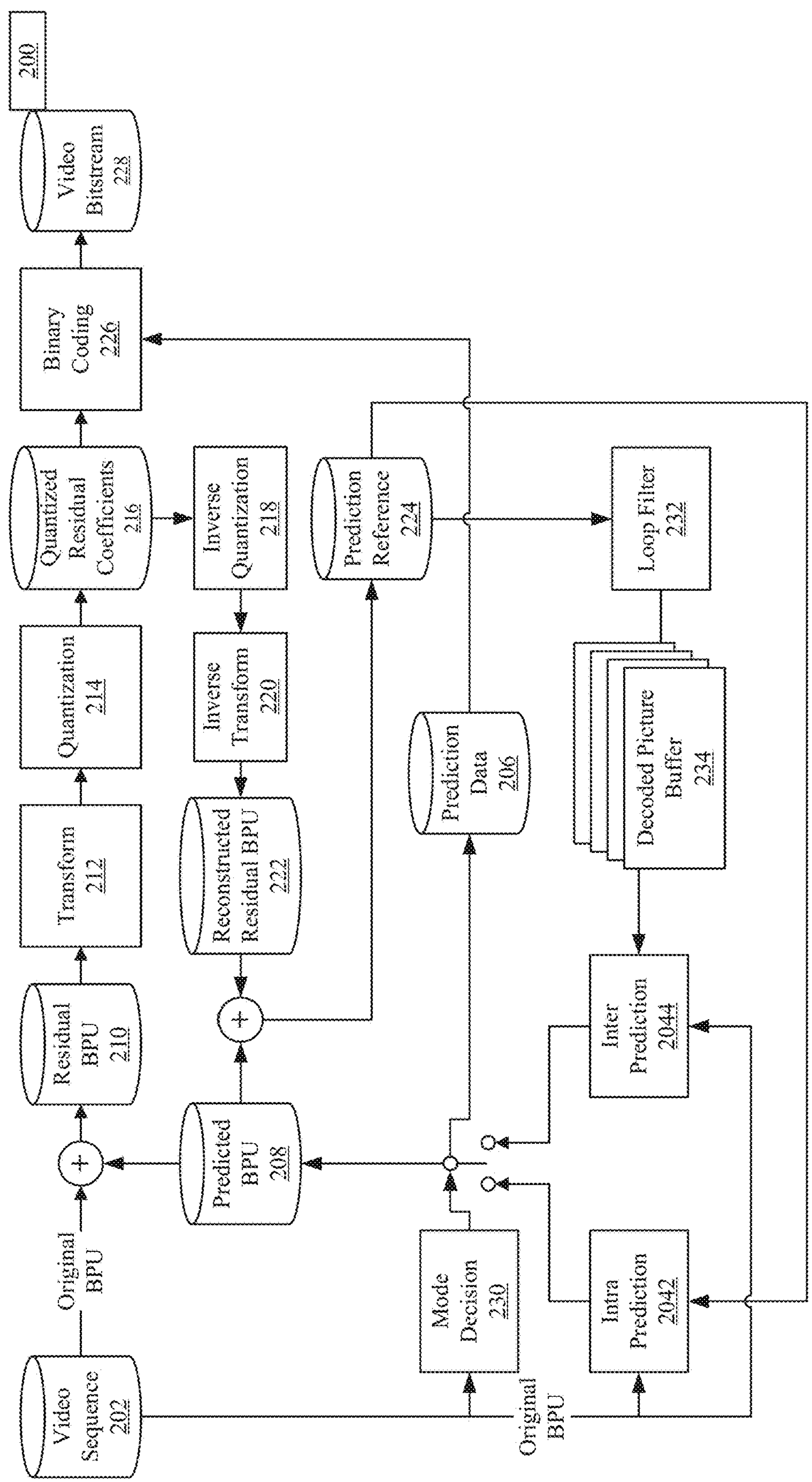
FIG. 2 is a schematic diagram of an exemplary encoder of a video coding system, consistent with some embodiments of the present disclosure.

FIG. 2 illustrates a schematic diagram of an exemplary encoder 200 of a video coding system, (e.g., AVS3 or H.26x series), consistent with some embodiments of the present disclosure. The input video is processed block by block. As discussed above, in the AVS3 standard, a CTU is the largest block unit and can be as large as 128×128 luma samples (plus the corresponding chroma samples depending on the chroma format). One CTU may be further partitioned into CUs using quad-tree, binary tree, or ternary tree. Referring to FIG. 2, encoder 200 can receive video sequence 202 generated by a video capturing device (e.g., a camera). The term "receive" used herein can refer to receiving, inputting, acquiring, retrieving, obtaining, reading, accessing, or any action in any manner for inputting data. Encoder 200 can encode video sequence 202 into video bitstream 228. Similar to video sequence 100 in FIG. 1, video sequence 202 can include a set of pictures (referred to as "original pictures") arranged in a temporal order. Similar to structure 110 in FIG. 1, any original picture of video sequence 202 can be divided by encoder 200 into basic processing units, basic processing sub-units, or regions for processing. In some embodiments, encoder 200 can perform process at the level of basic processing units for original pictures of video sequence 202. For example, encoder 200 can perform process in FIG. 2 in an iterative manner, in which encoder 200 can encode a basic processing unit in one iteration of process. In some embodiments, encoder 200 can perform process in parallel for regions (e.g., slices 114-118 in FIG. 1) of original pictures of video sequence 202.

Components 202, 2042, 2044, 206, 208, 210, 212, 214, 216, 226, and 228 can be referred to as a "forward path." In FIG. 2, encoder 200 can feed a basic processing unit (referred to as an "original BPU") of an original picture of video sequence 202 to two prediction stages, intra prediction (also known as an "intra-picture prediction" or "spatial prediction") stage 2042 and inter prediction (also known as an "inter-picture prediction," "motion compensation," "motion compensated prediction" or "temporal prediction") stage 2044 to perform a prediction operation and generate corresponding prediction data 206 and predicted BPU 208. Particularly, encoder 200 can receive the original BPU and prediction reference 224, which can be generated from the reconstruction path of the previous iteration of process.

The purpose of intra prediction stage 2042 and inter prediction stage 2044 is to reduce information redundancy by extracting prediction data 206 that can be used to reconstruct the original BPU as predicted BPU 208 from prediction data 206 and prediction reference 224. In some embodiments, an intra prediction can use pixels from one or more already coded neighboring BPUs in the same picture to predict the current BPU. That is, prediction reference 224 in the intra prediction can include the neighboring BPUs, so that spatial neighboring samples can be used to predict the current block. The intra prediction can reduce the inherent spatial redundancy of the picture.

In some embodiments, an inter prediction can use regions from one or more already coded pictures ("reference pictures") to predict the current BPU. That is, prediction reference 224 in the inter prediction can include the coded pictures. The inter prediction can reduce the inherent temporal redundancy of the pictures.

In the forward path, encoder 200 performs the prediction operation at intra prediction stage 2042 and inter prediction stage 2044. For example, at intra prediction stage 2042, encoder 200 can perform the intra prediction. For an original BPU of a picture being encoded, prediction reference 224 can include one or more neighboring BPUs that have been encoded (in the forward path) and reconstructed (in the reconstructed path) in the same picture. Encoder 200 can generate predicted BPU 208 by extrapolating the neighboring BPUs. The extrapolation technique can include, for example, a linear extrapolation or interpolation, a polynomial extrapolation or interpolation, or the like. In some embodiments, encoder 200 can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at inter prediction stage 2042, encoder 200 can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, encoder 200 can add reconstructed residual BPU 222 to predicted BPU 208 to generate a reconstructed BPU. When all reconstructed BPUs of the same picture are generated, encoder 200 can generate a reconstructed picture as a reference picture. Encoder 200 can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When encoder 200 identifies (e.g., by using a pel-recursive algorithm, a block-matching algorithm, or the like) a region similar to the original BPU in the search window, encoder 200 can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. Encoder 200 can record the direction and distance of such a motion as a "motion vector (MV)." In other words, MV is the position difference between the reference block in the reference picture and the current block in the current picture. In inter prediction, the reference block is used as the predictor for the current block, so the reference block is also called predicted block. When multiple reference pictures are used (e.g., as picture 106 in FIG. 1), encoder 200 can search for a matching region and determine its associated MV for each reference picture. In some embodiments, encoder 200 can assign weights to pixel values of the matching regions of respective matching reference pictures.

The motion estimation can be used to identify various types of motions, such as, for example, translations, rotations, zooming, or the like. For inter prediction, prediction data 206 can include, for example, reference index, locations (e.g., coordinates) of the matching region, MVs associated with the matching region, number of reference pictures, weights associated with the reference pictures, or other motion information.

For generating predicted BPU 208, encoder 200 can perform an operation of "motion compensation." The motion compensation can be used to reconstruct predicted BPU 208 based on prediction data 206 (e.g., the MV) and prediction reference 224. For example, encoder 200 can move the matching region of the reference picture according to the MV, in which encoder 200 can predict the original BPU of the current picture. When multiple reference pictures are used (e.g., as picture 106 in FIG. 1), encoder 200 can move the matching regions of the reference pictures according to the respective MVs and average pixel values of the matching regions. In some embodiments, if encoder 200 has assigned weights to pixel values of the matching regions of respective matching reference pictures, encoder 200 can add a weighted sum of the pixel values of the moved matching regions.

In some embodiments, the inter prediction can utilize uni-prediction or bi-prediction and be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. In uni-prediction, only one MV pointing to one reference picture is used to generate the prediction signal for the current block.

On the other hand, bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at opposite temporal directions with respect to picture 104. In bi-prediction, two MVs, each pointing to its own reference picture, are used to generate the prediction signal of the current block. After video bitstream 228 is generated, MVs and reference indices can be sent in video bitstream 228 to a decoder, to identify where the prediction signal(s) of the current block come from.

For inter-predicted CUs, motion parameters may include MVs, reference picture indices and reference picture list usage index, or other additional information needed for coding features to be used. Motion parameters can be signaled in an explicit or implicit manner. In AVS3, under some specific inter coding modes, such as a skip mode or a direct mode, motion parameters (e.g., MV difference and reference picture index) are not coded and signaled in video bitstream 228. Instead, the motion parameters can be derived at the decoder side with the same rule as defined in encoder 200. Details of the skip mode and the direct mode will be discussed in the paragraphs below.

After intra prediction stage 2042 and inter prediction stage 2044, at mode decision stage 230, encoder 200 can select a prediction mode (e.g., one of the intra prediction or the inter prediction) for the current iteration of process. For example, encoder 200 can perform a rate-distortion optimization method, in which encoder 200 can select a prediction mode to minimize a value of a cost function depending on a bit rate of a candidate prediction mode and distortion of the reconstructed reference picture under the candidate prediction mode. Depending on the selected prediction mode, encoder 200 can generate the corresponding predicted BPU 208 (e.g., a prediction block) and prediction data 206.

In some embodiments, predicted BPU 208 can be identical to the original BPU. However, due to non-ideal prediction and reconstruction operations, predicted BPU 208 is generally slightly different from the original BPU. For recording such differences, after generating predicted BPU 208, encoder 200 can subtract it from the original BPU to generate residual BPU 210, which is also called a prediction residual.

For example, encoder 200 can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

After residual BPU 210 is generated, encoder 200 can feed residual BPU 210 to transform stage 212 and quantization stage 214 to generate quantized residual coefficients 216. To further compress residual BPU 210, at transform stage 212, encoder 200 can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, encoder 200 can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, encoder 200 and a corresponding decoder (e.g., decoder 300 in FIG. 3) can use the same transform algorithm (thus the same base patterns). Thus, encoder 200 can record only the transform coefficients, from which decoder 300 can reconstruct residual BPU 210 without receiving the base patterns from encoder 200. Compared with residual BPU 210, the transform coefficients can have fewer bits, but they can be used to reconstruct residual BPU 210 without significant quality deterioration. Thus, residual BPU 210 is further compressed.

Encoder 200 can further compress the transform coefficients at quantization stage 214. In the transform process, different base patterns can represent different variation frequencies (e.g., brightness variation frequencies). Because human eyes are generally better at recognizing low-frequency variation, encoder 200 can disregard information of high-frequency variation without causing significant quality deterioration in decoding. For example, at quantization stage 214, encoder 200 can generate quantized residual coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. Encoder 200 can disregard the zero-value quantized residual coefficients 216, by which the transform coefficients are further compressed. The quantization process is also invertible, in which quantized residual coefficients 216 can be reconstructed to the transform coefficients in an inverse operation of the quantization (referred to as "inverse quantization").

Because encoder 200 disregards the remainders of such divisions in the rounding operation, quantization stage 214 can be lossy. Typically, quantization stage 214 can contribute the most information loss in the encoding process. The larger the information loss is, the fewer bits the quantized residual coefficients 216 can need. For obtaining different levels of information loss, encoder 200 can use different values of the quantization parameter or any other parameter of the quantization process.

Encoder 200 can feed prediction data 206 and quantized residual coefficients 216 to binary coding stage 226 to generate video bitstream 228 to complete the forward path. At binary coding stage 226, encoder 200 can encode prediction data 206 and quantized residual coefficients 216 using a binary coding technique, such as, for example, entropy coding, variable length coding, arithmetic coding, Huffman coding, context-adaptive binary arithmetic coding (CABAC), or any other lossless or lossy compression algorithm.

For example, the encoding process of CABAC in binary coding stage 226 may include a binarization step, a context modeling step, and a binary arithmetic coding step. If the syntax element is not binary, encoder 200 first maps the syntax element to a binary sequence. Encoder 200 may select a context coding mode or a bypass coding mode for coding. In some embodiments, for context coding mode, the probability model of the bin to be encoded is selected by the "context", which refers to the previous encoded syntax elements. Then the bin and the selected context model is passed to an arithmetic coding engine, which encodes the bin and updates the corresponding probability distribution of the context model. In some embodiments, for the bypass coding mode, without selecting the probability model by the "context," bins are encoded with a fixed probability (e.g., a probability equal to 0.5). In some embodiments, the bypass coding mode is selected for specific bins in order to speed up the entropy coding process with negligible loss of coding efficiency.

In some embodiments, in addition to prediction data 206 and quantized residual coefficients 216, encoder 200 can encode other information at binary coding stage 226, such as, for example, the prediction mode selected at the prediction stage (e.g., intra prediction stage 2042 or inter prediction stage 2044), parameters of the prediction operation (e.g., intra prediction mode, motion information, etc.), a transform type at transform stage 212, parameters of the quantization process (e.g., quantization parameters), an encoder control parameter (e.g., a bitrate control parameter), or the like. That is, coding information can be sent to binary coding stage 226 to further reduce the bit rate before being packed into video bitstream 228. Encoder 200 can use the output data of binary coding stage 226 to generate video bitstream 228. In some embodiments, video bitstream 228 can be further packetized for network transmission.

Components 218, 220, 222, 224, 232, and 234 can be referred to as a "reconstruction path." The reconstruction path can be used to ensure that both encoder 200 and its corresponding decoder (e.g., decoder 300 in FIG. 3) use the same reference data for prediction.

During the process, after quantization stage 214, encoder 200 can feed quantized residual coefficients 216 to inverse quantization stage 218 and inverse transform stage 220 to generate reconstructed residual BPU 222. At inverse quantization stage 218, encoder 200 can perform inverse quantization on quantized residual coefficients 216 to generate reconstructed transform coefficients. At inverse transform stage 220, encoder 200 can generate reconstructed residual BPU 222 based on the reconstructed transform coefficients. Encoder 200 can add reconstructed residual BPU 222 to predicted BPU 208 to generate prediction reference 224 to be used in prediction stages 2042, 2044 for the next iteration of process.

In the reconstruction path, if intra prediction mode has been selected in the forward path, after generating prediction reference 224 (e.g., the current BPU that has been encoded and reconstructed in the current picture), encoder 200 can directly feed prediction reference 224 to intra prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), encoder 200 can feed prediction reference 224 to loop filter stage 232, at which encoder 200 can apply a loop filter to prediction reference 224 to reduce or eliminate distortion (e.g., blocking artifacts) introduced by the inter prediction. Encoder 200 can apply various loop filter techniques at loop filter stage 232, such as, for example, deblocking, sample adaptive offsets (SAO), adaptive loop filters (ALF), or the like. In SAO, a nonlinear amplitude mapping is introduced within the inter prediction loop after the deblocking filter to reconstruct the original signal amplitudes with a look-up table that is described by a few additional parameters determined by histogram analysis at the encoder side.

The loop-filtered reference picture can be stored in buffer 234 (or "decoded picture buffer") for later use (e.g., to be used as an inter-prediction reference picture for a future picture of video sequence 202). Encoder 200 can store one or more reference pictures in buffer 234 to be used at inter prediction stage 2044. In some embodiments, encoder 200 can encode parameters of the loop filter (e.g., a loop filter strength) at binary coding stage 226, along with quantized residual coefficients 216, prediction data 206, and other information.

Encoder 200 can perform the process discussed above iteratively to encode each original BPU of the original picture (in the forward path) and generate prediction reference 224 for encoding the next original BPU of the original picture (in the reconstruction path). After encoding all original BPUs of the original picture, encoder 200 can proceed to encode the next picture in video sequence 202.

It should be noted that other variations of the encoding process can be used to encode video sequence 202. In some embodiments, stages of process can be performed by encoder 200 in different orders. In some embodiments, one or more stages of the encoding process can be combined into a single stage. In some embodiments, a single stage of the encoding process can be divided into multiple stages. For example, transform stage 212 and quantization stage 214 can be combined into a single stage. In some embodiments, the encoding process can include additional stages that are not shown in FIG. 2. In some embodiments, the encoding process can omit one or more stages in FIG. 2.

For example, in some embodiments, encoder 200 can be operated in a transform skipping mode. In the transform skipping mode, transform stage 212 is bypassed and a transform skip flag is signaled for the TB. This may improve compression for some types of video content such as computer-generated images or graphics mixed with camera-view content (e.g., scrolling text). In addition, encoder 200 can also be operated in a lossless mode. In the lossless mode, transform stage 212, quantization stage 214, and other processing that affects the decoded picture (e.g., SAO and deblocking filters) are bypassed. The residual signal from the intra prediction stage 2042 or inter prediction stage 2044 is fed into binary coding stage 226, using the same neighborhood contexts applied to the quantized transform coefficients. This allows mathematically lossless reconstruction. Therefore, both transform and transform skip residual coefficients are coded within non-overlapped CGs. That is, each CG may include one or more transform residual coefficients, or one or more transform skip residual coefficients.

Figure 3:
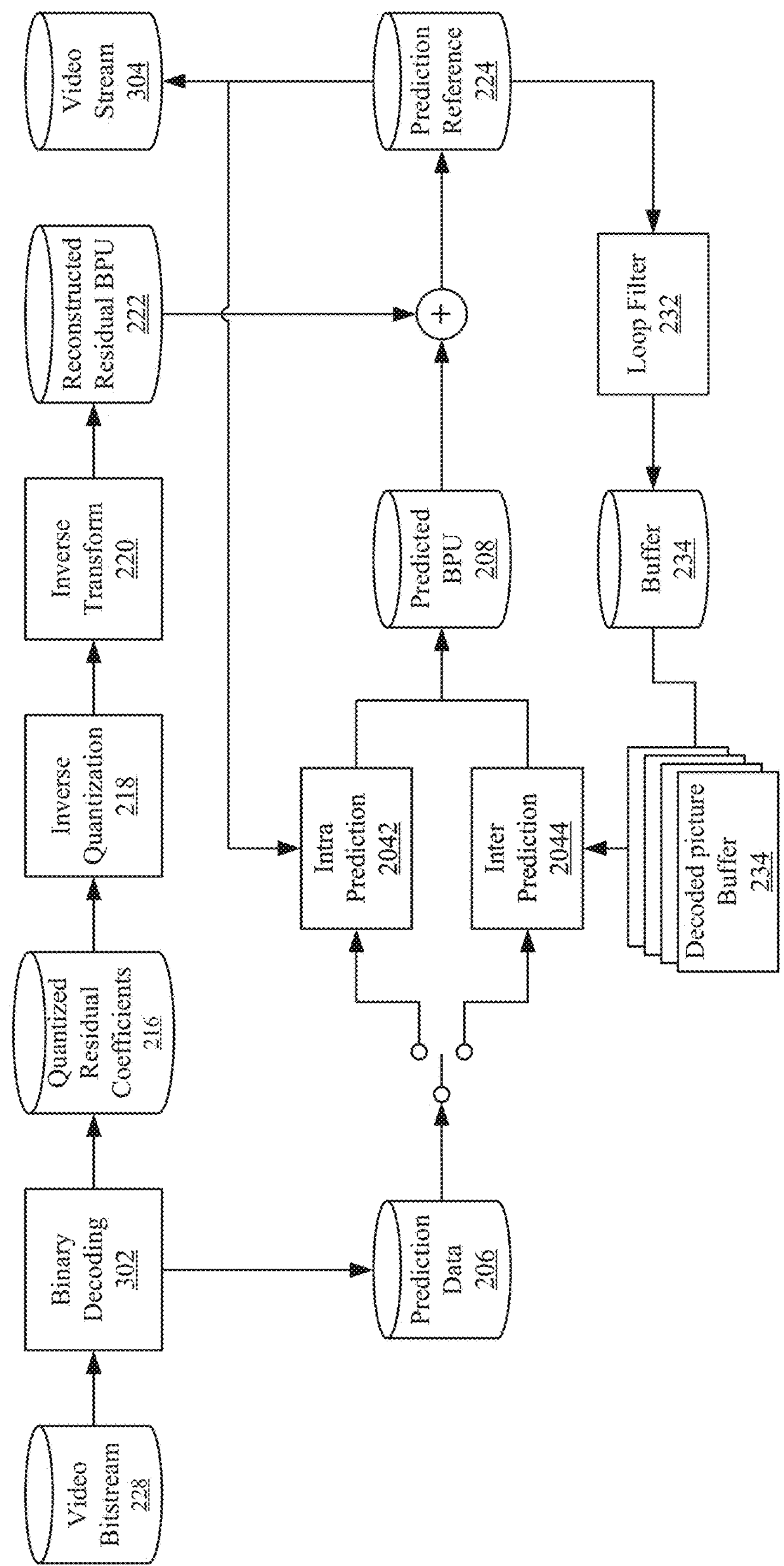
FIG. 3 is a block diagram of an exemplary decoder of a video coding system, consistent with some embodiments of the present disclosure.

FIG. 3 illustrates a block diagram of an exemplary decoder 300 of a video coding system (e.g., AVS3 or H.26x series), consistent with some embodiments of the present disclosure. Decoder 300 can perform a decompression process corresponding to the compression process in FIG. 2. The corresponding stages in the compression process and decompression process are labeled with the same numbers in FIG. 2 and FIG. 3.

In some embodiments, the decompression process can be similar to the reconstruction path in FIG. 2. Decoder 300 can decode video bitstream 228 into video stream 304 accordingly. Video stream 304 can be very similar to video sequence 202 in FIG. 2. However, due to the information loss in the compression and decompression process (e.g., quantization stage 214 in FIG. 2), video stream 304 may be not identical to video sequence 202. Similar to encoder 200 in FIG. 2, decoder 300 can perform the decoding process at the level of basic processing units (BPUs) for each picture encoded in video bitstream 228. For example, decoder 300 can perform the process in an iterative manner, in which decoder 300 can decode a basic processing unit in one iteration. In some embodiments, decoder 300 can perform the decoding process in parallel for regions (e.g., slices 114-118) of each picture encoded in video bitstream 228.

In FIG. 3, decoder 300 can feed a portion of video bitstream 228 associated with a basic processing unit (referred to as an "encoded BPU") of an encoded picture to binary decoding stage 302. At binary decoding stage 302, decoder 300 can unpack and decode video bitstream into prediction data 206 and quantized residual coefficients 216. Decoder 300 can use prediction data 206 and quantized residual coefficients to reconstruct video stream 304 corresponding to video bitstream 228.

Decoder 300 can perform an inverse operation of the binary coding technique used by encoder 200 (e.g., entropy coding, variable length coding, arithmetic coding, Huffman coding, context-adaptive binary arithmetic coding, or any other lossless compression algorithm) at binary decoding stage 302. In some embodiments, in addition to prediction data 206 and quantized residual coefficients 216, decoder 300 can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, decoder 300 can depacketize video bitstream 228 before feeding it to binary decoding stage 302.

Decoder 300 can feed quantized residual coefficients 216 to inverse quantization stage 218 and inverse transform stage 220 to generate reconstructed residual BPU 222. Decoder 300 can feed prediction data 206 to intra prediction stage 2042 and inter prediction stage 2044 to generate predicted BPU 208. Particularly, for an encoded basic processing unit (referred to as a "current BPU") of an encoded picture (referred to as a "current picture") that is being decoded, prediction data 206 decoded from binary decoding stage 302 by decoder 300 can include various types of data, depending on what prediction mode was used to encode the current BPU by encoder 200. For example, if intra prediction was used by encoder 200 to encode the current BPU, prediction data 206 can include coding information such as a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by encoder 200 to encode the current BPU, prediction data 206 can include coding information such as a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more MVs respectively associated with the matching regions, or the like.

Accordingly, the prediction mode indicator can be used to select whether inter or intra prediction module will be invoked. Then, parameters of the corresponding prediction operation can be sent to the corresponding prediction module to generate the prediction signal(s). Particularly, based on the prediction mode indicator, decoder 300 can decide whether to perform an intra prediction at intra prediction stage 2042 or an inter prediction at inter prediction stage 2044. The details of performing such intra prediction or inter prediction are described in FIG. 2 and will not be repeated hereinafter. After performing such intra prediction or inter prediction, decoder 300 can generate predicted BPU 208.

After predicted BPU 208 is generated, decoder 300 can add reconstructed residual BPU 222 to predicted BPU 208 to generate prediction reference 224. In some embodiments, prediction reference 224 can be stored in a buffer (e.g., a decoded picture buffer in a computer memory). Decoder 300 can feed prediction reference 224 to intra prediction stage 2042 and inter prediction stage 2044 for performing a prediction operation in the next iteration.

For example, if the current BPU is decoded using the intra prediction at intra prediction stage 2042, after generating prediction reference 224 (e.g., the decoded current BPU), decoder 300 can directly feed prediction reference 224 to intra prediction stage 2042 for later usage (e.g., for extrapolation of a next BPU of the current picture). If the current BPU is decoded using the inter prediction at inter prediction stage 2044, after generating prediction reference 224 (e.g., a reference picture in which all BPUs have been decoded), decoder 300 can feed prediction reference 224 to loop filter stage 232 to reduce or eliminate distortion (e.g., blocking artifacts). In addition, prediction data 206 can further include parameters of a loop filter (e.g., a loop filter strength). Accordingly, decoder 300 can apply the loop filter to prediction reference 224, in a way as described in FIG. 2. For example, loop filters such as deblocking, SAO or ALF may be applied to form the loop-filtered reference picture, which are stored in buffer 234 (e.g., a decoded picture buffer (DPB) in a computer memory) for later use (e.g., to be used at inter prediction stage 2044 for prediction of a future encoded picture of video bitstream 228). In some embodiments, reconstructed pictures from buffer 234 can also be sent to a display, such as a TV, a PC, a smartphone, or a tablet to be viewed by the end-users.

Decoder 300 can perform the decoding process iteratively to decode each encoded BPU of the encoded picture and generate prediction reference 224 for encoding the next encoded BPU of the encoded picture. After decoding all encoded BPUs of the encoded picture, decoder 300 can output the picture to video stream 304 for display and proceed to decode the next encoded picture in video bitstream 228.

Figure 4:
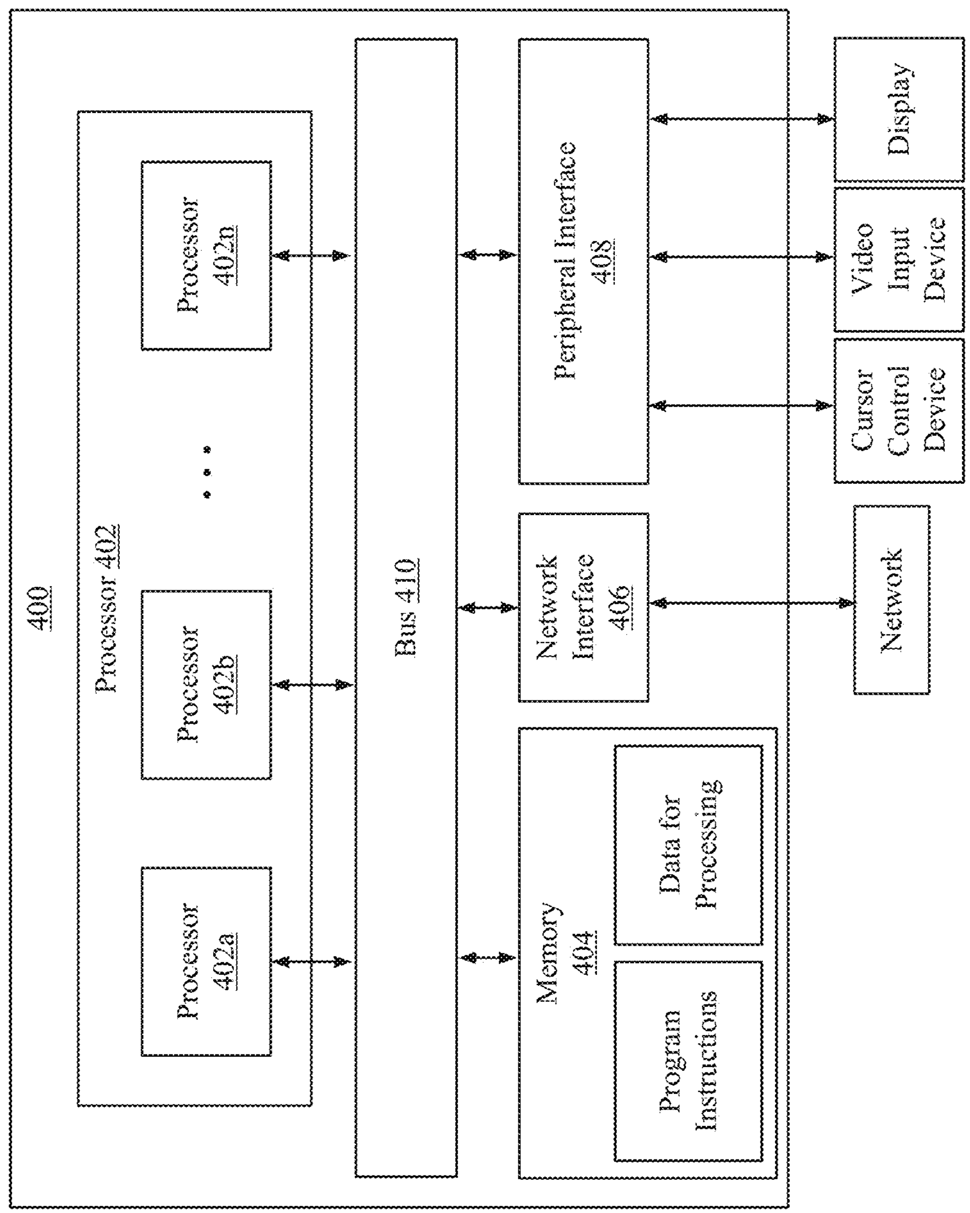
FIG. 4 is a block diagram of an exemplary apparatus for encoding or decoding a video, consistent with some embodiments of the present disclosure.

FIG. 4 is a block diagram of an exemplary apparatus 400 for encoding or decoding a video, consistent with some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 and FIG. 3) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process of encoder 200 or decoder 300) can be implemented as any combination of any software or hardware modules in apparatus 400. For example, some or all stages of process encoder 200 or decoder 300 can be implemented as one or more software modules of apparatus 400, such as program instructions that can be loaded into memory 404. For another example, some or all stages of process encoder 200 or decoder 300 can be implemented as one or more hardware modules of apparatus 400, such as a specialized data processing circuit (e.g., an FPGA, an ASIC, an NPU, or the like).

In the inter prediction stage 2044 in FIG. 2 and FIG. 3, reference index is used to indicate which previously coded picture the reference block is from. The motion vector (MV), the position difference between the reference block in the reference picture and the current block in the current picture, is used to indicate the position of the reference block in the reference picture. For bi-prediction (e.g., picture 106 in FIG. 1), two reference blocks, one from a reference picture in reference picture List 0 (e.g., picture 104) and the other from a reference picture in reference picture List 1 (e.g., picture 108) are used to generate the combined predicted block. Accordingly, two reference indices, (e.g., List 0 reference index and List 1 reference index), and two motion vectors (e.g., List 0 motion vector and List 1 motion vector) are required for bi-prediction. The motion vector is determined by the encoder and signaled to the decoder. In some embodiments, to save the signaling cost, a motion vector difference (MVD) is signaled in the bitstream instead. For a decoder, a motion vector predictor (MVP) can be derived based on the spatial and temporal neighboring block motion information, and the MV can be obtained by adding the MVD parsed from the bitstream to the MVP.

As discussed above, the video encoding or decoding process can be achieved using different modes. In some normal inter coding modes, encoder 200 can signal MV(s), corresponding reference picture index for each reference picture list and reference picture list usage flag, or other information explicitly per each CU. On the other hand, when a CU is coded with a skip mode or a direct mode, the motion information, including reference index and motion vector, is not signaled in video bitstream 228 to decoder 300. Instead, the motion information can be derived at decoder 300 using the same rule as encoder 200 does. The skip mode and the direct mode share the same motion information derivation rule and thus have the same motion information. A difference between these two modes is that in the skip mode, the signaling of the prediction residuals is skipped by setting residuals to be zero. In the direct mode, prediction residuals are still signaled in the bitstream.

For example, when a CU is coded with a skip mode, the CU is associated with one PU and has no significant residual coefficients, no coded MV difference or reference picture index. In the skip mode, the signaling of the residual data can be skipped by setting residuals to be zero. In the direct mode, the residual data is transmitted while the motion information and partitions are derived.

On the other hand, in inter modes, encoder 200 can choose any allowed values for motion vector and reference index as the motion vector difference and reference index are signaled to decoder 300. Compared with inter modes signaling the motion information, the bits dedicated on the motion information can thus be saved in the skip mode or the direct mode. However, encoder 200 and decoder 300 need to follow the same rule to derive the motion vector and reference index to perform inter prediction 2044. In some embodiments, the derivation of the motion information can be based on the spatial or temporal neighboring block. Accordingly, the skip mode and the direct mode are suitable for the case where the motion information of the current block is close to that of the spatial or temporal neighboring blocks of the current block.

For example, in AVS3, the skip mode or the direct mode may enable the motion information (e.g., reference index, MVs, etc.) to be inherited from a spatial or temporal (co-located) neighbor. A candidate list of motion candidates can be generated from these neighbors. In some embodiments, to derive the motion information used for inter prediction 2044 in skip mode or direct mode, encoder 200 may first derive the candidate list of motion candidates and select one of the motion candidates to perform inter prediction 2044. When signaling video bitstream 228, encoder 200 may signal an index of the selected candidate. At the decoder side, decoder 300 can obtain the index parsed from video bitstream 228, derive the same candidate list, and use the same motion candidate (including motion vector and reference picture index) to perform inter prediction 2044.

In AVS3 specification, there are different skip and direct modes, including normal skip and direct mode, ultimate motion vector expression mode, angular weighted prediction mode, enhanced temporal motion vector prediction mode and affine motion compensation skip/direct mode. The candidate list of motion candidates may include multiple candidates obtained based on different approaches. For example, for normal skip and direct model, a motion candidate list may have 12 candidates, including a temporal motion vector predictor (TMVP) candidate (i.e., a temporal candidate), one or more spatial motion vector predictor (SMVPs) candidates (i.e., spatial candidates), one or more motion vector angular predictor (MVAP) candidates (i.e., sub-block based spatial candidates), and one or more history-based motion vector predictor (HMVP) candidates (i.e., history-based candidates). In some embodiments, the encoder or the decoder can first derive and add TMVP and SMVP candidates in the candidate list. After adding TMVP and SMVP candidates, the encoder or the decoder derives and add the MVAP candidates and HMVP candidates. In some embodiments, the number of MVAP candidates added in the candidate list may be varied according to the number of available direction(s) in the MVAP process. For example, the number of MVAP candidate(s) may be between 0 to a maximum number (e.g., 5). After adding MVAP candidate (s), one or more HMVP candidates can be added to the candidate list until the total number of the candidates reaches the target number and the largest number can also be signaled in the bitstream.

In some embodiments, the first candidate is the TMVP derived from the MV of collocated block in a pre-defined reference frame. The pre-defined reference frame is defined as the reference frame with reference index being 0 in the List1 for B frame or List0 for P frame. When the MV of the collocated block is unavailable, a MV predictor (MVP) derived based on the MV of spatial neighboring blocks is used as a block level TMVP.

Figure 5:
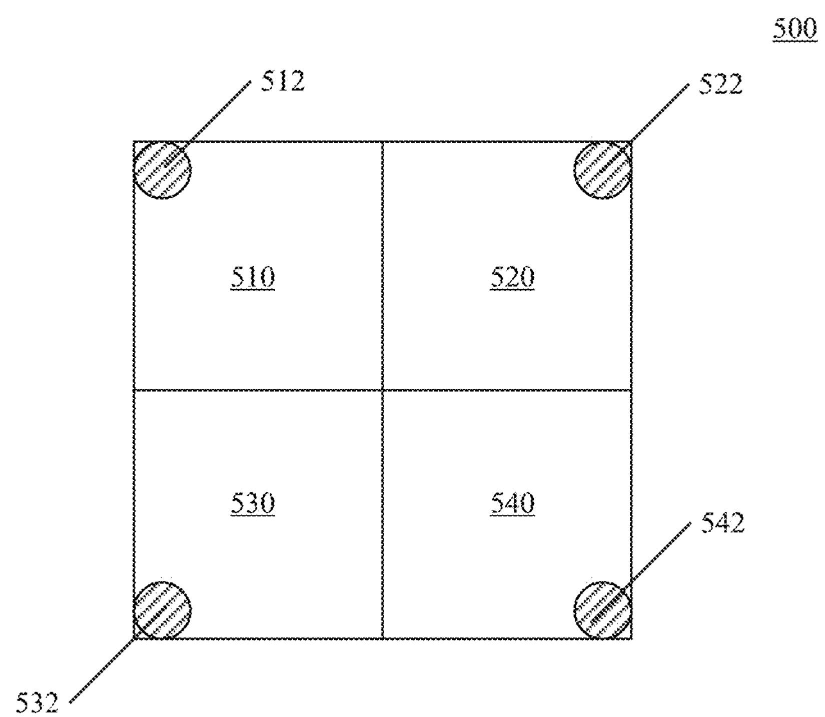
FIG. 5 is a schematic diagram illustrating exemplary subblock temporal motion vector predictor (TMVP) derivation, consistent with some embodiments of the present disclosure.

In some other embodiments, a subblock level TMVP can be adopted. FIG. 5 is a schematic diagram illustrating exemplary subblock TMVP derivation for a block 500, consistent with some embodiments of the present disclosure. Particularly, when the subblock level TMVP is enabled, the current block 500 is cross split into 4 subblocks 510, 520, 530, and 540. A motion vector can be derived for each subblock 510, 520, 530, or 540. As shown in FIG. 5, for each subblock, a corner sample (e.g., sample 512, 522, 532, or 542) is used to find the collocated block in the reference picture. The motion vector stored in a temporal motion information buffer covering the sample with the same coordinator in the reference picture as the corner sample is fetched and scaled. The scaled motion vector is used as the TMVP of the subblock. If List 0 motion vector in the temporal motion information buffer is available (i.e., the collocated block having a List 0 motion vector), List 0 motion vector is fetched and scaled and used as List 0 MV of TMVP of the subblock. If the List 1 motion vector is in the temporal motion information buffer is available (i.e., the collocated block having a List 1 motion vector), the List 1 motion vector is fetched and scaled and used as List 1 MV of TMVP of the subblock. If both List 0 motion vector and List 1 motion vector in the temporal motion information buffer are not available, a block level TMVP can be derived and used as the TMVP for the subblock. In some embodiments, the subblock TMVP can only be used for the block with the width and height both larger than or equal to 16, so that the width and height of each subblock are no less than 8.

Figure 6:
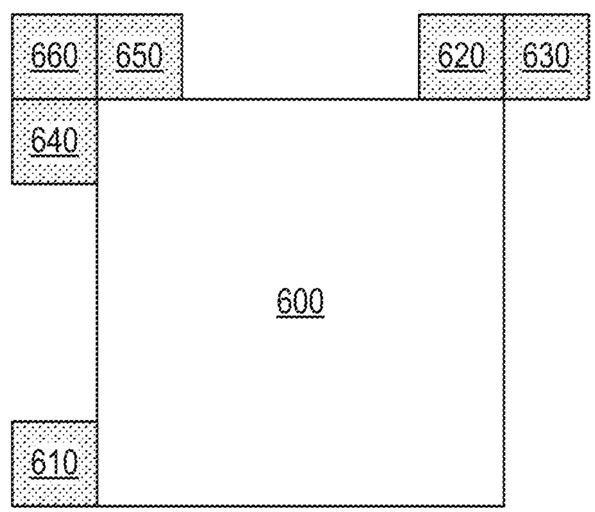
FIG. 6 is a schematic diagram illustrating exemplary neighboring blocks used for spatial motion vector predictor (SMVP) derivation, consistent with some embodiments of the present disclosure.

FIG. 6 is a schematic diagram illustrating exemplary neighboring blocks of a block 600 used for SMVP derivation, consistent with some embodiments of the present disclosure. The second, third and fourth candidates are the SMVP derived from six neighboring blocks 610, 620, 630, 640, 650, and 660 as shown in FIG. 6. In some embodiments, the second candidate is a bi-prediction candidate. The third candidate is a uni-prediction candidate with reference frame in List 0. The fourth candidate is a uni-prediction candidate with reference frame in List 1. For these three candidates, the encoder 200 or decoder 300 may check the motion information of the six neighboring blocks in the order of blocks 610, 620, 630, 640, 650, and 660 and borrow the MV and reference index of the first available block having the same prediction type as the current candidate. For example, for the second candidate, the motion information of the first block in the order of blocks 610, 620, 630, 640, 650, and 660 using bi-prediction is borrowed. If the encoder 200 or decoder 300 determines that there is no such block and that two or more neighboring blocks use uni-prediction with reference picture List 0 and two or more neighboring blocks use uni-prediction with reference picture List 1, then for the second candidate, the encoder 200 or decoder 300 may borrow and combine the motion information of the first block using uni-prediction with reference picture List 0 and the motion information of the first block using uni-prediction with reference picture List 1 in the order of blocks 610, 620, 630, 640, 650, and 660 to get the motion vector and reference index for the second candidate. Otherwise, the encoder 200 or decoder 300 may set the motion vector and reference index both to zero. For the third candidate, the encoder 200 or decoder 300 may borrow the motion information of the first block using uni-prediction with reference picture List 0. If there is no such block among the six neighboring blocks and two or more neighboring block use bi-prediction, then for the third candidate, the encoder 200 or decoder 300 may borrow the List 0 motion information of the first bi-prediction block in the order of blocks 660, 650, 640, 630, 620, and 610. Otherwise, the encoder 200 or decoder 300 may set the motion vector and reference index both to zero. Similarly, for the fourth candidate, the encoder 200 or decoder 300 may borrow the motion information of the first block using uni-prediction with reference picture List 1. If there is no such block among the six neighboring blocks and two or more neighboring blocks use bi-prediction, then for the fourth candidate, the encoder 200 or decoder 300 may borrow the List 1 motion information of the first bi-prediction block in the order of blocks 660, 650, 640, 630, 620, and 610. Otherwise, the encoder 200 or decoder 300 may set the motion vector and reference index both to zero.

Figure 7:
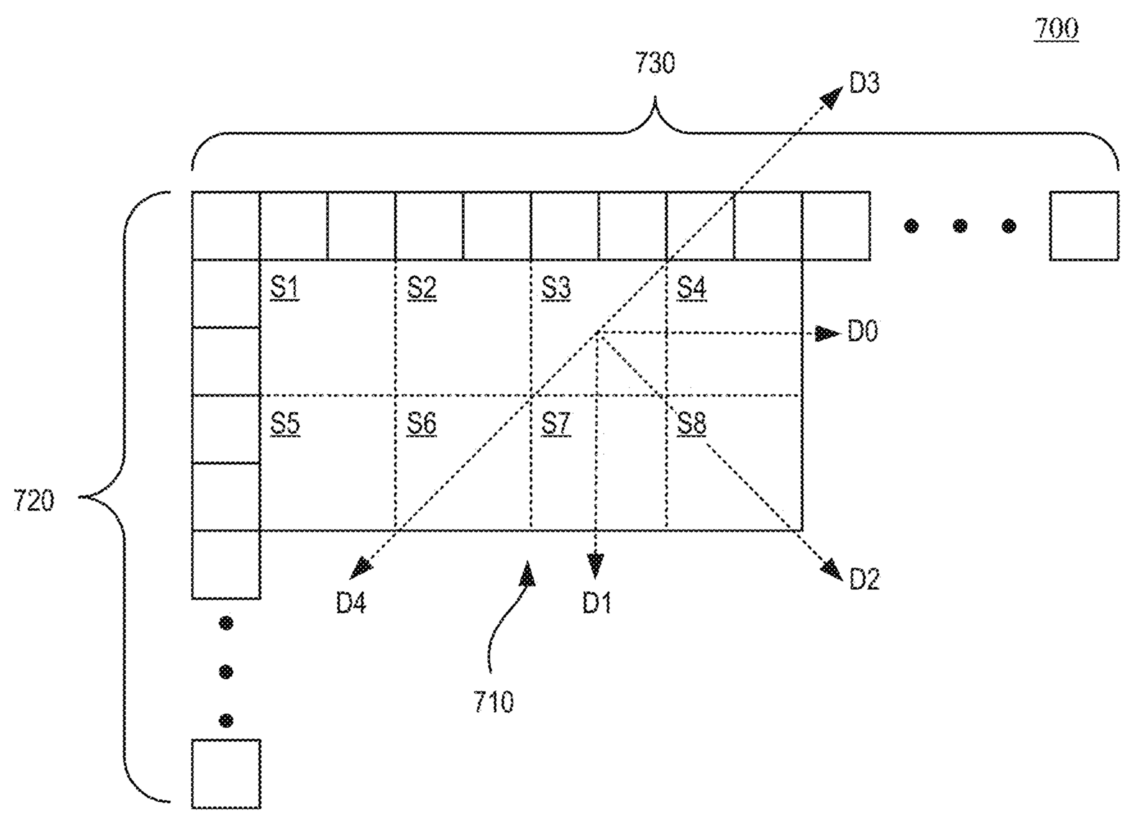
FIG. 7 is a schematic diagram illustrating subblocks in a coding unit (CU) associated with a video frame in a motion vector angular predictor (MVAP) process, consistent with some embodiments of the present disclosure.

As described above, MVAP candidate(s) come after SMVP candidates. In some embodiments, there are at most five MVAP candidates. Accordingly, the fifth candidate to the ninth candidate can be MVAP candidates. Reference is made to FIG. 7, which illustrates subblocks S1-S8 in a coding unit (CU) 710 associated with a video frame 700 in a MVAP process, consistent with some embodiments of the present disclosure. In the MVAP process, a CU 710 is split into subblocks S1-S8. In some embodiments, the size of each subblock S1-S8 is 8×8. For each 8×8 subblock, the motion information, including the reference index and MV, is predicted from a reference motion information.

As shown in FIG. 7, the reference motion information of a subblock S3 in the current CU 710 is the motion information (e.g., reference MVs) of horizontal and vertical neighboring blocks 720 and 730 of current CU 710 in five difference directions D0-D4. For example, direction D0 is referred to as a horizontal direction, direction D1 is referred to as a vertical direction, direction D2 is referred to as a horizontal up direction, direction D3 is referred to as a horizontal down direction, and direction D4 is referred as a vertical down direction. In other words, the MVAP candidates are subblock level candidates and derived by motion information angular prediction in five directions from the reference motion information, which are the MVs and reference indices of the neighboring blocks 720 and 730 as shown in FIG. 7. The neighboring motion information is first checked in 4×4 block level.

Figure 8:
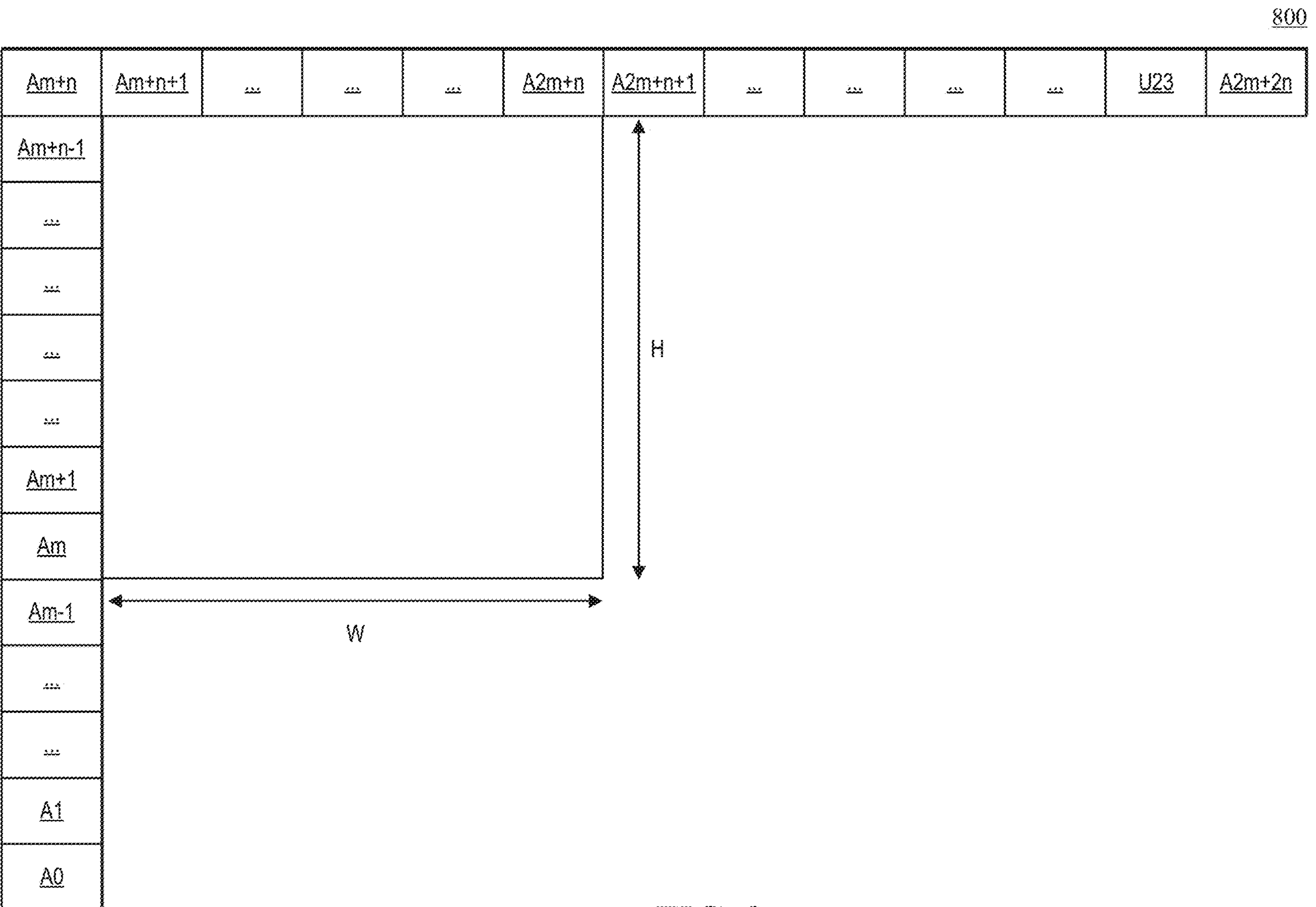
FIG. 8 is a schematic diagram illustrating neighboring 4×4 reference blocks for MVAP, consistent with some embodiments of the present disclosure.

FIG. 8 is a schematic diagram 800 illustrating neighboring 4×4 reference blocks $A_0$-$A_{2m+2n}$ for MVAP, consistent with some embodiments of the present disclosure. If the motion information in a 4×4 neighboring block is not available, it is filled with neighboring available MV and reference index. The neighboring motion information after filling can be used as the reference motion information for angular prediction.

Referring again to FIG. 7, the availability of 5 directions D0-D4 can be checked by comparing the reference motion information. Only available direction(s) are used to predict the MV of each 8×8 subblock S1-S8 within the current block 700 in FIG. 7. Accordingly, the number of MVAP candidate is from 0 to 5 dependent on the availability of the prediction direction D0-D4. For the first MVAP candidate, it is available when $A_{m-1+H/8}$ and $A_{m+n-1}$ have different motion information. For the second MVAP candidate, it is available when $A_{m+n+1+W/8}$ and $A_{m+n+1}$ have different motion information. For the third MVAP candidate, it is available when $A_{m+n-1}$ and $A_{m+n}$ have different motion information. For the fourth MVAP candidate, it is available when $A_{W/8-1}$ and $A_{m-1}$ have different motion information. For the fifth MVAP candidate, it is available when $A_{m+n+1+W/8}$ and $A_{2m+n+1}$ have different motion information.

Since the MV prediction is applied on each 8×8 subblock S1-S8 within the current block 700, the MVAP candidate is a subblock level candidate. Alternatively stated, different subblocks S1-S8 within the current block 700 may have different MVs and reference indices.

HMVP candidates are after MVAP candidate(s) and derived from motion information of the previously encoded or decoded blocks. For example, after encoding (or decoding) an inter coded block, encoder 200 in FIG. 2 (or decoder 300 in FIG. 3) may add the motion information associated with the encoded/decoded block to a last entry of a HMVP table. In some embodiments, the size of the HMVP table can be set to 8, but the present disclosure is not limited thereto. When inserting a new motion candidate to the table, a constrained first-in-first-out (FIFO) rule can be utilized. If there are already 8 candidates in the table, the first candidate is removed when the current motion information is inserted into the table to maintain the number of the candidates in the table is no greater than 8. In some embodiments, redundancy check can be applied first to determine whether an identical motion candidate already exists in the table. If the identical motion candidate is found in the table, this candidate can be moved to the last entry of the table instead of inserting a new identical entry. Candidates in the HMVP table are used as HMVP candidates for the skip mode and the direct mode.

In some embodiments, the encoder can first check whether a HMVP candidate stored in the HMVP table is identical to any motion candidate in the candidate list. In response to the HMVP candidate being different to the motion candidates in the candidate list, the encoder adds the HMVP candidate in the candidate list. Otherwise, the encoder doesn't add the HMVP candidate into the candidate list. This process can be referred as a "pruning" process.

For example, the HMVP table can be checked from its last entry to its first entry. If a candidate in HMVP table is not identical to any candidates (e.g., TMVP or SMVP candidates) in the candidate list, the candidate in HMVP table is put into the candidate list of normal skip and direct mode as a HMVP candidate. If a candidate in HMVP table is identical to one of TMVP candidate or SMVP candidate, this candidate is not put into the candidate list of normal skip and direct mode to avoid redundancies. The candidates in the HMVP table are checked and inserted into candidate list of normal skip and direct mode one by one, until the candidate list of normal skip and direct mode is full, or all candidates in the HMVP table are checked. If the candidate list of normal skip and direct mode is not full after inserting the HMVP candidates, the last candidate can be repeated until the candidate list is full.

Figure 9:
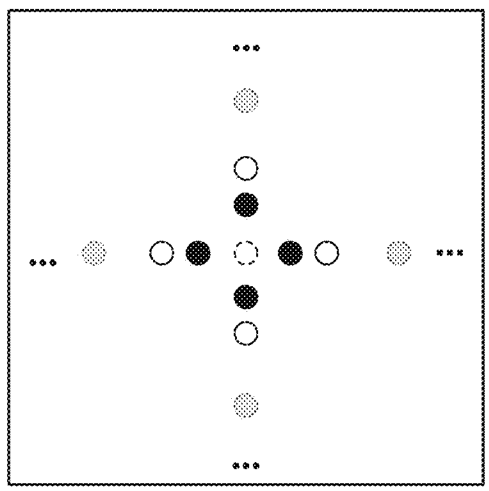
FIG. 9 is a schematic diagram illustrating exemplary motion derivation in ultimate motion vector expression (UMVE), consistent with some embodiments of the present disclosure.

FIG. 9 is a schematic diagram illustrating exemplary motion derivation in ultimate motion vector expression (UMVE), consistent with some embodiments of the present disclosure. In the AVS3 standard, in addition to normal skip and direct mode, where the implicitly derived motion information is used to find the reference block for inter prediction, the UMVE is also adopted as another skip and direct mode. In UMVE, based on a base candidate index signaled in the bitstream, a base motion candidate is selected from UMVE candidate list that only contains two candidates derived from motion information of spatial neighboring blocks. After that, the base motion candidate is further refined according to the signaled motion vector offset information. The motion vector offset information includes an index to specify offset distance, and an index for indication of offset direction. The base motion vector is set as the starting point for the refinement. Direction index represents the direction of the motion vector offset relative to the starting point. The direction index can represent one of the four directions as shown in the FIG. 9. Distance index specifies motion vector offset magnitude. The mapping from distance index to the offset value is specified in Table 1 and Table 2. In some embodiments, a flag is signaled in the picture header to indicate using the 5 MVD offsets in Table 1 or the 8 MVD offsets in Table 2.

TABLE 1

The 5 MVD offsets for the UMVE mode

| Distance index | 0 | 1 | 2 | 3 | 4 |
|---|---|---|---|---|---|
| MVD offset (pel) | 1/4 | 1/2 | 1 | 2 | 4 |

TABLE 2

The 8 MVD offsets for the UMVE mod

| Distance index | 0 | 1 | 2 | 3 | 4 | 5 | 6 | 7 |
|---|---|---|---|---|---|---|---|---|
| MVD offset (Pel) | 1/4 | 1/2 | 1 | 2 | 4 | 8 | 16 | 32 |

Figure 10:
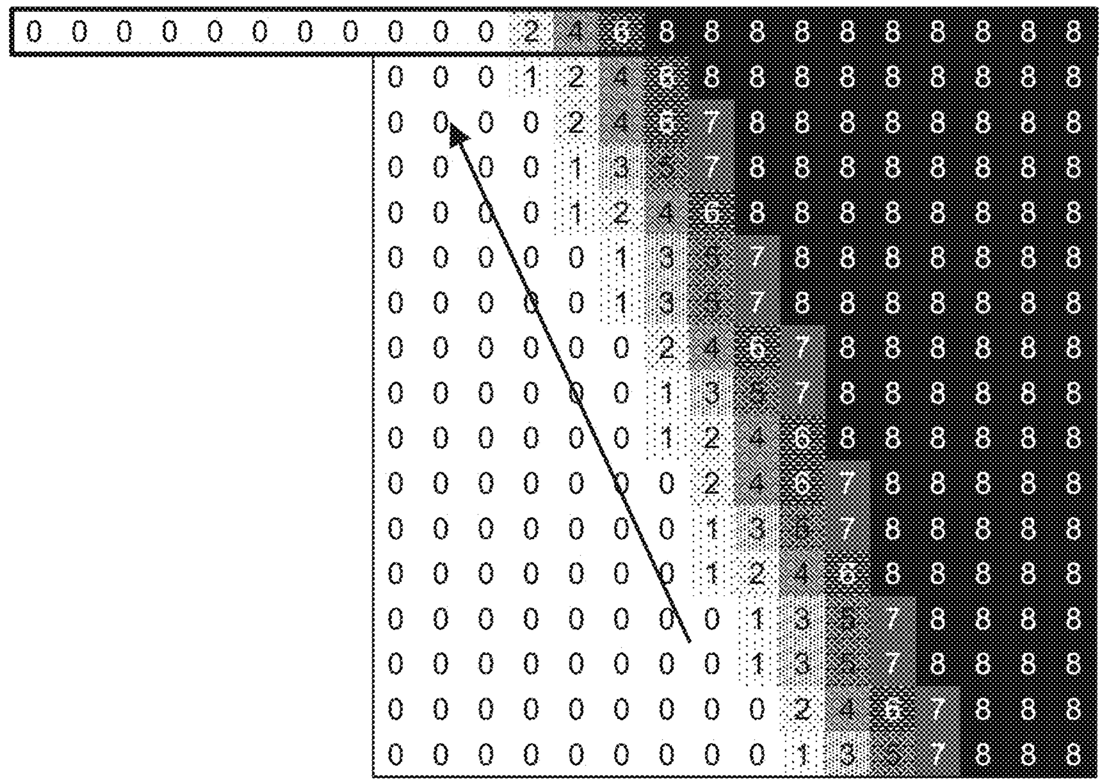
FIG. 10 is a schematic diagram illustrating an exemplary angular weighted prediction (AWP), consistent with some embodiments of the present disclosure.

FIG. 10 is a schematic diagram illustrating an exemplary angular weighted prediction (AWP), consistent with some embodiments of the present disclosure. In the AVS3 standard, an AWP mode is adopted as another skip and direct mode. The AWP mode is indicated by a flag signaled in the bitstream. In the AWP mode, a motion vector candidate list containing five different uni-prediction motion vectors derived from spatial neighboring blocks and temporal motion vector predictor, is constructed first. To construct the uni-prediction candidate list, the motion information of temporal collocated block, denoted as T, and the spatial neighboring blocks (e.g., blocks 610, 620, 630, 640, 650 and 660 shown in FIG. 6) are checked in order. If the neighboring block is a uni-prediction block, the motion information can be directly inserted into the candidate list. If the neighboring block is a bi-prediction block, according to the parity of the index of the current candidate to be inserted, the List 0 motion information or the List 1 motion information is inserted as a uni-prediction candidate. If the candidate list is not full after inserting all the neighboring motion information, additional candidates may be derived based on the existing candidates in the list until the candidate list is full.

After the uni-prediction candidate list is constructed, two uni-prediction motion vectors are selected from the motion vector candidate list according to the two candidate indices signaled in the bitstream to get the two reference blocks. Unlike the bi-prediction inter mode where two reference blocks are averaged with an equal weight to get the final predicted block, in AWP mode, different samples may have different weights in the averaging process. As shown in FIG. 10, the weight for each sample is predicted from a reference weight array and the value of the weight is from 0 to 8. In some embodiments, the weight prediction is similar to sample intra prediction. For each sample, according to the prediction direction, the reference weight which is referenced to by the current prediction direction is used as the weight of the current sample.

Figure 11:
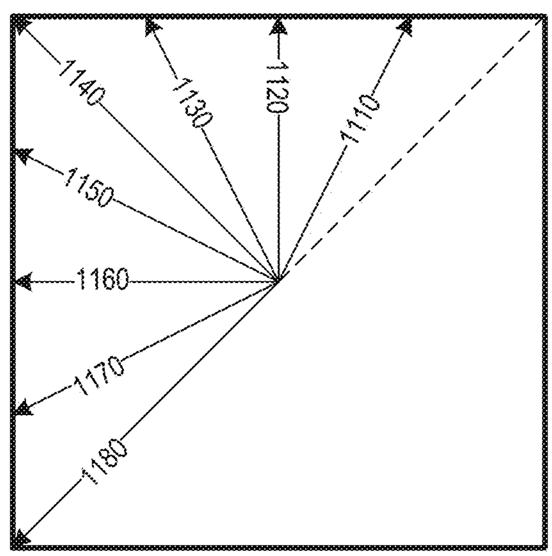
FIG. 11 is a schematic diagram illustrating eight different prediction directions supported in the AWP mode, consistent with some embodiments of the present disclosure.
Figure 12:
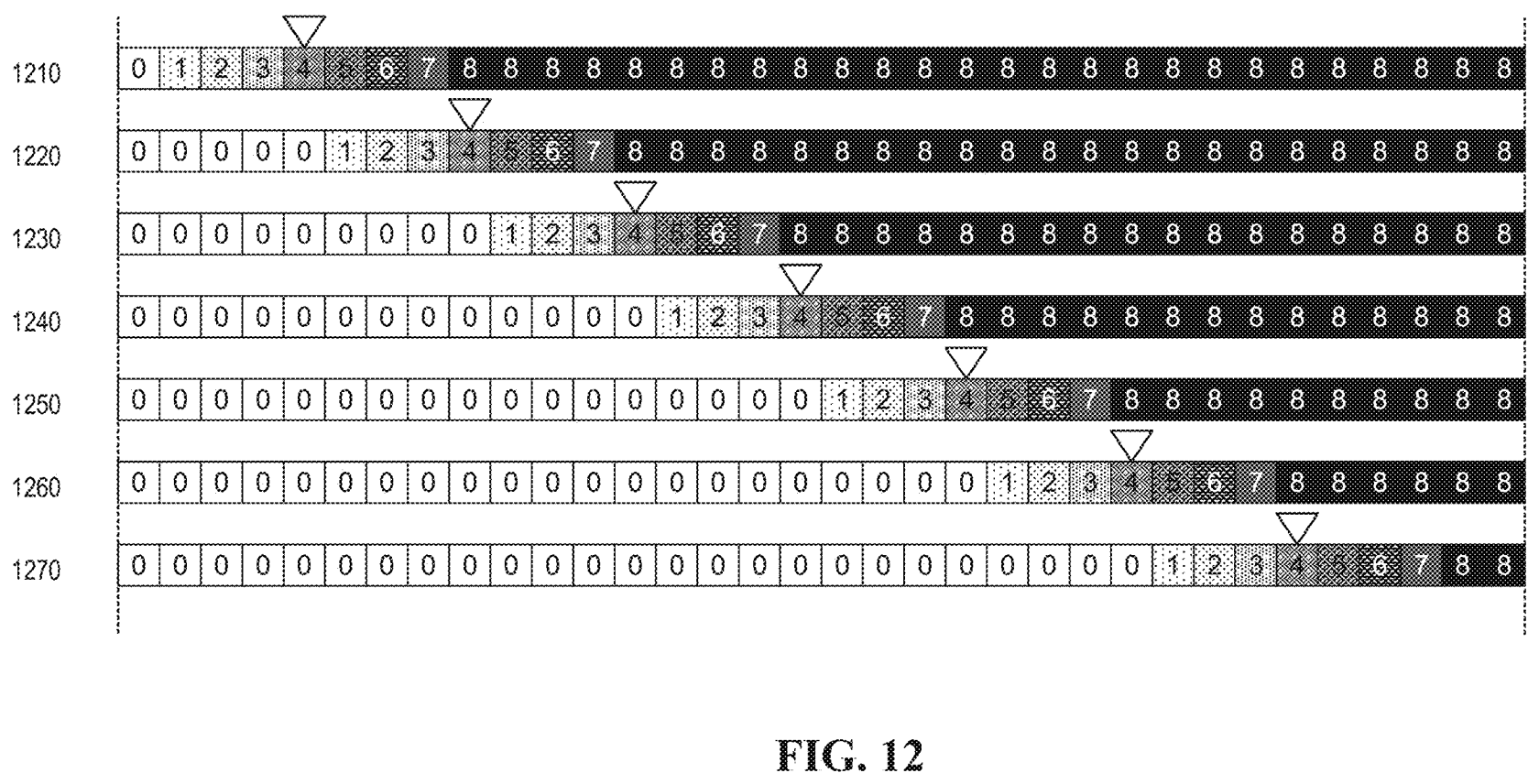

FIG. 11 is a schematic diagram illustrating eight different prediction directions 1110-1180 supported in the AWP mode, consistent with some embodiments of the present disclosure. As shown in FIG. 11, the prediction direction 1160 is the horizontal direction, while the prediction direction 1120 is the vertical direction. FIG. 12 is a schematic diagram illustrating seven different weight arrays 1210-1270 in the AWP mode, consistent with some embodiments of the present disclosure.

For a coding block with size w×h equal to $2^m \times 2^n$ wherein $m,n \in \{3 \ldots 6\}$, 8 prediction directions 1110-1180 as in FIGS. 11 and 7 different reference weight arrays 1210-1270 as in FIG. 12 are supported in AWP mode. Accordingly, 56 prediction results, i.e., 56 different weights distributions, can be obtained in a coding block. After determining the weight for each sample, encoder 200 in FIG. 2 (or decoder 300 in FIG. 3) may derive the final predicted block by weighted averaging two reference blocks in sample wise. In some embodiments, the final prediction block P is calculated as follows:

$$P=(P0*W0+P1*W1)>>3$$

where "*" denotes the dot product, P0 and P1 respectively denote two reference blocks, and W0 and W1 respectively denote the derived weight matrices, in which W0+W1 is a matrix with all the elements equal to 8.

In the AVS3 standard, Enhanced Temporal Motion Vector Predictor (ETMVP) may be applied to derive motion information. In ETMVP, the current block is divided into 8×8 subblocks and each subblock derives a motion vector based on the corresponding temporal neighboring block motion information. When the ETMVP flag signaled in the stream indicates ETMVP is enabled, a motion candidate list is constructed. Each candidate in the list contains a set of motion vectors, one for each 8×8 sub-block.

For the first candidate, the motion vector of each 8×8 subblock is derived from the motion vector of the corresponding collocated block in the reference picture with reference index equal to 0 in the reference picture List 0. For the second candidate, the current block is firstly shifted down by 8 samples, and then the motion vector of each subblock is derived from the motion vector of the corresponding collocated block of the shifted block in the reference picture with reference index equal to 0 in the reference picture List 0. For the third candidate, the current block is firstly shifted to the right by 8 samples, and then the motion vector of each subblock is derived from the motion vector of the corresponding collocated block of the shifted block in the reference picture with reference index equal to 0 in the reference picture List 0. For the fourth candidate, the current block is firstly shifted up by 8 samples, and then the motion vector of each subblock is derived from the motion vector of the corresponding collocated block of the shifted block in the reference picture with reference index equal to 0 in the reference picture List 0. For the fifth candidate, the current block is firstly shifted to the left down by 8 samples, and then the motion vector of each subblock is derived from the motion vector of the corresponding collocated block of the shifted block in the reference picture with reference index equal to 0 in the reference picture List 0. When inserting the candidate into the candidate list, the encoder 200 or decoder 300 may prune the second candidate to the fifth candidate by comparing the motion information of two pre-defined subblocks in the reference picture.

Figure 13:
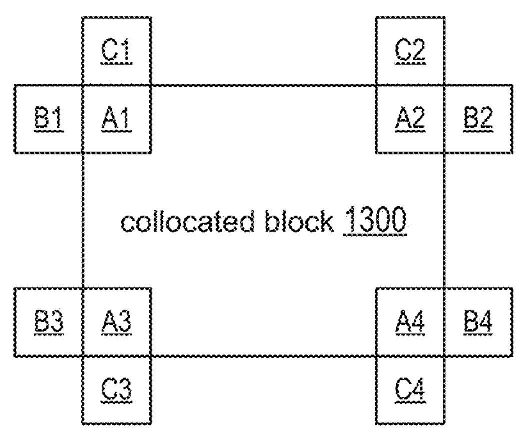
FIG. 13 is a schematic diagram illustrating a collocated block and subblocks for candidate pruning, consistent with some embodiments of the present disclosure.

FIG. 13 is a schematic diagram illustrating a collocated block 1300 and subblocks A1-A4, B1-B4, and C1-C4 for candidate pruning, consistent with some embodiments of the present disclosure. As shown in FIG. 13, in the pruning process applied to the corresponding collocated block 1300, for the second candidate, the motion information of subblock A2 and subblock C4 is compared. For the third candidate, the motion information of subblock A3 and subblock B4 is compared. For the fourth candidate, the motion information of subblock A4 and subblock C2 is compared. For the fifth candidate, motion information of subblock A4 and subblock B3 is compared. If the motion information of the two compared subblocks is not the same, the candidate is valid and inserted into the candidate list. Otherwise, the current candidate is invalid and not inserted into the candidate list. If the number of valid candidates is less than 5 after checking all five candidates, the last valid candidate is repeated until the candidate number equal to 5 to complete the candidate list. Accordingly, after the candidate list is constructed, the decoder 300 may select the candidate by the candidate index signaled in the bitstream.

In some embodiments, when deriving the motion vector for each subblock for ETMVP, the List 0 motion vector of collocated block is used to derive the List 0 motion vector of the corresponding subblock. The List 1 motion vector of collocated block is used to derive the List 1 motion vector of the corresponding subblock. The reference indices of List 0 and List 1 for the current subblock are set to 0. Accordingly, if the collocated block is a List 0 uni-prediction block, the corresponding subblock also uses List 0 uni-prediction. If the collocated block is a List 1 uni-prediction block, the corresponding subblock also uses List 1 uni-prediction. If the collocated block is a bi-prediction block, the corresponding subblock also uses bi-prediction. If the collocated block is an intra block, the motion vector of the corresponding subblock is set to a default motion vector derived from the spatial neighboring block.

MV represents the object movement between two pictures at different time instant. However, it only represents the translation as all the samples in the block have the same position shift. To compensate other motions, such as zoom in, zoom out, or rotation, the AVS3 standard adopts an affine motion compensation. In the affine motion compensation, different samples in the block have different motion vectors. The motion vector of each sample is derived from the motion vectors of the control points (CPs) according to the affine model. In some embodiments, the affine motion compensation can only be applied on the block with the size greater than or equal to 16×16.

Figures 14A, 14B:
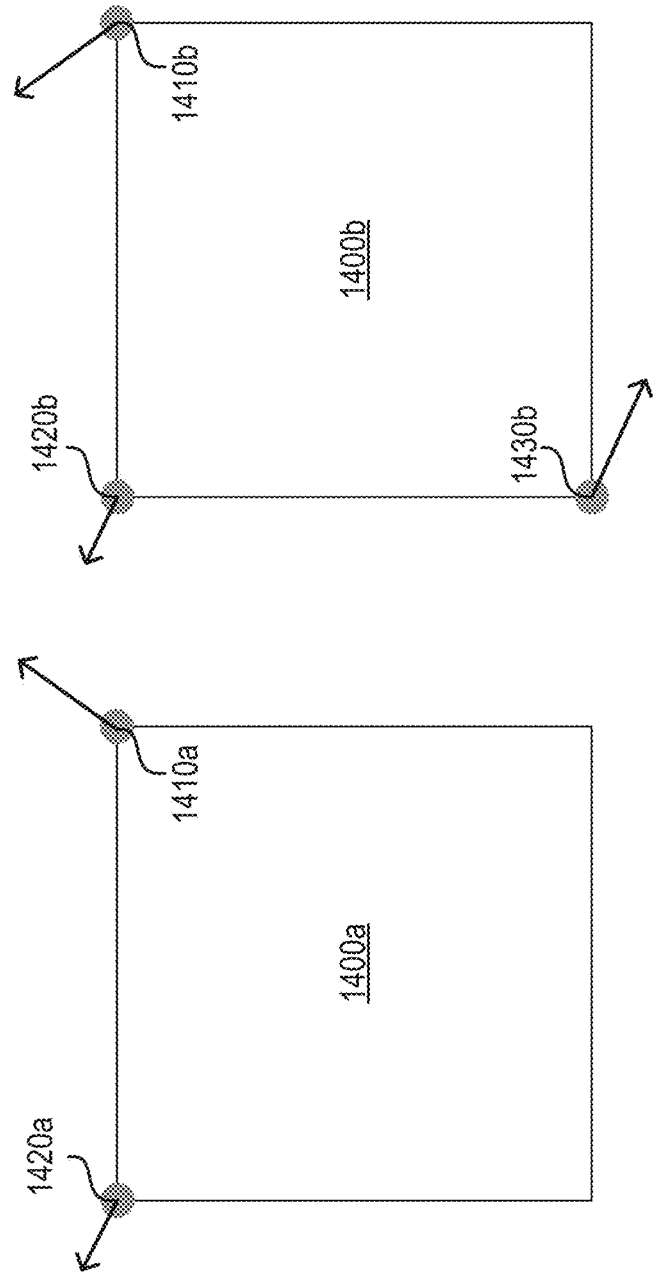
FIG. 14A and FIG. 14B are two schematic diagrams illustrating control-points-based affine model, consistent with some embodiments of the present disclosure.

FIG. 14A and FIG. 14B are two schematic diagrams illustrating control-points-based affine model for blocks 1400*a* and 1400*b*, consistent with some embodiments of the present disclosure. In some embodiments, the control points 1410*a* and 1420*a* in FIG. 14A and the control points 1410*b*, 1420*b*, and 1430*b* in FIG. 14B are respectively set to the corners of the blocks 1400*a* and 1400*b*. As shown in FIG. 14A, for four parameters affine model, two control points 1410*a* and 1420*a* are needed. As shown in FIG. 14B, for 6 parameters affine model, three control points 1410*b*, 1420*b*, and 1430*b* are needed. To reduce the complexity of the model computation and the bandwidth of the motion compensation, the granularity of the affine motion compensation is on subblock level instead of sample level. In the AVS3 standard, 4×4 or 8×8 luma subblock affine motion compensation is adopted, in which each 4×4 subblock or 8×8 subblock has a motion vector to perform motion compensation. To derive motion vector of each 8×8 or 4×4 luma subblock, the motion vector of the center position of each subblock is calculated according to two or three control points (CPs), and rounded to 1/16 fraction accuracy.

Figure 15:
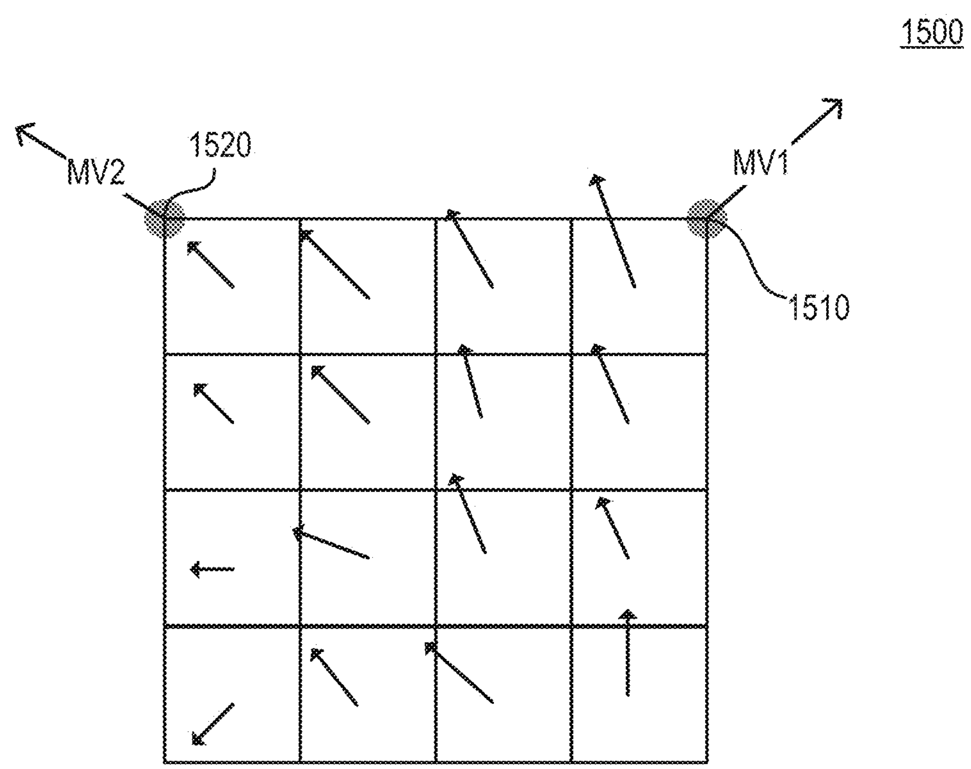
FIG. 15 is a schematic diagram illustrating motion vector of the center sample of each subblock, consistent with some embodiments of the present disclosure.

FIG. 15 is a schematic diagram illustrating motion vector of the center sample of each subblock of a block 1500, consistent with some embodiments of the present disclosure. Particularly, FIG. 15 gives example of four parameters affine model, in which motion vector of each subblock can be derived from the motion vectors MV1, MV2 of two control points 1510 and 1520. After derivation of subblock motion vector, the motion compensation is performed to generate the predicted block of the subblock with derived motion vector.

Affine motion compensation can be performed using two different modes. In an affine inter mode, the motion vector differences (i.e., the difference between the CPMV and the predictor of CPMV) of control points 1510 and 1520 and reference index are signaled in the bitstream. On the other hand, in an affine skip/direct mode, the motion vector difference and reference index are not signaled but derived by the decoder 300. Particularly, for the affine skip/direct mode, the motion vectors of the control points (CPMVs) of the current blocks are generated based on the motion information of the spatial neighboring blocks. In some embodiments, there are five candidates in the candidate list of affine skip/direct mode. An index is signaled to indicate the candidate to be used for the current block. For example, the candidate list of affine skip/direct mode may include following three types of candidates in order: inherited affine candidates, constructed affine candidates, and zero motions vectors.

For the inherited affine candidates, the CPMVs of the current block is extrapolated from the CPMVs of the spatial neighbour blocks. There can be a maximum of two inherited affine candidates derived from affine motion model of the neighboring blocks, one from left neighboring blocks and one from above neighboring blocks. When a neighboring affine block is identified, its CPMVs are used to derive the CPMV of the current block. For the constructed affine candidates, the CPMVs of the current block is derived by combing motion information (e.g., MVs) of the different neighboring blocks. If the candidate list of affine skip/direct mode is not full after inserting inherited affine candidates and constructed affine candidates into the candidate list, zero MVs are inserted until the candidate list is full.

On the other hand, for the affine inter mode, the difference between the CPMVs and the CPMVPs (CPMV predictors) of current block and the index of CPMV predictors are signalled in the bitstream. The encoder 200 is configured to signal an affine flag in the bitstream to indicate whether affine inter mode is used and then another flag is signalled to indicate whether 4-parameter affine model or 6-parameter affine model is used if affine inter mode is used. The encoder 200 and the decoder 300 can respectively construct an affine CPMVP candidate list at the encoder and decoder side. In some embodiments, the affine CPMVP candidate list includes multiple candidates and is constructed by using the following four types of CPMVP candidates in order: inherited affine candidates, constructed affine candidates, translational motion vectors from neighboring blocks, and zero motion vectors. For the inherited affine candidates, the CPMVPs are extrapolated from the CPMVs of the neighbour blocks. For the constructed affine candidates, the CPMVPs are derived by combining motion vectors of different neighbour blocks. The encoder 200 may signal the index of CPMVP in the bitstream 228 to indicate which candidate is used as CPMVP for the current block and then the decoder 300 may add the MVD signaled in the bitstream 228 to the CPMVP to get the CPMV of the current block.

Figure 16:
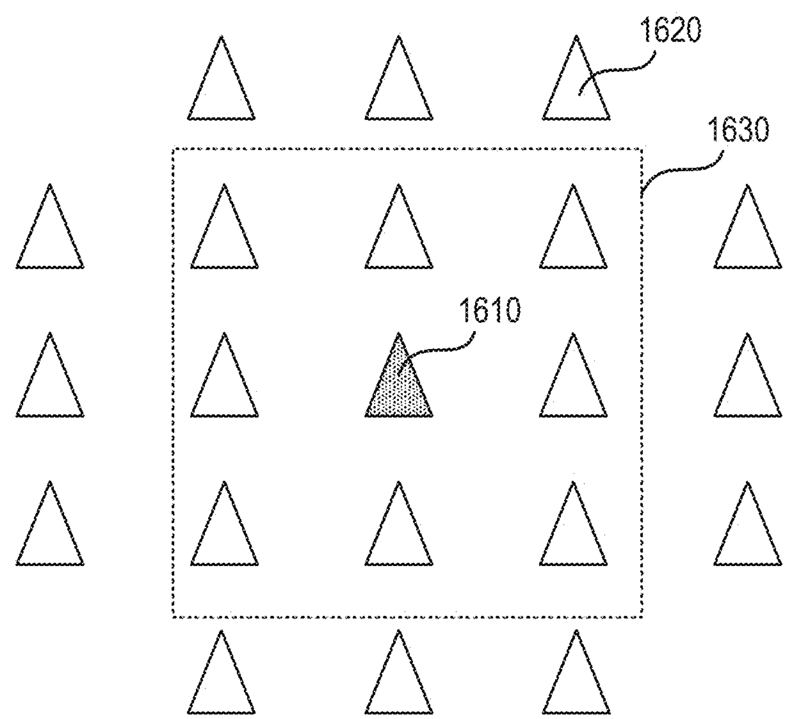
FIG. 16 is a schematic diagram illustrating integer searching points in Decoder-side Motion Vector Refinement (DMVR), consistent with some embodiments of the present disclosure.

FIG. 16 is a schematic diagram illustrating integer searching points in Decoder-side Motion Vector Refinement (DMVR), consistent with some embodiments of the present disclosure. In some embodiments, the decoder 300 may perform DMVR to refine the motion vector at the decoder side according to symmetrical mechanism, so that the encoder 200 does not need to explicitly signal a MVD in the bitstream 228. Particularly, DMVR can only be applied on the block coded with bi-prediction. After the List 0 motion vector MV0 and the List 1 motion vector MV1 are derived, the decoder 300 may then perform the refinement process to refine the two motion vectors MV0 and MV1. In some embodiments, the decoder 300 performs DMVR on 16×16 sub-block level. Before refining the motion vectors MV0 and MV1, the motion vectors MV0 and MV1 are adjusted to integer precision and set as initial MVs.

In the embodiments shown in FIG. 16, DMVR is performed based on a search process, with the samples used in the search process being within a window with size of (subblock width+7)×(subblock height+7) and center points referenced to by the initial MV. Because 8-tap interpolation filter is used in normal motion compensation, setting the data window as (subblock width+7)×(subblock height+7) does not increase the memory bandwidth. The integer reference samples in the window are fetched from the reference picture of List 0 and List 1. The position on which the sum of difference of the List 0 reference block and List 1 reference block is minimized is set as the optimal integer position.

As shown in FIG. 16, the triangle filled with the dotted pattern is the initial position 1610 referenced to by the initial MVs. For each sub-block, 21 integer positions 1620 within the search window shown as the triangle are checked to calculate the sum of absolute differences (SAD) value between the two reference blocks. The position with the smallest SAD between the two reference blocks among 21 positions is identified as the optimal integer position. After the integer position search, if the optimal integer position falls within a center region 1630 in FIG. 16 (i.e., the optimal integer position being one of the 9 center positions), the decoder 300 further performs a sub-pixel estimation based on a mathematical model. In the sub-pixel estimation, an error surface is derived according to the SAD values of the surrounding integer positions, and the SAD value of sub-pixel position is calculated according to the error surface. The sub-pixel position with the smallest SAD value can be obtained as the refined reference position. Accordingly, the reference block at the refined reference position is obtained as the refined predicted block for the current subblock. When the refined reference position is a sub-pixel position, the decoder 300 performs the interpolation filtering to derive the sample values at sub-pixel. Particularly, in interpolation filtering process, the search window boundary samples are padded when the integer samples out of the search window are needed, to avoid actually fetching the samples out of the search window.

The DMVR can be performed in skip and direct mode to refine motion vectors to improve the prediction, without enabling flag signaling. In some embodiments, the decoder 300 performs the DMVR when the current block meets the following conditions: (1) the current block is a bi-prediction block; (2) the current block is coded with skip mode or direct mode; (3) the current block does not use the affine mode; (4) the current frame is located between the two reference frames in display order; (5) the distance between the current frame and the two reference frames are the same; and (6) the width and height of the current block are greater than or equal to 8.

In some embodiments, bi-directional optical flow (BIO) may be applied to refine the predicated sample values for the bi-prediction block in skip and direct mode. The bi-prediction may perform a weighted average of two reference blocks to obtain the combined predicted block. In BIO, the combined predicted block is further refined based on the optical flow theory. Particularly, BIO may only be applied on the coding block coded with bi-prediction. It calculates the gradient values in the horizontal direction and the vertical direction for each sample in the List 0 reference block and List 1 reference block. The current block is divided into 16×16 subblock as in BIO to calculate the gradients. The integer reference samples used for gradient calculation are within a window of (subblock width+7)×(subblock height+7), which is also the same as DMVR subblock search window. After the calculation of gradients, the refinement value is calculated for each sample based on the optical flow equation. To reduce the complexity, in the AVS3 standard, the refinement value is calculated for a cluster with 4×4 samples and not on the sample level. The calculated refinement values are added to the combined predicted block to obtain the refined predicted block in BIO. In BIO, the gradient calculation may use an 8-tap filter with integer reference sample as input. Exemplary filter coefficients for the 8-tap gradient filter are shown in Table 3.

TABLE 3

| 8-tap gradient filter coefficients | |
|---|---|
| MV position | coefficients |
| 0 | −4, 11, −39, −1, 41, −14, 8, −2 |
| 1/4 | −2, 6, −19, −31, 53, −12, 7, −2 |
| 1/2 | 0, −1, 0, −50, 50, 0, 1, 0 |
| 3/4 | 2, −7, 12, −53, 31, 19, −6, 2 |

In some embodiments, the encoder 200 is not required to signal an enabling flag in the bitstream to indicate the usage of BIO. BIO is applied for the blocks when the following conditions are met: (1) the block is a luma coding block; (2) the block is a bi-prediction block; (3) the List 0 reference frame and the List 1 reference frame are on the two sides of the current frame in the display order, and (4) The current motion vector precision is quarter pixel.

In some embodiments, Bi-directional gradient correction (BGC) may be applied to refine the predicted sample values for the bi-prediction block in inter mode. The BGC calculates the difference between two reference blocks, one from List 0 reference picture and the other one from List 1 reference picture, as the temporal gradient. Then, the calculated temporal gradient is scaled and added to the combined predicted block generated by two reference blocks to further correct the predicted block. Particularly, a predicted block (denoted as $Pred_{B1}$), can be generated by averaging the reference blocks $Pred_0$ from List 0 reference picture and $Pred_1$ from List 1 reference picture. The BGC calculates the corrected predicted block Pred as follows:

$$Pred = \begin{cases} Pred_{BI}, & BgcFlag = 0 \\ Pred_{BI} + ((Pred_1 - Pred_0) \gg k), & BgcFlag = 1, BgcIdx = 0, \\ Pred_{BI} + ((Pred_0 - Pred_1) \gg k), & BgcFlag = 1, BgcIdx = 1, \end{cases}$$

where k is the correction intensity factor and may be set to 3 in the AVS3 standard. For a block coded with bi-prediction inter mode and satisfies the BGC application conditions, an enabling flag, BgcFlag, is signaled to indicate whether the BGC is enabled or disabled. When BGC is enabled, an index, BgcIdx, is further signaled to indicate the way to correct the predicted block using temporal gradient. In some embodiments, both the enabling flag BgcFlag and the index BgcIdx are signaled using context coded bins. The BGC is only applied to the bi-prediction mode. For skip and direct mode, the enabling flag BgcFlag and the index BgcIdx are inherited from the neighboring block together with other motion information.

In some embodiments, Inter prediction filter (InterPF) is another process provided in the AVS3 standard to refine the predicted block, and can be applied in the last stage in the inter prediction. The filtered block obtained after the InterPF is the final predicted block. InterPF may be only applied to the predicted block coded with normal direct mode. When the current block is coded with the normal direct mode, the encoder 200 may signal an enabling flag to indicate whether InterPF is enabled or disabled. If InterPF is enabled, the encoder 200 further signals an index to indicate which filter is applied. Particularly, the encoder 200 may select the filter to be applied from two filter candidates. The decoder 300 performs the same filter operation as the encoder 200 does, according to the filter index signaled in the bitstream.

For example, when InterPF is applied, if the InterPF index is equal to 0, the left and above neighboring reconstructed samples are used to filter the current predicted samples by weighted averaging. The filtering process is performed according to following equations:

$$Pred(x,y)=(Pred\_inter(x,y)\times5+Pred\_Q(x,y)\times3)>>3,$$

$$Pred\_Q(x,y)=(Pred\_V(x,y)+Pred\_H(x,y)+1)>>2,$$

$$Pred\_V(x,y)=((h-1-y)\times Rec(x,-1)+(y+1)\times Rec(-1,h)+(h>>1))>>\log 2(h),$$

$$Pred\_H(x,y)=((w-1-x)\times Rec(-1,y)+(x+1)\times Rec(w,-1)+(w>>1))>>\log 2(w),$$

where Pred_inter(x, y) denotes the predicted sample to be filtered at position (x, y), and Pred(x, y) denotes the filtered predicted sample at position (x, y). Rec(i,j) represents the reconstructed neighboring pixels at position (i, j). The width and height of the current block are represented by w and h, respectively.

If the InterPF index is equal to 1, the filtering process is performed according to the following equation:

$$Pred(x,y)=(f(x)\times Rec(-1,y)+f(y)\times Rec(x,-1)+(64-f(x)-f(y))\times Pred\_inter(x,y)+32)>>6$$

where Pred_inter(x, y) denotes the predicted sample to be filtered at position (x, y), and Pred(x, y) denotes the filtered predicted sample at position (x, y). Rec(i,j) represents the reconstructed neighboring pixels at position (i, j). f(x) and f(y) denote the position dependent weights, which can be obtained by a look up table. An exemplary look up table of position dependent weights f(x) and f(y) for InterPF is shown in Table 4.

TABLE 5

| The look up table of f(x) and f(x) for InterPF | | | | | |
|---|---|---|---|---|---|
| | w or h | | | | |
| x or y | 4 | 8 | 16 | 32 | 64 |
| 0 | 24 | 44 | 40 | 36 | 52 |
| 1 | 6 | 25 | 27 | 27 | 44 |
| 2 | 2 | 14 | 19 | 21 | 37 |
| 3 | 0 | 8 | 13 | 16 | 31 |
| 4 | 0 | 4 | 9 | 12 | 26 |
| 5 | 0 | 2 | 6 | 9 | 22 |
| 6 | 0 | 1 | 4 | 7 | 18 |
| 7 | 0 | 1 | 3 | 5 | 15 |
| 8 | 0 | 0 | 2 | 4 | 13 |
| 9 | 0 | 0 | 1 | 3 | 11 |
| 10 ~ 63 | 0 | 0 | 0 | 0 | 0 |

Figure 17:
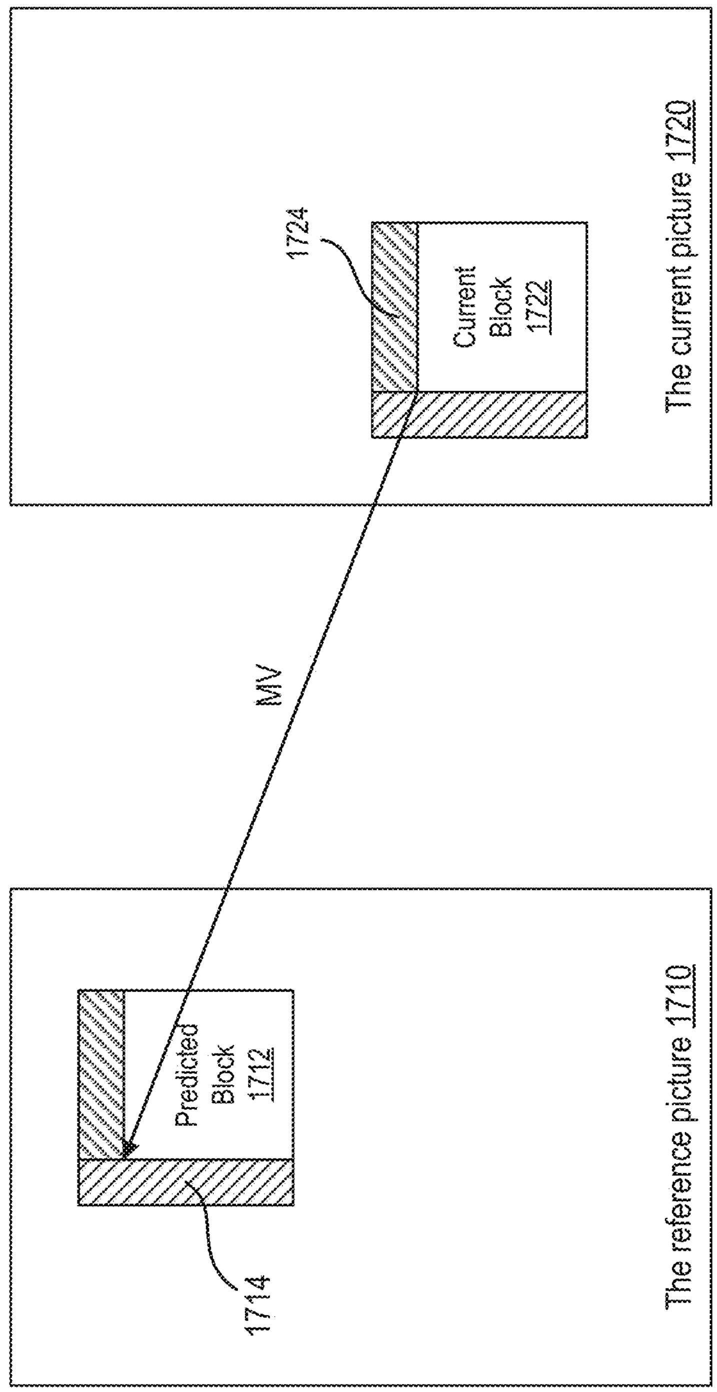
FIG. 17 is a schematic diagram illustrating local illuminance compensation (LIC) model parameters estimation using neighboring block in the reference picture and the current picture, consistent with some embodiments of the present disclosure.

FIG. 17 is a schematic diagram illustrating local illuminance compensation (LIC) model parameters estimation using neighboring block in the reference picture and the current picture, consistent with some embodiments of the present disclosure. As shown in FIG. 17, in inter prediction, a reference block 1712 in a previously coded/decoded reference picture 1710 can be found to predict the current block 1722 in the current picture 1720, if the reference block 1712 has the same or similar content with the current block 1722.

However, illumination variation often occurs between different pictures due to changes of lighting conditions, camera positions, or movements of objects. In the scenarios with illumination variation, the values of the samples in the reference block 1712 and the current block 1722 may not be close to each other because the reference block 1712 and the current block 1722 are in different pictures 1710 and 1720 at different time instances with different illuminance, even if the reference block 1712 and the current block 1722 have the same content. Thus, to compensate the illuminance changes from picture to picture in inter prediction, an illuminance compensation (IC) based on the linear model is applied to generate a compensated predicted block having a closer value of the illuminance level to the current block. The encoder 200 and the decoder 300 may derive and apply two parameters, the scaling factor parameter a and the offset parameter b, of the linear model to the predicted block as the following equation:

$$y=a\times x+b$$

wherein x denotes a predicted sample in the predicted block from the reference picture 1710, and y denotes the predicted sample after the illuminance compensation.

In some embodiments, the model of illuminance compensation may be derived on picture level and applied to all blocks within the picture. In some other embodiments, the model of illuminance compensation may be derived on the block level and applied on a specific block only. The block level illuminance compensation is referred as a local illuminance compensation (LIC). When the LIC is performed, the encoder 200 and the decoder 300 derive the model parameters in the same way for the current block 1722. Accordingly, the encoder 200 does not need to signal the model parameters in the bitstream 228. In the embodiments of FIG. 17, the encoder 200 and the decoder 300 may use the reconstructed samples of the neighboring block 1724 and predicted samples (shown with the shaded areas) of the neighboring block 1714 to derive the model parameters. Particularly, linear model parameters are estimated first according to relationship between the predicted sample values and reconstructed sample values of the neighboring blocks 1714, 1724. Then, the estimated linear model is applied on the predicted samples to generated illuminance compensated predicted samples with the values closer to the original sample values of the current block 1722. In the embodiments of FIG. 17, the predicted samples of the neighboring block 1714 are used in the parameter derivation. Accordingly, the decoder 300 fetches a block larger than the current block 1722 from the reference picture buffer, which increases the bandwidth.

Figure 18:
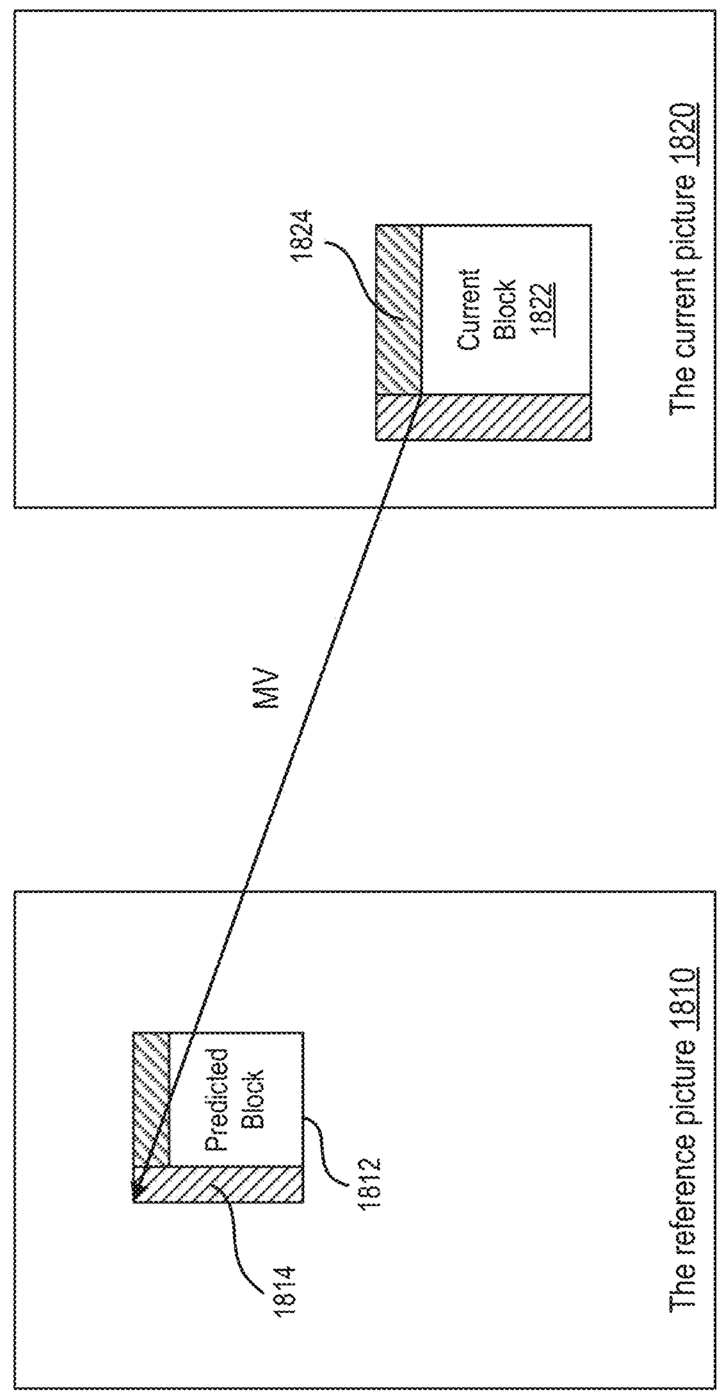
FIG. 18 is a schematic diagram illustrating LIC model parameters estimation, consistent with some embodiments of the present disclosure.

FIG. 18 is a schematic diagram illustrating LIC model parameters estimation, consistent with some embodiments of the present disclosure. In the embodiments of FIG. 18, to reduce the bandwidth, a current predicted block (CPB) based local illuminance compensation is proposed. As shown in FIG. 18, instead of the neighboring block samples, the predicted samples on the left and top boundary within the predicted block 1812 are used to estimate the model parameters. As shown with shaded area 1814 in FIG. 18, the predicted samples within the left and up boundary of the predicted block 1812 and the reconstructed samples of left and up neighboring blocks 1824 of the current block 1822 in the current picture 1820 are used to derive the model parameters.

Figure 19A:
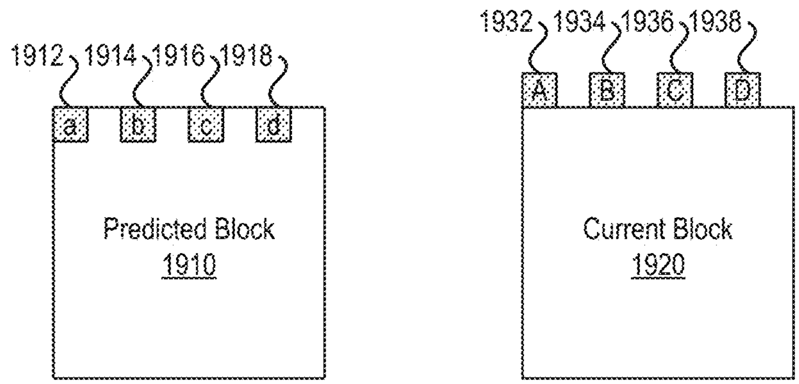
FIGS. 19A-19D are schematic diagrams illustrating LIC model parameters estimation using four pairs of samples, consistent with some embodiments of the present disclosure.
Figure 19B:
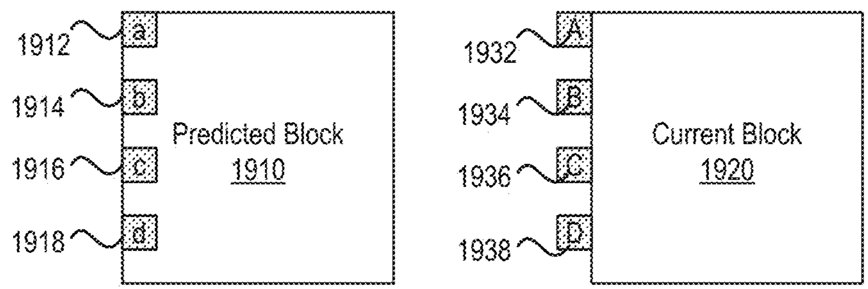
Figure 19C:
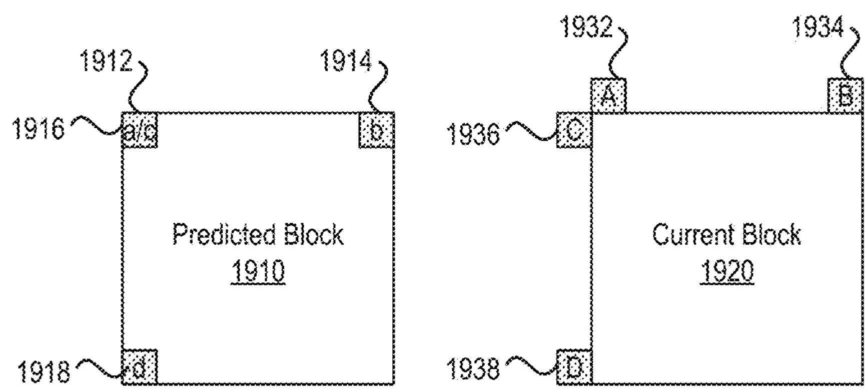
Figure 19D:
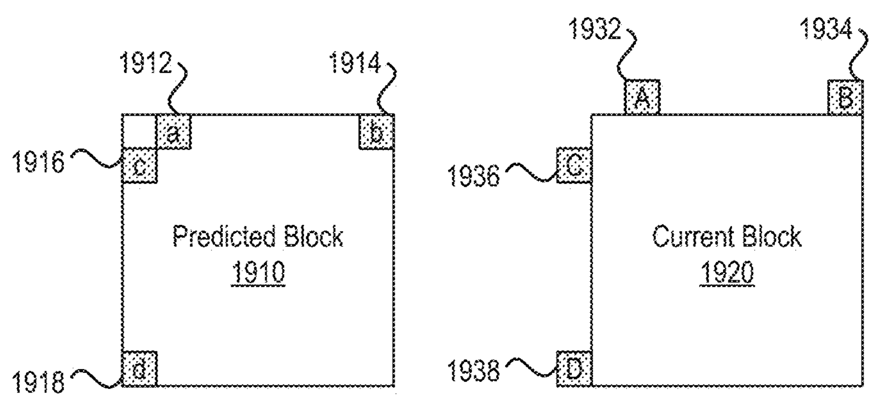

In some embodiments, the encoder 200 or the decoder 300 may apply least square estimation to estimate the model parameters, but the computational complexity is high. FIGS. 19A-19D are schematic diagrams illustrating LIC model parameters estimation using four pairs of samples, consistent with some embodiments of the present disclosure. In the embodiments of FIGS. 19A-19D, to simplify parameter estimation, four points estimation is applied, with four pairs of samples being used for parameter estimation. As shown in FIG. 19A, four predicted samples 1912, 1914, 1916, 1918 on the top boundary within the predicted block 1910 and four reconstructed samples 1932, 1934, 1936, 1938 on the top neighboring block of the current block 1920 are used. As shown in FIG. 19B, four predicted samples 1912, 1914, 1916, 1918 on the left boundary within the predicted block 1910 and four reconstructed samples 1932, 1934, 1936, 1938 on the left neighboring block of the current block 1920 are used. In FIG. 19C and FIG. 19D, two predicted samples 1912, 1914 on the top boundary and two predicted samples 1916, 1918 on the left boundary within the predicted block 1910 and two reconstructed samples 1932, 1934 on the top neighboring block of the current block 1920 and two reconstructed samples 1936, 1938 on the left neighboring block of the current block 1920 are used. In the estimation process, first, predicted samples 1912-1918 are sorted according to their values. The average of two bigger values among predicted samples 1912-1918 is calculated and denoted as x_max, and the average of the two corresponding reconstructed sample values is also calculated and denoted as y_max. Particularly, reconstructed samples 1932, 1934, 1936 and 1938 are respectively corresponding to predicted samples 1912, 1914, 1916, and 1918. The average of two smaller values among predicted samples 1912-1918 is calculated and denoted as x_min, and the average of two corresponding reconstructed sample values is also calculated and denoted as y_min. The model parameters a and b of the linear model are derived based on the values of x_max, y_max, x_min, and y_min, according to the following equations:

$$a=((y\_max-y\_min)\times(1<<shift)/(x\_max-x\_min))>>shift$$

$$b=y\_min-a\times x\_min$$

wherein the parameter "shift" is the bit shift number and the operator "I" denotes the integer division.

In the above described CPB based LIC design of FIGS. 19C-19D, the predicted sample 1914 in the top-right and predicted sample 1918 in the left-bottom corner of the predicted block 1910 are needed for parameter derivation. However, in the practical hardware implementation, a coding block is usually divided into subblocks and inter prediction is performed on subblock level.

FIG. 20 is a schematic diagram illustrating subblock level inter prediction, consistent with some embodiments of the present disclosure. As shown in FIG. 20, a 64×64 block 2000 is divided into sixteen 16×16 subblocks 2011-2044. When the decoder 300 performs inter prediction on the subblock 2011, the predicted samples of subblocks 2012-2014 and subblocks 2021, 2031 and 2041 are required for LIC model parameter estimation. In other words, the LIC is unable to refine predicted samples of the subblock 2011 until other subblocks 2012-2014, 2021, 2031, and 2041 complete the inter prediction. Accordingly, the memory space required to store the unrefined predicted samples increases, and the pipeline latency also increases.

Figures 21A, 21B, 21C:
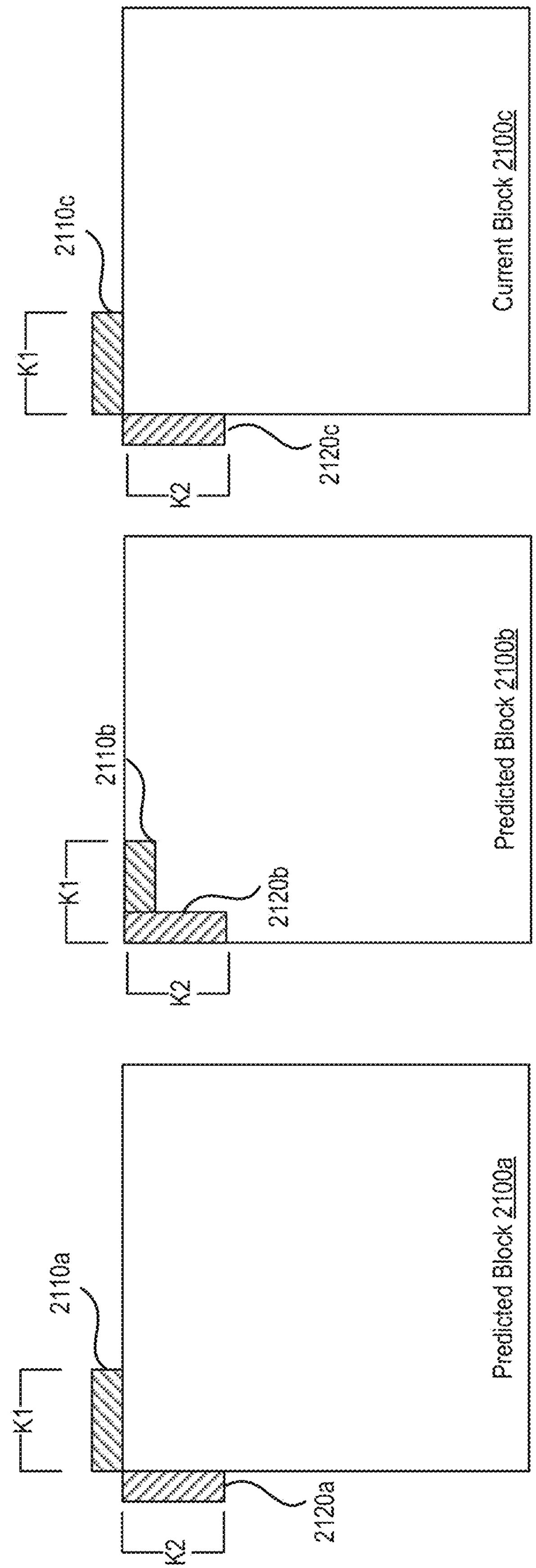
FIGS. 21A-21C are schematic diagrams illustrating samples to derive LIC model parameters, consistent with some embodiments of the present disclosure.

To address the issue above, in the present disclosure, the encoder 200 and the decoder 300 may perform a simplified LIC. In the simplified LIC, the samples used for LIC model parameter derivation are restricted according to the positions of the samples, which reduces the memory required and also reduces the pipeline latency. FIGS. 21A-21C are schematic diagrams illustrating samples to derive LIC model parameters, consistent with some embodiments of the present disclosure. In the embodiments of FIGS. 21A-21C, the position of the samples used for parameter derivation is restricted to reduce the memory for storing the predicted samples and processing latency for CPB based LIC. For example, as shown in FIGS. 21A-21C, only the samples around the top-left corner of the coding block are used to derive the model parameters for the current coding block. In the embodiments of FIG. 21A, for the predicted samples, only the first K1 samples 2110*a* out of top boundary of the predicted block 2100*a* and first K2 samples 2120*a* out of the left boundary of the predicted block 2100*a* (shown with the shaded samples in FIG. 21A) are used to derive the model parameters. Alternatively, in the embodiments of FIG. 21B, for the predicted samples, only the first K1 samples 2110*b* within the top boundary of the predicted block 2100*b* and first K2 samples 2120*b* within the left boundary of the predicted block 2100*b* (shown with the shaded samples in FIG. 21B) are used to derive the model parameters. In the embodiments of FIG. 21C, for the reconstructed samples, only the first K1 samples 2110*c* in the top neighboring block adjacent to the top boundary of the current coding block 2100*c* and first K2 samples 2120*c* in the left neighboring block adjacent to the left boundary of the current coding block 2100*c* (shown with shaded samples in FIG. 21C) are used to derive the model parameters. Restriction values K1 and K2 are two integer number to restrict the positions of the samples used in parameter derivation. For example, the restriction values K1 and K2 can be 16 or 8, but the present disclosure is not limited thereto. In various embodiments, the encoder 200 and the decoder 300 may apply a least square estimation or four points estimation, or other existing parameter estimation method to derive the LIC model parameters.

In some embodiments, the restriction values K1 and K2 are variable depending on the selected inter prediction mode or the type of motion vector predictor candidate. For example, for UMVE mode and AWP mode, the inter prediction (or "motion compensation") is performed on coding block level. For ETMVP and Affine mode, the inter prediction is performed on subblock level. For the normal skip and direct mode, the inter prediction is performed on coding block level for the block level TMVP, SMVP and HMVP, which are coding block level candidates, and the inter prediction is performed on subblock level for subblock level TMVP and MVAP, which are subblock level candidates. For inter prediction modes (e.g., ETMVP and Affine mode) or MVP candidates of normal skip and direct mode (e.g., subblock level TMVP and MVAP) with the inter prediction performed on subblock level, the value of K1 and K2 may be set to the size of subblock. On the other hand, for the inter prediction modes (e.g., UMVE mode and AWP mode) or MVP candidates of normal skip and direct mode (e.g., block level TMVP, SMVP and HMVP) with the inter prediction performed on coding block level, the value of K1 and K2 may be set to a pre-defined value that can be different from the value set for a coding block with the inter prediction performed on subblock level.

For example, for subblock level TMVP candidate of normal skip and direct mode, MVAP candidate of normal skip and direct mode and ETMVP mode, the inter prediction is performed on 8×8 subblock level. Accordingly, the value of K1 and K2 may be set to 8. For affine mode, the inter prediction is performed on 4×4 or 8×8 subblock level, depending on a picture level flag. Accordingly, the value of K1 and K2 may be set to 4 or 8 depending on the signaled picture level flag. For UMVE mode, AWP mode, block level TMVP candidate of normal skip direct mode, SMVP and HMVP candidate of normal skip and direct mode, the inter prediction is performed on coding block, and the value of K1 and K2 may be both set to 16 or other pre-defined value. In some embodiments, if the value of K1 and K2 are less than the size of coding block, the position restriction may be changed to the size of coding block. In some embodiments, the size of pre-defined value is larger than the size of subblock for better coding efficiency. Accordingly, in the normal skip and direct mode, the subblock level TMVP candidates and the MVAP candidates have a stricter restriction (e.g., a less restriction value) on position of samples used for deriving the model parameters than the restriction on position of samples used for deriving the model parameters for block level TMVP candidates, SMVP candidates, or HMVP candidates.

In some embodiments, to further reduce the implementation cost, the encoder 200 and decoder 300 may apply the LIC only on the coding unit of which the inter prediction is performed on coding block level. For the prediction mode or MVP candidate of normal skip and direct mode for which the inter prediction is performed on subblock level, LIC is not applied. For example, in some embodiments, for normal skip and direct mode, LIC is not applied on a coding unit if subblock level TMVP candidate or MVAP candidate is selected for the coding unit. For the coding unit using other candidates of normal skip and direct mode, LIC is applied. For another example, in some embodiments, LIC is not applied on affine mode and ETMVP mode because inter prediction is performed on subblock in the affine mode and ETMVP mode. As the MVP candidates of normal skip and direct mode are indicated by the candidate indices, in some embodiments, to simplify the determination of candidate type, the encoder 200 or the decoder 300 may directly check the candidate index to determine whether LIC is enabled or disabled. For example, in the motion candidate list of normal skip and direct mode, the candidate with index 0 is subblock TMVP candidate if subblock TMVP is enabled. Accordingly, LIC can be disabled and no LIC related syntax elements are signaled for the coding block if skip or direct index is signaled to be 0. For another example, in the motion candidate list of normal skip and direct mode, the candidates with index equal to 3, 4, 5, 6 or 7 may be MVAP candidate or HMVP candidate dependent on the number of MVAP candidate. As a simple way, LIC may be directly disabled for the candidate with index from 3 to 7, regardless of the candidate type. Accordingly, if the skip or direct index is signaled as 3, 4, 5, 6, or 7 for a coding block, the LIC may be disabled and no LIC syntax elements are signalled for the coding block.

As shown in FIGS. 21A-21C, in some embodiments, the model parameters are derived only based on the samples surrounding the top-left corner (e.g., the first K1 samples on the top boundary and the first K2 samples on the left boundary) of the current coding block and applied on all the samples within the current coding block. In some embodiments, to further improve the accuracy of the model parameters for samples in the bottom part or in the right part of the coding block, the encoder 200 or the decoder 300 may perform a subblock level parameter derivation.

Figures 22A, 22B, 22C:
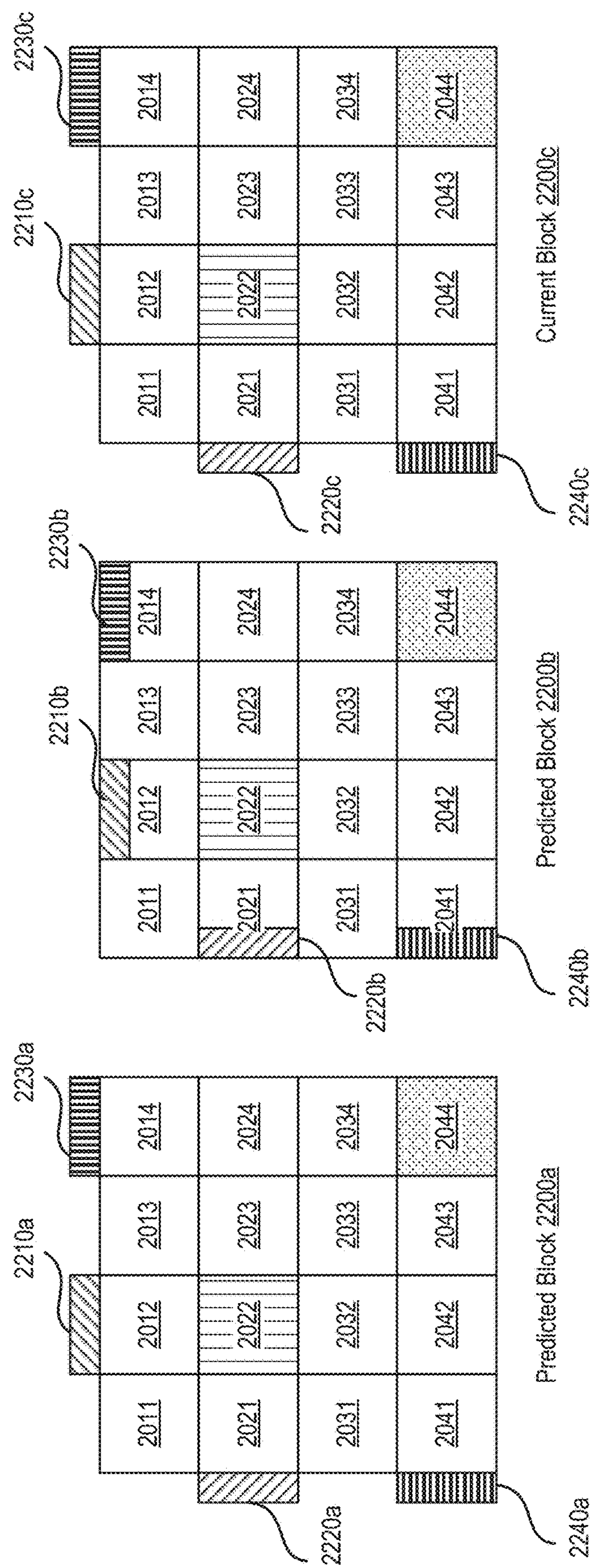
FIGS. 22A-22C are schematic diagrams illustrating samples to derive LIC model parameters in subblock level, consistent with some embodiments of the present disclosure.

FIGS. 22A-22C are schematic diagrams illustrating samples to derive LIC model parameters in subblock level, consistent with some embodiments of the present disclosure. In the embodiments of FIGS. 22A-22C, the model parameters of each subblock can be derived based on the samples on the corresponding top and left boundaries of the current subblock. Accordingly, the dependency between different subblocks 2011-2044 are removed. For example, as shown in FIG. 22A, for the subblock 2022 of the predicted block 2200*a*, the predicted samples 2210*a* out of the top boundary of subblock 2012 of the predicted block 2200*a* and the predicted samples 2220*a* out of the left boundary of subblock 2021 of the predicted block 2200*a* are used to derive the model parameters. Alternatively, as shown in FIG. 22B, the predicted samples 2210*b* on the top boundary of subblock 2012 and the predicted samples 2220*b* on the left boundary of subblock 2021 within the predicted block 2200*b* are used to derive the model parameters. As shown in FIG. 22C, the reconstructed samples 2210*c* of the neighboring block adjacent to the top boundary of subblock 2012 of the current block 2200*c* and the reconstructed samples 2220*c* of the neighboring block adjacent to the left boundary of subblock 2021 of the current block 2200*c* are used to derive the model parameters.

Similarly, for the subblock 2044, in the embodiments of FIG. 22A, the predicted sample 2230*a* out of the top boundary of the subblock 2014 of the predicted block 2200*a* and the predicted sample 2240*a* out of the left boundary of subblock 2041 of the predicted block 2200*a* are used to derive the model parameters. In the embodiments of FIG. 22B, the predicted sample 2230*b* on the top boundary of the subblock 2014 within the predicted block 2200*b* and the predicted sample 2240*b* on the left boundary of subblock 2041 within the predicted block 2200*b* are used to derive the model parameters. In the embodiments of FIG. 22C, the reconstructed sample 2230*c* of the neighboring block adjacent to the top boundary of the subblock 2014 of the current block 2200*c* and the reconstructed sample 2240*c* of the neighboring block adjacent to the left boundary of the subblock 2041 of the current block 2200*c* are used to derive the model parameters. It is noted that, the parameter derivation methods described above in FIGS. 17 and 18 may be used, and further explanation is not repeated herein for the sake of brevity. By using the samples on the corresponding coding block boundaries for each subblock parameters derivation, the accuracy of the parameters may be improved.

FIGS. 23A-23C are schematic diagrams illustrating samples to derive LIC model parameters, consistent with some embodiments of the present disclosure. In the embodiments of FIGS. 23A-23C, to improve the consistency among parameters of different subblocks and avoid potential coding performance drops due to the inconsistency. In other words, the model parameters of a current subblock may be derived based on the samples from the first subblock boundary to the corresponding boundary associated with the current subblock. For example, as in FIGS. 23A-23C, when driving LIC model parameters in subblock level for a current subblock (e.g., subblock 2023 in FIGS. 23A-23C), the corresponding top boundary is the top boundary of the subblock 2013 and the corresponding left boundary is the left boundary of the subblock 2021.

Accordingly, as shown in FIG. 23A, the predicted samples 2310*a* out of the top boundaries of subblocks 2011, 2012, and 2013 of the predicted block 2300*a* and the predicted samples 2320*a* out of the left boundaries of subblocks 2011 and 2021 of the predicted block 2300*a* are used to derive the model parameters. Alternatively, as shown in FIG. 23B, the predicted samples 2310*b* on the top boundaries of subblocks 2011, 2012, and 2013 within the predicted block 2300*b* and the predicted samples 2320*b* on the left boundaries of subblocks 2011 and 2021 within the predicted block 2300*b* are used to derive the model parameters. As shown in FIG. 23C, the reconstructed samples 2310*c* of the neighboring block adjacent to top boundaries of subblocks 2011, 2012, and 2013 of the current block 2300*c* and the reconstructed samples 2320*c* of the neighboring block adjacent to the left boundaries of subblocks 2011 and 2021 of the current block 2300*c* are used to derive the model parameters.

In some embodiments, the LIC may be only applied on luma component to compensate the illuminance changes, but the present disclosure is not limited thereto. For example, in some embodiments, the chroma components of the picture may also vary in response to the change of the illuminance. Accordingly, the chrominance difference may exist if the LIC is only applied on luma components. Consistent with some embodiments of the present disclosure, the LIC can be applied on chroma components to compensate the chrominance changes between the current block and the predicted block. Alternatively stated, the illuminance compensation can be extended to the chroma component, and the chroma component illuminance compensation may be referred as local chroma compensation (LCC) in various embodiments of the present disclosure.

In the LCC, the neighboring predicted chroma samples and neighboring reconstructed chroma samples can be used to derive a linear model, which is then applied to the predicted chroma samples of the current coding block to produce compensated predicted chroma samples. Various LIC methods described in above paragraphs may be adopted to the LCC applied to chroma components. Considering the chroma texture is simpler than the luma texture, the liner model of LCC can be simplified by removing the scaling factor a and only keeping the offset b. That is, when applying LCC to a predicted chroma block, the values of predicted chroma samples in the current coding block are all directly set to b, no multiplication and addition is required to calculate the compensated predicted sample value.

In some embodiments, the enabled LIC (i.e., luma component IC) is a precondition for enabling the LCC (i.e., chroma component IC). In other words, in one example, the LCC is only enabled and applied on the coding block when the LIC is enabled and applied on the same coding block. In some embodiments, the LIC compensation applied to a luma coding block and LCC compensation applied to a chroma coding block in the coding unit may be respectively enabled or disabled. In some embodiments, particularly, when LCC is enabled for the current coding block, the encoder 200 and decoder 300 further check the neighboring reconstructed chroma samples and the predicted chroma samples which are used to derive the model parameters to determine whether apply simplified LCC (i.e., the LCC with only offset b) or not.

In some embodiments, in the coding unit, for a luma component, the position restriction on the sample used for model parameter derivation is dependent on the inter prediction mode or the type of MVP candidate. On the other hand, for a chroma component, the LCC can be disabled if the chroma coding block is coded with subblock level inter prediction.

For example, if subblock level TMVP candidate or MVAP candidate of normal skip and direct, affine mode, or ETMVP mode is used for a coding unit, the encoder 200 or the decoder 300 may enable the LIC and set the sample position restriction values K1 and K2 both to 8 for the luma coding block of the coding unit. In other words, the left 8 neighboring reconstructed samples on the top boundary of the luma coding block and the top 8 neighboring reconstructed samples on the left boundary of the luma coding block, and the left 8 predicted samples within the top boundary of the luma coding block and top 8 predicted samples within the left boundary of the luma coding block are used to derive the LIC model parameters. Accordingly, the LIC is enabled and applied on the luma coding block of the coding unit. On the other hand, the LCC is disabled and not applied on the chroma coding block of the coding unit.

Similar to operations in the LIC, when the LCC is applied, in some embodiments, the encoder 200 or the decoder 300 may use the predicted chroma samples within the current block, instead of the predicted chroma samples of the neighboring block, to derive the model parameters to reduce the bandwidth.

Figure 24:
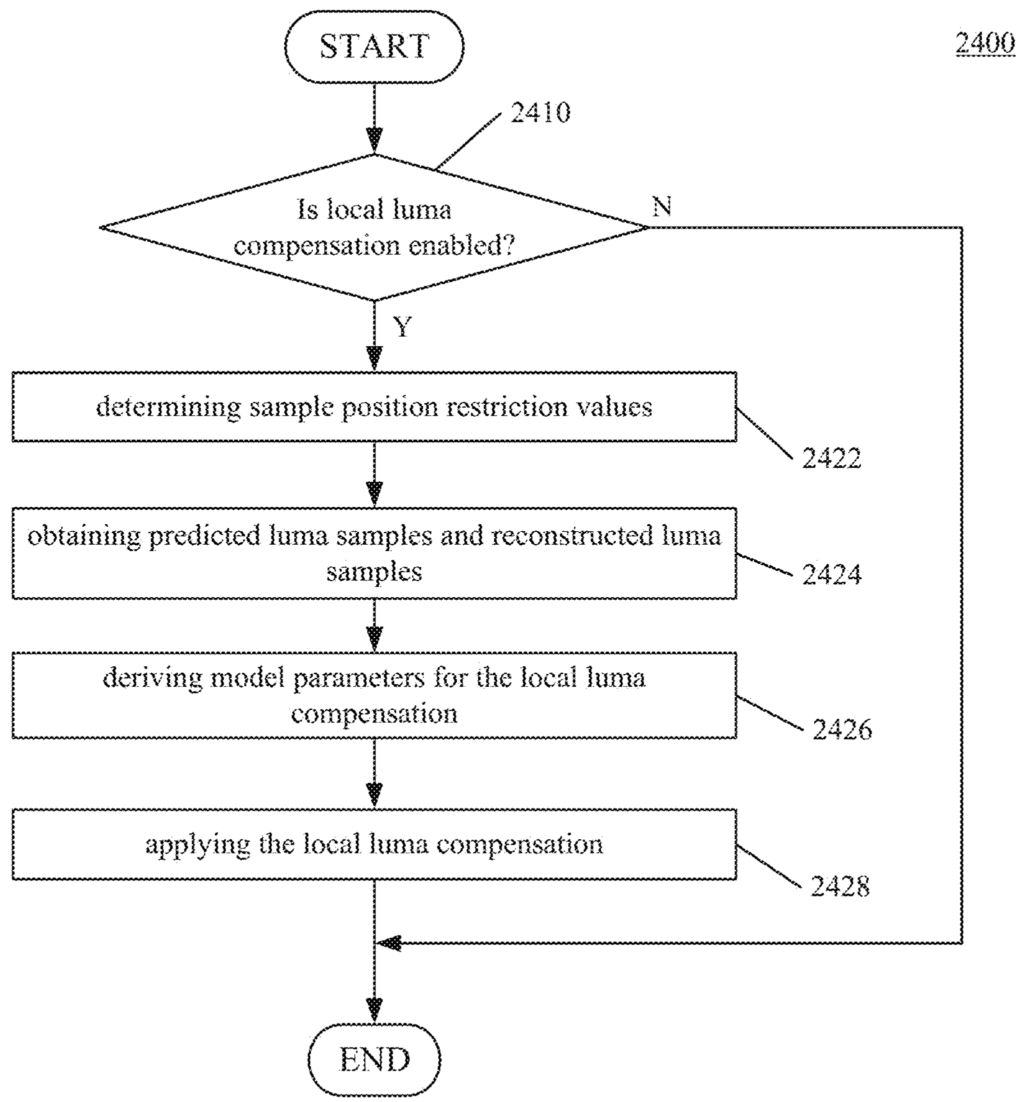
FIG. 24 illustrates a flowchart of an exemplary video processing method, consistent with some embodiments of the present disclosure.

FIG. 24 illustrates a flowchart of an exemplary video processing method 2400, consistent with some embodiments of the present disclosure. In some embodiments, the video processing method 2400 can be performed by an encoder (e.g., encoder 200 in FIG. 2) or a decoder (e.g., decoder 300 in FIG. 3) to perform inter prediction for a luma coding block in the inter prediction stage (e.g., inter prediction stage 2044 in FIGS. 2-3). For example, the encoder can be implemented as one or more software or hardware components of an apparatus (e.g., apparatus 400 in FIG. 4) for encoding or transcoding a video sequence (e.g., video sequence 202 in FIG. 2) to encode or decode the bitstream (e.g., video bitstream 228 in FIG. 2) for the video frame or the video sequence including one or more CUs. Similarly, the decoder can be implemented as one or more software or hardware components of an apparatus (e.g., apparatus 400 in FIG. 4) for decoding the bitstream (e.g., video bitstream 228 in FIG. 3) to reconstruct a video frame or a video sequence (e.g., video stream 304 in FIG. 3) of the bitstream. For example, a processor (e.g., processor 402 in FIG. 4) can perform the video processing method 2400.

Referring to the video processing method 2400, at step 2410, the apparatus determines whether an inter predictor correction (e.g., a local luma compensation) is enabled for a coding block for an inter prediction process for encoding or decoding the bitstream. Particularly, consistent with some embodiments of the present disclosure, the interaction among the LIC/LCC technologies and other inter prediction refinement technologies in AVS3 standard is considered when applying LIC/LCC in the AVS3 standard. In some embodiments, at step 2410, the apparatus may disable the local luma compensation if any one of affine motion compensation, ETMVP, AWP, an inter prediction filter, a bi-directional gradient correction, bi-directional optical flow or a decoder-side motion vector refinement is enabled for the coding block.

For example, in some embodiments, the LIC/LCC is not applied together with InterPF to avoid the increase of the pipeline stage. Accordingly, for one coding block, at most one of InterPF and LIC/LCC is applied. When InterPF is enabled for a coding block, the encoder 200 may skip the signaling of LIC/LCC enabling flag, as the decoder 300 can infer that the LIC/LCC is disabled. Alternatively, if the LIC/LCC is enabled for a coding block, the encoder 200 may skip the signaling of InterPF enabling flag and InterPF index, as InterPF cannot be enabled for this coding block.

When the LIC/LCC is applied together with DMVR, BIO and BGC, for a coding block, the motion vector is first refined by DMVR. Then, BIO and BGC are applied on the predicted blocks of the current block to get the refined predicted block. Then, the refined predicted block is compensated with the LIC/LCC to obtain the final predicted block.

In some embodiments, as BGC uses temporal gradient to refine the predicted samples LIC/LCC is not applied together with BGC. In some embodiments, for the skip and direct mode, if BGC enabling flag is explicitly signaled, the signaling of the LIC/LCC flag is skipped and inferred to be equal to false when the signaled BGC enabling flag is true. Alternatively, when LIC/LCC enabling flag is signaled to be true, the encoder 200 may skip the BGC enabling flag and the decoder 300 may infer the BGC enabling flag to be equal to false. If the BGC enabling flag is not signalled but inherited from the skip and direct candidates, then the BGC flag is set to false when the LIC/LCC is enabled, regardless of the BGC flags of skip and direct candidates. In the above embodiments, when the LIC/LCC is applied together with DMVR, and BIO, for a coding block, the motion vector is first refined by DMVR. Then, BIO is applied on the predicted blocks of the current block to get the refined predicted block. Then, the refined predicted block is compensated with the LIC/LCC to obtain the final predicted block.

In some embodiments, to further reduce the computation complexity, the LIC/LCC is not applied together with BIO, and is only applied together with DMVR when DMVR refines the motion vector without directly refining the predicted value. Accordingly, the encoder 200 may skip the signaling of the LIC/LCC enabling flag if the BGC enabling flag or the InterPF enabling flag is signaled to be true. Alternatively, the encoder 200 may skip the signaling of the BGC enabling flag or the InterPF enabling flag when LIC/LCC is enabled, and the decoder 300 may infer the BGC enabling flag or the InterPF enabling flag to be false when the LIC/LCC enabling flag is signaled to be equal to true. Accordingly, when LIC/LCC is applied together with DMVR for a coding block, the motion vector is firstly refined by DMVR. Then, the LIC/LCC is applied on the predicted blocks of the current block to get the final predicted block.

In some embodiments, the LIC is not applied together with any of DMVR, BIO, BGC and InterPF. Similarly, the encoder 200 may skip the signaling of the LIC/LCC enabling flag if BGC enabling flag or InterPF enabling flag is signaled to be equal to true. Alternatively, the encoder 200 may skip the signaling of BGC enabling flag or InterPF enabling flag, and the decoder 300 may infer BGC enabling flag and InterPF enabling flag to be equal to false when the LIC enabling flag is signaled to be equal to true. In other words, BGC or DMVR may be disabled if the local luma compensation or local chroma compensation is enabled for the coding block.

In some embodiments, the encoder 200 or decoder 300 can only applies LIC/LCC on the coding block coded with normal skip and direct mode. While in some other embodiments, the encoder 200 or decoder 300 may apply LIC/LCC on the coding block coded with normal skip and direct mode, or on the coding block coded with other skip and direct modes, such as AWP mode, ETMVP mode and affine mode described above. For example, the LIC is performed as the last stage to generate the final predicted samples.

In some embodiments, the encoder 200 or decoder 300 applies the LIC/LCC to the coding blocks coded with normal skip and direct mode, AWP and ETMVP mode, but does not apply the LIC/LCC for the coding blocks coded with affine skip and direct mode, because the predicted samples of affine mode are already refined by a subblock MV based technology in the AVS3 standard.

In some embodiments, at step 2410, the apparatus may disable the inter predictor correction (e.g., local luma compensation or local chroma compensation) if the coding block is coded with an affine mode or an ETMVP mode to reduce the encoder complexity. That is, the encoder 200 or decoder 300 applies the LIC/LCC on the coding blocks coded with normal skip and direct mode, and AWP mode. For the blocks coded with affine skip and direct mode and ETMVP mode, the LIC/LCC is not applied. Thus, the encoder 200 is not required to determine whether to enable or disable the LIC on the blocks coded with affine skip and direct mode and ETMVP mode, and the encoder complexity is reduced.

In some embodiments, in addition to the skip and direct mode, the LIC/LCC may be further extended to inter mode, in which the motion vector difference and prediction residuals are signaled in the bitstream. The LIC/LCC can be applied on the predicted block for inter mode, and the compensated predicted samples generated by the LIC/LCC are used as the final predictors. Accordingly, the reconstructed samples are produced by adding the reconstructed residuals to the final predictors. In some embodiments, the reconstructed samples may be further processed by other in-loop filters, such as a de-blocking filter, a sample adaptive offset, or an adaptive loop filter.

In the skip mode, the encoder 200 skips the signaling of the prediction residuals, so the skip mode has less signaling overhead compared with the direct mode. As the LIC/LCC may increase some signaling cost, in some embodiments, LIC/LCC is only applied on the coding block coded with direct mode, but not applied on the coding blocks coded with the skip mode to reduce the signaling cost for the skip mode. In some embodiments, the direct mode may include the normal direct mode, the AWP direct mode, the ETMVP direct mode, and the affine direct mode. The skip mode may include the normal skip mode, the AWP skip mode, the ETMVP skip mode, and the affine skip mode.

In some embodiments, at step 2410, the apparatus may enable the inter predictor correction (e.g., the LIC/LCC) in response to a sequence header enabling flag and a picture header enabling flag associated with the coding block both being true for the coding block coded with a skip mode, and enable the LIC in response to a sequence header enabling flag associated with the coding block being true for the coding block coded with a direct mode.

Particularly, the LIC/LCC is enabled for skip modes if there is a significant difference of illuminance between the current picture and the reference picture. Thus, the encoder 200 may signal, in the picture header, a flag to indicate whether LIC/LCC can be applied on the coding block coded with skip mode for the current picture. If the encoder 200 signals, in the sequence header, the LIC/LCC enabling flag to be true, then the encoder 200 may further signal a picture header LIC/LCC enabling flag in the picture header. Otherwise, the picture header LIC/LCC enabling flag is not signaled in the picture header but inferred to be equal to false. Accordingly, if the picture header LIC/LCC enabling flag is true, the LIC/LCC can be applied on the coding block coded with the skip mode in the current picture. Otherwise, the LIC/LCC is not applied on the coding block coded with the skip mode in the current picture. In some embodiments, for the direct mode, the encoder 200 does not signal the flag in the picture header, and the LIC/LCC can be applied on the coding block coded with the direct mode if the LIC/LCC sequence header flag is signaled to be true.

When the inter predictor correction is enabled for the coding block (step 2410—yes), at steps 2422-2428, the apparatus performs the inter predictor correction. Particularly, at step 2422, the apparatus determines the sample position restriction values K1 and K2, wherein K1 is the horizontal position restriction value and K2 is the vertical horizontal position restriction value. In some embodiments, the value of K1 is equal to the value of K2. The sample position restriction values specify the range of the predicted samples and reconstructed samples used for local luma compensation model parameter derivation. So only predicted luma samples adjacent to a first portion (e.g., first K1 samples 2110*a* or 2110*b* in FIG. 21A or FIG. 21B) of a first boundary (e.g., top boundary) or predicted luma samples adjacent to a second portion (e.g., first K2 samples 2120*a* or 2120*b* in FIG. 21A or FIG. 21B) of a second boundary (e.g., left boundary) of a luma predicted block (e.g., predicted block 2100*a* or 2100*b* in FIG. 21A or FIG. 21B) corresponding to a coding block can be used in the model parameters derivation. And only reconstructed luma samples adjacent to the first portion (e.g., first K1 samples 2110*c* in FIG. 21C) of the first boundary or reconstructed luma samples adjacent to the second portion (e.g., first K2 samples 2120*c* in FIG. 21C) of the second boundary of the coding block (e.g., block 2100*c* in FIG. 21C) can be used in the model parameters derivation.

In some embodiments, the apparatus determines restriction values K1 and K2 according to an inter prediction mode or a type of motion vector predictor candidate to be applied in the inter prediction process and determines the size of the first portion and the second portion respectively according to the first restriction value and the second restriction value.

In some embodiments, the value of the horizontal position parameter K1 and the vertical position parameter K2 may be equal to 8 or 16. For example, if the coding mode of the coding block indicates the luma predicted block is derived on sub-block level, the apparatus may determine the value of the horizontal position parameter K1 and the vertical position parameter K2 is equal to 8. Otherwise, the apparatus may determine the value of the horizontal position parameter K1 and the vertical position parameter K2 is equal to 16.

At step 2424, the apparatus obtains predicted luma samples and the reconstructed luma sample. Particularly, as described above in FIG. 21A and FIG. 21B, the apparatus may select a portion of samples among the first m luma samples adjacent to and along a top boundary of the luma predicted block and among the first n luma samples adjacent to and along a left boundary of the luma predicted block as the predicted luma samples, in which m is less than a width of the luma predicted block, and n is less than a height of the luma predicted block. In FIG. 21A, the predicted luma samples are out of but adjacent to the luma predicted block. In FIG. 21B, the predicted luma samples may be within the luma predicted block.

Particularly, as shown in FIG. 21C, the apparatus may select a portion of samples among the first m luma samples adjacent to and along a top boundary of the coding block and among the first n luma samples adjacent to and along a left boundary of the coding block as the reconstructed luma samples, in which m is less than a width of the coding block and n is less than a height of the coding block of the luma component. The reconstructed luma samples 2110*c* and 2120*c* are out of but adjacent to the coding block 2100*c*.

In some embodiments, if the sample position restriction value K1 or K2 is larger than the width or height of the coding block, the restriction value K1 or K2 is clipped to the width or height of the coding block. Alternatively, the apparatus derives m to be equal to a smaller one of the restriction value K1 and the width of the coding block and derives n to be equal to a smaller one of the restriction value K2 and the height of the coding block. Accordingly, the apparatus determines a clipped value of the horizontal position parameter to the value of the horizontal position parameter if a width of the coding block is greater than a value of the horizontal position parameter. Otherwise, the apparatus determines the clipped value of the horizontal position parameter to the width of the coding block. Similarly, the apparatus determines a clipped value of the vertical position parameter to the value of the vertical position parameter if a height of the coding block is greater than a value of the vertical position parameter. Otherwise, the apparatus determines the clipped value of the vertical position parameter to the height of the coding block. Thus, the predicted luma samples and the reconstructed luma samples are obtained based on the clipped values of the horizontal position parameter and the vertical position parameter.

At step 2426, the apparatus derives model parameters for the inter predictor correction (e.g., local luma compensation) based on the obtained predicted luma samples and the reconstructed luma samples. At step 2428, the apparatus applies the inter predictor correction to derive a corrected luma predicted block based on the one or more model parameters and the luma predicted block for the inter prediction process.

Figure 25:
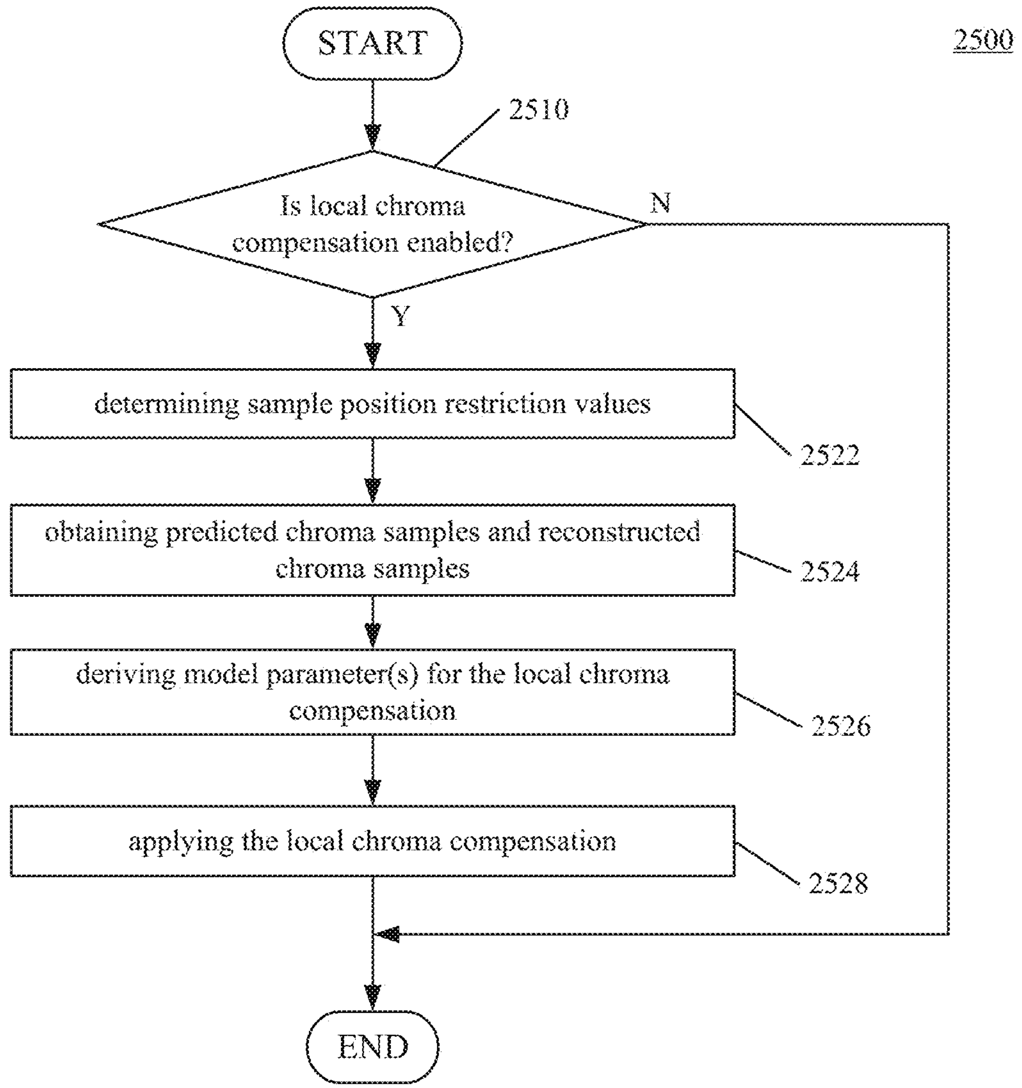
FIG. 25 illustrates a flowchart of another exemplary video processing method, consistent with some embodiments of the present disclosure.

FIG. 25 illustrates a flowchart of another exemplary video processing method 2500, consistent with some embodiments of the present disclosure. Similar to the video processing method 2400 shown in FIG. 24, the video processing method 2500 can be performed by an encoder (e.g., encoder 200 in FIG. 2) or a decoder (e.g., decoder 300 in FIG. 3) to perform inter prediction for a chroma coding block in the inter prediction stage (e.g., inter prediction stage 2044 in FIGS. 2-3). For example, a processor (e.g., processor 402 in FIG. 4) can perform the video processing method 2500. In some embodiments, the video processing method 2500

Referring to the video processing method 2500, at step 2510, the apparatus determines whether an inter predictor correction (e.g., the local chroma compensation (LCC)) is enabled for the coding block for the inter prediction process. When the inter predictor correction is enabled for the coding block (step 2510—yes), at steps 2522-2528, the apparatus performs the inter predictor correction. Similar to the luma compensation described in steps 2422-2428 in the video processing method 2400, in the chroma compensation described in steps 2522-2528, at step 2522, the apparatus determines the position restriction value K1 and K2, wherein K1 is the horizontal position restriction value and K2 is the vertical horizontal position restriction value. In some embodiments, the value of K1 is equal to the value of K2. The sample position restriction values specify the range of the predicted samples and reconstructed samples used in local chroma compensation. So only predicted chroma samples adjacent to a third portion (e.g., first K1 samples 2110*a* or 2110*b* in FIG. 21A or FIG. 21B) of a first boundary (e.g., top boundary) or predicted chroma samples adjacent to a fourth portion (e.g., first K2 samples 2120*a* or 2120*b* in FIG. 21A or FIG. 21B) of a second boundary (e.g., left boundary) of a chroma predicted block (e.g., predicted block 2100*a* or 2100*b* in FIG. 21A or FIG. 21B) corresponding to a coding block can be used in the model parameters derivation. And only reconstructed chroma samples adjacent to the third portion (e.g., first K1 samples 2110*c* in FIG. 21C) of the first boundary or reconstructed chroma samples adjacent to the fourth portion (e.g., first K2 samples 2120*c* in FIG. 21C) of the second boundary of the coding block (e.g., block 2100*c* in FIG. 21C) can be used in the model parameters derivation.

In some embodiments, the value of the horizontal position parameter K1 and the vertical position parameter K2 is equal to 4 or 8. For example, if the coding mode of the coding block indicates the chroma predicted block is derived on sub-block level, the apparatus may determine the value of the horizontal position parameter and the vertical position parameter is equal to 4. Otherwise, the apparatus may determine the value of the horizontal position parameter K1 and the vertical position parameter K2 is equal to 8.

In some embodiments, the size of the first and the second portions for luma compensation and the size of the third and the fourth portions for chroma component may be different. In other words, the horizontal position restriction value K1 of chroma component may be different from the horizontal position restriction value K1 of luma component, and the vertical position restriction value K2 of chroma component may be different from the vertical position restriction value K1 of luma component. For example, the restriction values K1 and K2 of chroma component may be half the restriction values K1 and K2 of luma component.

At step 2524, the apparatus obtains predicted chroma samples and the reconstructed chroma sample. Particularly, as described above in FIG. 21A and FIG. 21B, the apparatus may select a portion of samples among the first k chroma samples adjacent to and along a top boundary of the chroma predicted block and among the first p chroma samples adjacent to and along a left boundary of the chroma predicted block as the predicted chroma samples, in which k is less than a width of the chroma predicted block, and p is less than a height of the chroma predicted block. In FIG. 21A, the predicted chroma samples are out of but adjacent to the chroma predicted block. In FIG. 21B, the predicted chroma samples may be within the chroma predicted block.

Particularly, as shown in FIG. 21C, the apparatus may select a portion of samples among the first k chroma samples adjacent to and along a top boundary of the coding block and among the first p chroma samples adjacent to and along a left boundary of the coding block as the reconstructed chroma samples, in which k is less than a width of the coding block and p is less than a height of the coding block. The reconstructed chroma samples 2110*c* and 2120*c* are out of but adjacent to the coding block 2100*c*.

In some embodiments, if the sample position restriction value K1 or K2 is larger than the width or height of the coding block, the restriction value K1 or K2 is clipped to the width or height of the coding block. Alternatively, the apparatus derives k to be equal to a smaller one of the restriction value K1 and the width of the coding block and derives p to be equal to a smaller one of the restriction value K2 and the height of the coding block. Accordingly, the apparatus determines a clipped value of the horizontal position parameter to the value of the horizontal position parameter if a width of the coding block is greater than a value of the horizontal position parameter. Otherwise, the apparatus determines the clipped value of the horizontal position parameter to the width of the coding block. Similarly, the apparatus determines a clipped value of the vertical position parameter to the value of the vertical position parameter if a height of the coding block is greater than a value of the vertical position parameter. Otherwise, the apparatus determines the clipped value of the vertical position parameter to the height of the coding block. Thus, the predicted chroma samples and the reconstructed chroma samples are obtained based on the clipped values of the horizontal position parameter and the vertical position parameter.

Particularly, in some embodiments, to reduce the memory and latency in chroma compensation, the sample position restriction as shown in FIGS. 21A-21C or subblock based parameters derivation methods as shown in FIGS. 22A-22C and FIGS. 23A-23C can be applied on Cb and Cr component to derive the model parameters for Cb and Cr component. In one example, the restriction on the position of samples used to derive the parameters is dependent on the color format of the video sequences. For example, in a YUV 4:4:4 format where three components (i.e., luma component Y, and two chrominance components U and V) have the same sampling ratio, the position restriction value K1 and K2 are the same for the three components.

On the other hand, in a YUV 4:2:2 format where the sampling ratio of the two chrominance components U and V is half of the sampling ratio of the luma component Y in horizontal dimension, the horizontal position restriction value K1 of chroma component is also half of the horizontal position restriction value K1 of luma component. For example, if the predicted luma samples and the reconstructed luma samples among the 16 samples on the top boundary and 16 samples on the left boundary are used to derive parameters for luma coding block, then the predicted chroma samples and the reconstructed chroma samples among the 8 samples on the top boundary and 16 samples on the left boundary are used to derive parameters for chroma coding block.

Similarly, in a YUV 4:2:0 format where the sampling ratio of the two chrominance components U and V is half of the sampling ratio of the luma component Y in two dimensions, the position restriction values K1 and K2 of chroma component are both half of the position restriction values K1 and K2 of luma component. For example, if the predicted luma samples and the reconstructed luma samples among the 16 samples on the top boundary and 16 samples on the left boundary are used to derive parameters for luma coding block, then the predicted chroma samples and the reconstructed chroma samples among the 8 samples on the top boundary and 8 samples on the left boundary are used to derive parameters for chroma coding block.

Similarly, when applying the subblock level model parameters derivation, the subblock size of the chroma component may also be dependent on the color format of the video sequences. In the YUV 4:4:4 format with three components Y, U and V having the same sampling ratio, the subblock size of chroma component is the same as the subblock size of luma component. In the YUV 4:2:2 format with the sampling ratio of chrominance components U and V being half of the sampling ratio of the luma component Y in horizontal dimension, the subblock size of chroma component is also half of the subblock size of luma component in horizontal dimension. For example, if the luma coding block is divided into 16×16 subblocks, the chroma coding block is divided into 8×16 subblocks. In the YUV 4:2:0 format the sampling ratio of chrominance components U and V being half of the sampling ratio of the luma component Y in two dimensions, the subblock size of chroma component is also half of the subblock size of the luma component in two dimensions. For example, if the luma coding block is divided into 16×16 subblocks, the chroma coding block is divided into 8×8 subblocks.

In some embodiment, the sample position restriction is dependent on the inter prediction mode and MVP candidate used for the inter prediction. For example, when encoder 200 or decoder 300 performs the inter prediction on subblock level for a coding block, the sample position restriction value is reduced to the size of the subblock. Also, when the LCC is enabled, the sample position restriction value for chroma coding block is also reduced to the chroma subblock size. For example, in the YUV 4:2:0 format, if encoder 200 or decoder 300 selects the subblock level TMVP candidate or the MVAP candidate for a coding unit, for the luma coding block of the coding unit, the horizontal and vertical position restriction values are both set to 8, while for the chroma coding block of the coding unit, the horizontal and vertical position restriction values are both set to 4. If encoder 200 or decoder 300 selects the block level TMVP candidate, SMVP candidate or HMVP candidate for a coding unit, for the luma coding block of the coding unit, the horizontal and vertical position restriction values are both set to 16, and for the chroma coding block of the coding unit, the horizontal and vertical position restriction values are both set to 8.

After obtaining predicted chroma samples and the reconstructed chroma samples, at step 2526, the apparatus derives model parameter(s) for the local chroma compensation based on the obtained predicted chroma samples and the reconstructed chroma samples, and derives a corrected chroma predicted block based on the predicted chroma samples, the reconstructed chroma samples, and the chroma predicted block at step 2528.

In some embodiments, given that the chroma component has less texture information than the luma component, the compensation model of chroma component can be further simplified by using a one parameter model. In the simplified one parameter model, the scaling factor parameter a of the linear model is removed, and the offset parameter b is kept. In other words, in the chroma compensation, the chroma predicted sample values may be directly set to the specific value b, which is independent from the predicted chroma sample values before compensation. Accordingly, in such embodiments, the chroma predicted sample values in the current block are changed to a value derived from the reconstructed chroma samples of the top and left neighboring blocks.

In addition, the apparatus may further determine whether to perform chroma compensation based on the derived linear model parameters a and b. For example, the value of the factor parameter a being zero may be set as a precondition for performing chroma compensation. At step 2446, the apparatus first derives the model parameters a and b. If the value of the factor parameter a is equal to zero, at step 2528, the apparatus applies the one parameter model based LCC to generate a compensated predicted block for the inter prediction process. Otherwise, the apparatus does not apply the local chroma compensation for the current chroma coding block.

In some other embodiments, the condition of whether to perform LCC can be based on the predicted chroma samples and the reconstructed chroma samples obtained at step 2524. And step 2526 can be replaced by a step to check the condition based on the predicted chroma samples and reconstructed chroma samples. If the condition is satisfied, LCC is applied on chroma predicted block in step 2528, otherwise step 2528 is skipped.

In one example, as shown in FIG. 19C and FIG. 19D, the encoder 200 or decoder 300 may first select four pairs of samples (e.g., the first pair of samples 1912, 1932, the second pair of samples 1914, 1934, the third pair of samples 1916, 1936, and the fourth pair of samples 1918, 1938, where predicted samples 1912-1918 are picked up from the left and/or top boundary within the predicted block 1910 and reconstructed samples 1932-1938 are picked up from the top and/or left neighboring block of the current block 1920).

Then, the encoder 200 or decoder 300 sorts four sample pairs according to the value of predicted samples 1912-1918. For the ease of explanation, it is assumed that four pairs of samples are sorted where the values of predicted samples 1912-1918 are in a non-decreasing order (i.e., the value of the predicted sample in each sample pair is greater than or equal to the value of the predicted sample in the previous sample pair). In other words, the encoder 200 or decoder 300 may sort the predicted chroma samples and obtain two smaller predicted chroma samples and two greater predicted chroma samples. As the predicted chroma samples and reconstructed chroma samples are paired. The encoder 200 or decoder 300 may also obtain two reconstructed chroma samples corresponding to the two smaller predicted chroma samples and other two reconstructed chroma samples corresponding to the two greater predicted chroma samples.

Then, the encoder 200 or decoder 300 computes the first two pairs to obtain (x_min, y_min), and computes the last two pairs to obtain (x_max, y_max), where x_min denotes the average value of predicted samples 1912 and 1914 (i.e., the two smaller predicted chroma samples), y_min denotes the average value of reconstructed samples 1932 and 1934 (i.e., the two predicted chroma samples corresponding to the two smaller predicted chroma samples), x_max denotes the average value of predicted samples 1916 and 1918 (i.e., the two greater predicted chroma samples), and y_max denotes the average value of reconstructed samples 1936 and 1938 (i.e., two reconstructed chroma samples corresponding to the two greater predicted chroma samples). In other words, the encoder 200 or decoder 300 may derive a first minimum value x_min as an average of the two smaller predicted chroma samples and a second minimum value y_min as an average of two reconstructed chroma samples respectively corresponding to the two smaller predicted chroma samples. In addition, the encoder 200 or decoder 300 may derive a first maximum value x_max as an average of the two greater predicted chroma samples and a second maximum value y_max as an average of two reconstructed chroma samples respectively corresponding to the two greater predicted chroma samples.

Then, the encoder 200 or decoder 300 computes the difference of y_max and y_min (denoted as y_diff) and the difference of x_max and x_min (denoted as x_diff). If the value of y_diff and/or the value of x_diff is zero or less than a threshold value, the encoder 200 or decoder 300 may set the predicted sample values of the current chroma coding block to (y_min+y_max)/2 in step 2528. Otherwise the predicted chroma samples of the current chroma coding block are not changed by local chroma compensation. In other words, LCC is skipped if value of y_diff and/or the value of x_diff do not satisfy the condition.

That is, the encoder 200 or decoder 300 may determine a first difference value x_diff based on the predicted chroma samples and a second difference value y_diff based on the reconstructed chroma samples, and derive the corrected chroma predicted block based on the first difference value x_diff and the second difference value y_diff. In some embodiments, the encoder 200 or decoder 300 may determine the first difference value x_diff as a difference between the first maximum value x_max and the first minimum value x_min, and determine the second difference value y_diff as a difference between the second maximum value y_max and the second minimum value y_min. If the first difference value x_diff or the second difference value y_diff is less than the threshold, the encoder 200 or decoder 300 may determine each corrected predicted chroma sample in the corrected chroma predicted block equal to an averaged value of the second minimum value y_min and the second maximum value y_max. Otherwise, the encoder 200 or decoder 300 may skip the chroma compensation process and derive the corrected chroma predicted block as the chroma predicted block (i.e., the predicted chroma samples of the current chroma coding block are not changed by local chroma compensation).

In other words, the apparatus may determine whether to skip the LCC based on a threshold value and the sample pairs. In response to a determination of performing the local chroma compensation based on the threshold value and the sample pairs, the apparatus may derive a single model parameter for the LCC based on the reconstructed chroma samples.

In some embodiments, the threshold value may be a fixed value (e.g., 0, 1, 2 or 4), or may be dependent on a bit depth of a sample value, such as the bit depth value of chroma samples (e.g., 1<<(10−bitdepth)). In some embodiments, the threshold value may be 1<<(Bitdepth−8), in which the parameter "Bitdepth" indicates the bit depth of the sample value and "<<" denotes the left bit shift operation. In some other embodiments, the threshold value may be signaled in the bitstream (e.g., in the sequence header or in the picture header) when the chroma compensation is enabled.

In some embodiments, the LCC may share the same enabling flag and mode index with the LIC for signaling but the present disclosure is not limited thereto. In some embodiments, the LCC can also have separated enabling flag and mode index. In the case of sharing signaling, if the encoder 200 signals the chroma compensation threshold of LCC in the bitstream, the encoder 200 may only signal the when the chroma compensation threshold when the LIC is enabled.

In view of above, as proposed in various embodiments of the present disclosure, by applying the simplified local luma compensation (LIC) process and local chroma compensation (LCC) process with restricted sample positions for deriving the model parameters, the inter prediction process is facilitated with less unrefined predicted samples to be stored, and with reduced latency for LIC/LCC operations. In addition, with the LCC, the chrominance difference between the current picture and the reference picture is also compensated accordingly to improve the accuracy of the inter prediction for encoding and decoding the video.

Various exemplary embodiments described herein are described in the general context of method steps or processes, which may be implemented in one aspect by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In some embodiments, a non-transitory computer-readable storage medium including instructions is also provided. In some embodiments, the medium can store all or portions of the video bitstream having an enabling flag and an index. The enabling flag is associated with video data and indicates whether a local luma compensation is enabled for a coding block for an inter prediction process. The index is associated with the local luma compensation and indicates a selected local luma compensation mode.

In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It should be noted that, the relational terms herein such as “first” and “second” are used only to differentiate an entity or operation from another entity or operation, and do not require or imply any actual relationship or sequence between these entities or operations. Moreover, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term “or” encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A video processing method, comprising:

determining whether an inter predictor correction is enabled for a coding block; and when the inter predictor correction is enabled for the coding block, performing the inter predictor correction by:

obtaining a plurality of predicted samples from a top boundary and a left boundary of a predicted block corresponding to the coding block;

obtaining a plurality of reconstructed samples from top neighboring reconstructed samples and left neighboring reconstructed samples of the coding block;

deriving one or more parameters for the inter predictor correction based on the plurality of the predicted samples and the plurality of the reconstructed samples; and deriving a corrected predicted block based on the one or more parameters and the predicted block.

2. The video processing method of clause 1, wherein obtaining the plurality of the predicted samples and the plurality of the reconstructed samples comprises:

determining a horizontal position parameter and a vertical position parameter based on a coding mode of the coding block;

determining a plurality of horizontal positions based on the horizontal position parameter or determining a plurality of vertical positions based on the vertical position parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or obtaining the plurality of the reconstructed samples from the left neighboring reconstructed samples based on the plurality of the vertical positions.

3. The video processing method of clause 2, wherein a value of the horizontal position parameter is equal to a value of the vertical position parameter.

4. The video processing method of clause 2 or clause 3, wherein a value of the horizontal position parameter and the vertical position parameter is equal to 8 or 16.

5. The video processing method of clause 4, further comprising:

if the coding mode of the coding block indicates the predicted block is derived on sub-block level, determining the value of the horizontal position parameter and the vertical position parameter is equal to 8; otherwise, determining the value of the horizontal position parameter and the vertical position parameter is equal to 16.

6. The video processing method of any of clauses 2-5, further comprising:

if a width of the coding block is greater than a value of the horizontal position parameter, determining a clipped value of the horizontal position parameter to the value of the horizontal position parameter; otherwise, determining the clipped value of the horizontal position parameter to the width of the coding block;

if a height of the coding block is greater than a value of the vertical position parameter, determining a clipped value of the vertical position parameter to the value of the vertical position parameter; otherwise, determining the clipped value of the vertical position parameter to the height of the coding block; and obtaining the plurality of the predicted samples and the plurality of the reconstructed samples based on the clipped value of the horizontal position parameter and the vertical position parameter.

7. A video processing method, comprising:

determining whether an inter predictor correction is enabled for a coding block; and when the inter predictor correction is enabled for the coding block, performing the inter predictor correction by:

obtaining a plurality of predicted samples from a top boundary and a left boundary of a predicted block corresponding to the coding block;

obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block.

8. The video processing method of clause 7, wherein deriving the corrected predicted block further comprises:

deriving one or more parameters for the inter predictor correction based on the plurality of the predicted samples and the plurality of the reconstructed samples; and deriving the corrected predicted block based on the one or more parameters and the predicted block.

9. The video processing method of clause 7 or clause 8, wherein obtaining the plurality of the predicted samples and the plurality of the reconstructed samples comprises:

determining a horizontal position parameter and a vertical position parameter based on a coding mode of the coding block;

determining a plurality of horizontal positions based on the horizontal position parameter or determining a plurality of vertical positions based on the vertical position parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or and obtaining the plurality of the reconstructed samples from the left neighboring reconstructed samples based on the plurality of the vertical positions.

10. The video processing method of clause 9, wherein a value of the horizontal position parameter is equal to a value of the vertical position parameter.

11. The video processing method of clause 9 or clause 10, wherein a value of the horizontal position parameter and the vertical position parameter is equal to 4 or 8.

12. The video processing method of clause 11, further comprising:

if the coding mode of the coding block indicates the predicted block is derived on sub-block level, determining the value of the horizontal position parameter and the vertical position parameter is equal to 4; otherwise determining the value of the horizontal position parameter and the vertical position parameter is equal to 8.

13. The video processing method of any of clauses 9-12, further comprising:

if a width of the coding block is greater than a value of the horizontal position parameter, determining a clipped value of the horizontal position parameter to the value of the horizontal position parameter; otherwise, determining the clipped value of the horizontal position parameter to the width of the coding block;

if a height of the coding block is greater than a value of the vertical position parameter, determining a clipped value of the vertical position parameter to the value of the vertical position parameter; otherwise, determining the clipped value of the vertical position parameter to the height of the coding block; and obtaining the plurality of the predicted samples and the plurality of the reconstructed samples based on the clipped value of the horizontal position parameter and the vertical position parameter.

14. The video processing method of any of clauses 7-13, further comprising:

determining a first difference value based on the plurality of the predicted samples and a second difference value based on the plurality of the reconstructed samples; and deriving the corrected predicted block based on the first difference value and the second difference value.

15. The video processing method of clause 14, further comprising:

if the first difference value or the second difference value is less than a threshold, determining each corrected predicted sample in the corrected predicted block equal to a first value; otherwise deriving the corrected predicted block as the predicted block.

16. The video processing method of clause 15, wherein the threshold is dependent on a bit depth of a sample value.

17. The video processing method of clause 16, wherein the threshold is 1<<(Bitdepth−8), wherein "Bitdepth" is the bit depth of the sample value and "<<" denotes the left bit shift operation.

18. The video processing method of any of clauses 7-17, further comprising:

sorting the plurality of the predicted samples and obtaining two smaller predicted samples and two greater predicted samples;

deriving a first minimum value as an average of the two smaller predicted samples and a second minimum value as an average of two reconstructed samples respectively corresponding to the two smaller predicted samples;

deriving a first maximum value as an average of the two greater predicted samples and a second maximum value as an average of two reconstructed samples respectively corresponding to the two greater predicted samples; and determining the first difference value as a difference between the first maximum value and the first minimum value, and determining the second difference value as a difference between the second maximum value and the second minimum value.

19. The video processing method of clause 18, wherein the first value is an averaged value of the second minimum value and the second maximum value.

20. An apparatus, comprising:
a memory configured to store instructions; and
one or more processors configured to execute the instructions to cause the apparatus to:
determine whether an inter predictor correction is enabled for a coding block; and
when the inter predictor correction is enabled for the coding block, perform the inter predictor correction by:
obtaining a plurality of predicted samples from a top boundary and a left boundary of a predicted block corresponding to the coding block;
obtaining a plurality of reconstructed samples from top neighboring reconstructed samples and left neighboring reconstructed samples of the coding block;
deriving one or more parameters for the inter predictor correction based on the plurality of the predicted samples and the plurality of the reconstructed samples; and
deriving a corrected predicted block based on the one or more parameters and the predicted block.

21. The apparatus of clause 20, wherein the one or more processors are configured to execute the instructions to cause the apparatus to obtain the plurality of the predicted samples and the plurality of the reconstructed samples by:
determining a horizontal position parameter and a vertical position parameter based on a coding mode of the coding block;
determining a plurality of horizontal positions based on the horizontal position parameter or determining a plurality of vertical positions based on the vertical position parameter;
obtaining the plurality of the predicted samples from the top boundary of the predicted block based on the plurality of the horizontal positions or obtaining the plurality of the predicted samples from the left boundary of the predicted block based on the plurality of the vertical positions; and
obtaining the plurality of the reconstructed samples from the top neighboring reconstructed samples based on the plurality of the vertical positions or obtaining the plurality of the reconstructed samples from the left neighboring reconstructed samples based on the plurality of the vertical positions.

22. The apparatus of clause 21, wherein a value of the horizontal position parameter is equal to a value of the vertical position parameter.

23. The apparatus of clause 21 or clause 22, wherein a value of the horizontal position parameter and the vertical position parameter is equal to 8 or 16.

24. The apparatus of clause 23, wherein the one or more processors are configured to execute the instructions to further cause the apparatus to:
if the coding mode of the coding block indicates the predicted block is derived on sub-block level, determine the value of the horizontal position parameter and the vertical position parameter is equal to 8; otherwise, determine the value of the horizontal position parameter and the vertical position parameter is equal to 16.

25. The apparatus of any of clauses 21-24, wherein the one or more processors are configured to execute the instructions to further cause the apparatus to:
if a width of the coding block is greater than a value of the horizontal position parameter, determine a clipped value of the horizontal position parameter to the value of the horizontal position parameter; otherwise, determine the clipped value of the horizontal position parameter to the width of the coding block;
if a height of the coding block is greater than a value of the vertical position parameter, determine a clipped value of the vertical position parameter to the value of the vertical position parameter; otherwise, determine the clipped value of the vertical position parameter to the height of the coding block; and
obtain the plurality of the predicted samples and the plurality of the reconstructed samples based on the clipped value of the horizontal position parameter and the vertical position parameter.

26. An apparatus, comprising:
a memory configured to store instructions; and
one or more processors configured to execute the instructions to cause the apparatus to:
determine whether an inter predictor correction is enabled for a coding block; and
when the inter predictor correction is enabled for the coding block, perform the inter predictor correction by:
obtaining a plurality of predicted samples from a top boundary and a left boundary of a predicted block corresponding to the coding block;
obtaining a plurality of reconstructed samples from top neighboring reconstructed samples and left neighboring reconstructed samples of the coding block; and
deriving a corrected predicted block based on the plurality of the predicted samples, the plurality of the reconstructed samples and the predicted block.

27. The apparatus of clause 26, wherein the one or more processors are configured to execute the instructions to further cause the apparatus to derive the corrected predicted block further by:
deriving one or more parameters for the inter predictor correction based on the plurality of the predicted samples and the plurality of the reconstructed samples; and
deriving the corrected predicted block based on the one or more parameters and the predicted block.

28. The apparatus of clause 26 or clause 27, wherein the one or more processors are configured to execute the instructions to further cause the apparatus to obtain the plurality of the predicted samples and the plurality of the reconstructed samples by:
determining a horizontal position parameter and a vertical position parameter based on a coding mode of the coding block;
determining a plurality of horizontal positions based on the horizontal position parameter or determining a plurality of vertical positions based on the vertical position parameter;
obtaining the plurality of the predicted samples from the top boundary of the predicted block based on the plurality of the horizontal positions or obtaining the plurality of the predicted samples from the left boundary of the predicted block based on the plurality of the vertical positions; and
obtaining the plurality of the reconstructed samples from the top neighboring reconstructed samples based on the plurality of the vertical positions or and obtaining the plurality of the reconstructed samples from the left neighboring reconstructed samples based on the plurality of the vertical positions.

29. The apparatus of clause 28, wherein a value of horizontal position parameter is equal to a value of the vertical position parameter.

30. The apparatus of clause 28 or clause 29, wherein a value of the horizontal position parameter and the vertical position parameter is equal to 4 or 8.
31. The apparatus of clause 30, wherein the one or more processors are configured to execute the instructions to further cause the apparatus to:
if the coding mode of the coding block indicates the predicted block is derived on sub-block level, determine the value of the horizontal position parameter and the vertical position parameter is equal to 4; otherwise, determine the value of the horizontal position parameter and the vertical position parameter is equal to 8.
32. The apparatus of any of clauses 28-31, wherein the one or more processors are configured to execute the instructions to further cause the apparatus to:
if a width of the coding block is greater than a value of the horizontal position parameter, determine a clipped value of the horizontal position parameter to the value of the horizontal position parameter; otherwise, determine the clipped value of the horizontal position parameter to the width of the coding block;
if a height of the coding block is greater than a value of the vertical position parameter, determine a clipped value of the vertical position parameter to the value of the vertical position parameter; otherwise, determine the clipped value of the vertical position parameter to the height of the coding block; and
obtain the plurality of the predicted samples and the plurality of the reconstructed samples based on the clipped value of the horizontal position parameter and the vertical position parameter.
33. The apparatus of any of clauses 26-32, wherein the one or more processors are configured to execute the instructions to further cause the apparatus to:
determine a first difference value based on the plurality of the predicted samples and a second difference value based on the plurality of the reconstructed samples; and
derive the corrected predicted block based on the first difference value and the second difference value.
34. The apparatus of clause 33, wherein the one or more processors are configured to execute the instructions to further cause the apparatus to:
if the first difference value or the second difference value is less than a threshold, determine each corrected predicted sample in the corrected predicted block equal to a first value; otherwise, derive the corrected predicted block as the predicted block.
35. The apparatus of clause 34, wherein the threshold is dependent on a bit depth of a sample value.
36. The apparatus of clause 35, wherein the threshold is 1<<(Bitdepth−8), wherein "Bitdepth" is the bit depth of the sample value and "<<" denotes the left bit shift operation.
37. The apparatus of any of clauses 26-36, wherein the one or more processors are configured to execute the instructions to further cause the apparatus to:
sort the plurality of the predicted samples and obtaining two smaller predicted samples and two greater predicted samples;
derive a first minimum value as an average of the two smaller predicted samples and a second minimum value as an average of two reconstructed samples respectively corresponding to the two smaller predicted samples;
derive a first maximum value as an average of the two greater predicted samples and a second maximum value as an average of two reconstructed samples respectively corresponding to the two greater predicted samples; and
determine the first difference value as a difference between the first maximum value and the first minimum value, and determine the second difference value as a difference between the second maximum value and the second minimum value.
38. The apparatus of clause 37, wherein the first value is an averaged value of the second minimum value and the second maximum value.
39. A non-transitory computer-readable storage medium storing a set of instructions that are executable by one or more processors of a device to cause the device to perform a video processing method, the video processing method comprising:
determining whether an inter predictor correction is enabled for a coding block; and
when the inter predictor correction is enabled for the coding block, performing the inter predictor correction by:
obtaining a plurality of predicted samples from a top boundary and a left boundary of a predicted block corresponding to the coding block;
obtaining a plurality of reconstructed samples from top neighboring reconstructed samples and left neighboring reconstructed samples of the coding block;
deriving one or more parameters for the inter predictor correction based on the plurality of the predicted samples and the plurality of the reconstructed samples; and
deriving a corrected predicted block based on the one or more parameters and the predicted block.
40. The non-transitory computer-readable storage medium of clause 39, wherein obtaining the plurality of the predicted samples and the plurality of the reconstructed samples comprises:
determining a horizontal position parameter and a vertical position parameter based on a coding mode of the coding block;
determining a plurality of horizontal positions based on the horizontal position parameter or determining a plurality of vertical positions based on the vertical position parameter;
obtaining the plurality of the predicted samples from the top boundary of the predicted block based on the plurality of the horizontal positions or obtaining the plurality of the predicted samples from the left boundary of the predicted block based on the plurality of the vertical positions; and
obtaining the plurality of the reconstructed samples from the top neighboring reconstructed samples based on the plurality of the vertical positions or obtaining the plurality of the reconstructed samples from the left neighboring reconstructed samples based on the plurality of the vertical positions.
41. The non-transitory computer-readable storage medium of clause 40, wherein a value of the horizontal position parameter is equal to a value of the vertical position parameter.
42. The non-transitory computer-readable storage medium of clause 40 or clause 41, wherein a value of the horizontal position parameter and the vertical position parameter is equal to 8 or 16.

43. The non-transitory computer-readable storage medium of clause 42, wherein the video processing method further comprises:

if the coding mode of the coding block indicates the predicted block is derived on sub-block level, determining the value of the horizontal position parameter and the vertical position parameter is equal to 8; otherwise, determining the value of the horizontal position parameter and the vertical position parameter is equal to 16.

44. The non-transitory computer-readable storage medium of any of clauses 40-43, wherein the video processing method further comprises:

if a width of the coding block is greater than a value of the horizontal position parameter, determining a clipped value of the horizontal position parameter to the value of the horizontal position parameter; otherwise, determining the clipped value of the horizontal position parameter to the width of the coding block;

if a height of the coding block is greater than a value of the vertical position parameter, determining a clipped value of the vertical position parameter to the value of the vertical position parameter; otherwise, determining the clipped value of the vertical position parameter to the height of the coding block; and obtaining the plurality of the predicted samples and the plurality of the reconstructed samples based on the clipped value of the horizontal position parameter and the vertical position parameter.

45. A non-transitory computer-readable storage medium storing a set of instructions that are executable by one or more processors of a device to cause the device to perform a video processing method, the video processing method comprising:

determining whether an inter predictor correction is enabled for a coding block; and when the inter predictor correction is enabled for the coding block, performing the inter predictor correction:

obtaining a plurality of predicted samples from a top boundary and a left boundary of a predicted block corresponding to the coding block;

obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block.

46. The non-transitory computer-readable storage medium of clause 45, wherein deriving the corrected predicted block further comprises:

deriving one or more parameters for the inter predictor correction based on the plurality of the predicted samples and the plurality of the reconstructed samples; and deriving the corrected predicted block based on the one or more parameters and the predicted block.

47. The non-transitory computer-readable storage medium of clause 45 or clause 46, wherein obtaining the plurality of the predicted samples and the plurality of the reconstructed samples comprises:

determining a horizontal position parameter and a vertical position parameter based on a coding mode of the coding block;

determining a plurality of horizontal positions based on the horizontal position parameter or determining a plurality of vertical positions based on the vertical position parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or and obtaining the plurality of the reconstructed samples from the left neighboring reconstructed samples based on the plurality of the vertical positions.

48. The non-transitory computer-readable storage medium of clause 47, wherein a value of the horizontal position parameter is equal to a value of the vertical position parameter.

49. The non-transitory computer-readable storage medium of clause 47 or clause 48, wherein a value of the horizontal position parameter and the vertical position parameter is equal to 4 or 8.

50. The non-transitory computer-readable storage medium of clause 49, wherein the video processing method further comprises:

if the coding mode of the coding block indicates the predicted block is derived on sub-block level, determining the value of the horizontal position parameter and the vertical position parameter is equal to 4; otherwise determining the value of the horizontal position parameter and the vertical position parameter is equal to 8.

51. The non-transitory computer-readable storage medium of any of clauses 47-50, the video processing method further comprising:

if a width of the coding block is greater than a value of the horizontal position parameter, determining a clipped value of the horizontal position parameter to the value of the horizontal position parameter; otherwise, determining the clipped value of the horizontal position parameter to the width of the coding block;

if a height of the coding block is greater than a value of the vertical position parameter, determining a clipped value of the vertical position parameter to the value of the vertical position parameter; otherwise, determining the clipped value of the vertical position parameter to the height of the coding block; and obtaining the plurality of the predicted samples and the plurality of the reconstructed samples based on the clipped value of the horizontal position parameter and the vertical position parameter.

52. The non-transitory computer-readable storage medium of any of clauses 45-51, the video processing method further comprising:

determining a first difference value based on the plurality of the predicted samples and a second difference value based on the plurality of the reconstructed samples; and deriving the corrected predicted block based on the first difference value and the second difference value.

53. The non-transitory computer-readable storage medium of clause 52, the video processing method further comprising:

if the first difference value or the second difference value is less than a threshold, determining each corrected predicted sample in the corrected predicted block equal to a first value; otherwise deriving the corrected predicted block as the predicted block.

54. The non-transitory computer-readable storage medium of clause 53, wherein the threshold is dependent on a bit depth of a sample value.

55. The non-transitory computer-readable storage medium of clause 54, wherein the threshold is 1<<(Bitdepth−8), wherein "Bitdepth" is the bit depth of the sample value and "<<" denotes the left bit shift operation.

56. The non-transitory computer-readable storage medium of any of clauses 45-55, the video processing method further comprising:

sorting the plurality of the predicted samples and obtaining two smaller predicted samples and two greater predicted samples;

deriving a first minimum value as an average of the two smaller predicted samples and a second minimum value as an average of two reconstructed samples respectively corresponding to the two smaller predicted samples;

deriving a first maximum value as an average of the two greater predicted samples and a second maximum value as an average of two reconstructed samples respectively corresponding to the two greater predicted samples; and determining the first difference value as a difference between the first maximum value and the first minimum value, and determining the second difference value as a difference between the second maximum value and the second minimum value.

57. The non-transitory computer-readable storage medium of clause 56, wherein the first value is an averaged value of the second minimum value and the second maximum value.

58. A non-transitory computer readable medium storing a bitstream, wherein the bitstream comprises:

an enabling flag associated with video data, the enabling flag indicating whether an inter predictor correction is enabled for a coding block for an inter prediction process; and an index associated with the inter predictor correction, the index indicating a selected mode for the inter predictor correction;

wherein the enabled inter predictor correction is performed by:

obtaining a plurality of predicted samples from a top boundary and a left boundary of a predicted block corresponding to the coding block;

obtaining a plurality of reconstructed samples from top neighboring reconstructed samples and left neighboring reconstructed samples of the coding block;

deriving one or more parameters for the inter predictor correction based on the plurality of the predicted samples and the plurality of the reconstructed samples; and deriving a corrected predicted block based on the one or more parameters and the predicted block.

59. The non-transitory computer-readable storage medium of clause 58, wherein obtaining the plurality of the predicted samples and the plurality of the reconstructed samples comprises:

determining a horizontal position parameter and a vertical position parameter based on a coding mode of the coding block;

determining a plurality of horizontal positions based on the horizontal position parameter or determining a plurality of vertical positions based on the vertical position parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or obtaining the plurality of the reconstructed samples from the left neighboring reconstructed samples based on the plurality of the vertical positions.

60. The non-transitory computer-readable storage medium of clause 59, wherein a value of the horizontal position parameter is equal to a value of the vertical position parameter.

61. The non-transitory computer-readable storage medium of clause 59 or clause 60, wherein a value of the horizontal position parameter and the vertical position parameter is equal to 8 or 16.

62. The non-transitory computer-readable storage medium of clause 61, wherein the video processing method further comprises:

if the coding mode of the coding block indicates the predicted block is derived on sub-block level, determining the value of the horizontal position parameter and the vertical position parameter is equal to 8; otherwise, determining the value of the horizontal position parameter and the vertical position parameter is equal to 16.

63. The non-transitory computer-readable storage medium of any of clauses 59-62, wherein the video processing method further comprises:

if a width of the coding block is greater than a value of the horizontal position parameter, determining a clipped value of the horizontal position parameter to the value of the horizontal position parameter; otherwise, determining the clipped value of the horizontal position parameter to the width of the coding block;

if a height of the coding block is greater than a value of the vertical position parameter, determining a clipped value of the vertical position parameter to the value of the vertical position parameter; otherwise, determining the clipped value of the vertical position parameter to the height of the coding block; and obtaining the plurality of the predicted samples and the plurality of the reconstructed samples based on the clipped value of the horizontal position parameter and the vertical position parameter.

64. A non-transitory computer readable medium storing a bitstream, wherein the bitstream comprises:

an enabling flag associated with video data, the enabling flag indicating whether an inter predictor correction is enabled for a coding block for an inter prediction process; and an index associated with the inter predictor correction, the index indicating a selected mode for the inter predictor correction;

wherein the enabled inter predictor correction is performed by:

obtaining a plurality of predicted samples from a top boundary and a left boundary of a predicted block corresponding to the coding block;

obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block.

65. The non-transitory computer-readable storage medium of clause 64, wherein deriving the corrected predicted block further comprises:

deriving one or more parameters for the inter predictor correction based on the plurality of the predicted samples and the plurality of the reconstructed samples; and deriving the corrected predicted block based on the one or more parameters and the predicted block.

66. The non-transitory computer-readable storage medium of clause 64 or clause 65, wherein obtaining the plurality of the predicted samples and the plurality of the reconstructed samples comprises:

determining a horizontal position parameter and a vertical position parameter based on a coding mode of the coding block;

determining a plurality of horizontal positions based on the horizontal position parameter or determining a plurality of vertical positions based on the vertical position parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or and obtaining the plurality of the reconstructed samples from the left neighboring reconstructed samples based on the plurality of the vertical positions.

67. The non-transitory computer-readable storage medium of clause 66, wherein a value of the horizontal position parameter is equal to a value of the vertical position parameter.

68. The non-transitory computer-readable storage medium of clause 66 or clause 67, wherein a value of the horizontal position parameter and the vertical position parameter is equal to 4 or 8.

69. The non-transitory computer-readable storage medium of clause 68, wherein the video processing method further comprises:

if the coding mode of the coding block indicates the predicted block is derived on sub-block level, determining the value of the horizontal position parameter and the vertical position parameter is equal to 4; otherwise determining the value of the horizontal position parameter and the vertical position parameter is equal to 8.

70. The non-transitory computer-readable storage medium of any of clauses 66-69, the video processing method further comprising:

if a width of the coding block is greater than a value of the horizontal position parameter, determining a clipped value of the horizontal position parameter to the value of the horizontal position parameter; otherwise, determining the clipped value of the horizontal position parameter to the width of the coding block;

if a height of the coding block is greater than a value of the vertical position parameter, determining a clipped value of the vertical position parameter to the value of the vertical position parameter; otherwise, determining the clipped value of the vertical position parameter to the height of the coding block; and obtaining the plurality of the predicted samples and the plurality of the reconstructed samples based on the clipped value of the horizontal position parameter and the vertical position parameter.

71. The non-transitory computer-readable storage medium of any of clauses 64-70, the video processing method further comprising:

determining a first difference value based on the plurality of the predicted samples and a second difference value based on the plurality of the reconstructed samples; and deriving the corrected predicted block based on the first difference value and the second difference value.

72. The non-transitory computer-readable storage medium of clause 71, the video processing method further comprising:

if the first difference value or the second difference value is less than a threshold, determining each corrected predicted sample in the corrected predicted block equal to a first value; otherwise deriving the corrected predicted block as the predicted block.

73. The non-transitory computer-readable storage medium of clause 72, wherein the threshold is dependent on a bit depth of a sample value.

74. The non-transitory computer-readable storage medium of clause 73, wherein the threshold is 1<<(Bitdepth−8), wherein "Bitdepth" is the bit depth of the sample value and "<<" denotes the left bit shift operation.

75. The non-transitory computer-readable storage medium of any of clauses 64-74, the video processing method further comprising:

sorting the plurality of the predicted samples and obtaining two smaller predicted samples and two greater predicted samples;

deriving a first minimum value as an average of the two smaller predicted samples and a second minimum value as an average of two reconstructed samples respectively corresponding to the two smaller predicted samples;

deriving a first maximum value as an average of the two greater predicted samples and a second maximum value as an average of two reconstructed samples respectively corresponding to the two greater predicted samples; and determining the first difference value as a difference between the first maximum value and the first minimum value, and determining the second difference value as a difference between the second maximum value and the second minimum value.

76. The non-transitory computer-readable storage medium of clause 75, wherein the first value is an averaged value of the second minimum value and the second maximum value.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:

determining whether an inter predictor correction is enabled for a coding block; and when the inter predictor correction is enabled for the coding block, performing the inter predictor correction by:

obtaining a plurality of predicted samples from a top boundary and a left boundary of a predicted block corresponding to the coding block, wherein the predicted samples are within the predicted block;

obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block;

wherein obtaining the plurality of the predicted samples and the plurality of the reconstructed samples comprises:

determining a horizontal position parameter and a vertical position parameter based on a coding mode of the coding block, wherein a value of the horizontal position parameter or a value of the vertical position parameter is equal to 4, 8 or 16;

determining a plurality of horizontal positions based on the horizontal position parameter or determining a plurality of vertical positions based on the vertical position Parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or and obtaining the plurality of the reconstructed samples from the left neighboring reconstructed samples based on the plurality of the vertical positions.

2. The video processing method of claim 1, wherein deriving the corrected predicted block further comprises:

deriving one or more parameters for the inter predictor correction based on the plurality of the predicted samples and the plurality of the reconstructed samples; and deriving the corrected predicted block based on the one or more parameters and the predicted block.

3. The video processing method of claim 1, wherein a value of horizontal position parameter is equal to a value of the vertical position parameter.

4. The video processing method of claim 1, further comprising:

if the coding mode of the coding block indicates the predicted block is derived on sub-block level, setting the value of the horizontal position parameter and the value of the vertical position parameter to be equal to 8; otherwise, setting the value of the horizontal position parameter and the value of the vertical position parameter to be equal to 16; or if the coding mode of the coding block indicates the predicted block is derived on sub-block level, setting the value of the horizontal position parameter and the value of the vertical position parameter to be equal to 4; otherwise setting the value of the horizontal position parameter and the value of the vertical position parameter to be equal to 8.

5. The video processing method of claim 1, further comprising:

if a width of the coding block is greater than a value of the horizontal position parameter, setting a clipped value of the horizontal position parameter to be equal to the value of the horizontal position parameter; otherwise, setting the clipped value of the horizontal position parameter to be equal to the width of the coding block;

if a height of the coding block is greater than a value of the vertical position parameter, setting a clipped value of the vertical position parameter to be equal to the value of the vertical position parameter; otherwise, setting the clipped value of the vertical position parameter to be equal to the height of the coding block; and obtaining the plurality of the predicted samples and the plurality of the reconstructed samples based on the clipped value of the horizontal position parameter or the clipped value of the vertical position parameter.

6. The video processing method of claim 1, further comprising:

determining a first difference value based on the plurality of the predicted samples and a second difference value based on the plurality of the reconstructed samples; and deriving the corrected predicted block based on the first difference value and the second difference value.

7. The video processing method of claim 6, further comprising:

if the first difference value or the second difference value is less than a threshold, setting each corrected predicted sample in the corrected predicted block to be equal to a first value; otherwise deriving the corrected predicted block as the predicted block.

8. The video processing method of claim 7, wherein the threshold is dependent on a bit depth of a sample value.

9. The video processing method of claim 8, wherein the threshold is 1<<(Bitdepth−8), wherein "Bitdepth" is the bit depth of the sample value and "<<" denotes a left bit shift operation.

10. The video processing method of claim 6, further comprising:

sorting the plurality of the predicted samples and obtaining two smaller predicted samples and two greater predicted samples;

deriving a first minimum value as an average of the two smaller predicted samples and a second minimum value as an average of two reconstructed samples respectively corresponding to the two smaller predicted samples;

deriving a first maximum value as an average of the two greater predicted samples and a second maximum value as an average of two reconstructed samples respectively corresponding to the two greater predicted samples; and determining the first difference value as a difference between the first maximum value and the first minimum value, and determining the second difference value as a difference between the second maximum value and the second minimum value.

11. The video processing method of claim 10, further comprising:

if the first difference value or the second difference value is less than a threshold, setting each corrected predicted sample in the corrected predicted block to be equal to an averaged value of the second minimum value and the second maximum value; otherwise deriving the corrected predicted block as the predicted block.

12. An apparatus, comprising:

a memory configured to store instructions; and one or more processors configured to execute the instructions to cause the apparatus to:

determine whether an inter predictor correction is enabled for a coding block; and when the inter predictor correction is enabled for the coding block, perform the inter predictor correction by:

obtaining a plurality of predicted samples from a top boundary and a left boundary of a predicted block corresponding to the coding block, wherein the predicted samples are within the predicted block;

obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block, wherein the one or more processors are configured to execute the instructions to further cause the apparatus to obtain the plurality of the predicted samples and the plurality of the reconstructed samples by:

determining a horizontal position parameter and a vertical position parameter based on a coding mode of the coding block, wherein a value of the horizontal position parameter or a value of the vertical position parameter is equal to 4, 8 or 16;

determining a plurality of horizontal positions based on the horizontal position parameter or determining a plurality of vertical positions based on the vertical position Parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or and obtaining the plurality of the reconstructed samples from the left neighboring reconstructed samples based on the plurality of the vertical positions.

13. The apparatus of claim 12, wherein the one or more processors are configured to execute the instructions to further cause the apparatus to:

if the coding mode of the coding block indicates the predicted block is derived on sub-block level, setting the value of the horizontal position parameter and the value of the vertical position parameter to be equal to 8; otherwise, setting the value of the horizontal position parameter and the value of the vertical position parameter to be equal to 16; or if the coding mode of the coding block indicates the predicted block is derived on sub-block level, setting the value of the horizontal position parameter and the value of the vertical position parameter to be equal to 4; otherwise setting the value of the horizontal position parameter and the value of the vertical position parameter to be equal to 8.

14. The apparatus of claim 12, wherein the one or more processors are configured to execute the instructions to further cause the apparatus to:

if a width of the coding block is greater than a value of the horizontal position parameter, set a clipped value of the horizontal position parameter to be equal to the value of the horizontal position parameter; otherwise, set the clipped value of the horizontal position parameter to be equal to the width of the coding block;

if a height of the coding block is greater than a value of the vertical position parameter, set a clipped value of the vertical position parameter to be equal to the value of the vertical position parameter; otherwise, set the clipped value of the vertical position parameter to be equal to the height of the coding block; and obtain the plurality of the predicted samples and the plurality of the reconstructed samples based on the clipped value of the horizontal position parameter or the clipped value of the vertical position parameter.

15. The apparatus of claim 12, wherein the one or more processors are configured to execute the instructions to further cause the apparatus to:

determine a first difference value based on the plurality of the predicted samples and a second difference value based on the plurality of the reconstructed samples; and derive the corrected predicted block based on the first difference value and the second difference value.

16. The apparatus of claim 15, wherein the one or more processors are configured to execute the instructions to further cause the apparatus to:

sort the plurality of the predicted samples and obtaining two smaller predicted samples and two greater predicted samples;

derive a first minimum value as an average of the two smaller predicted samples and a second minimum value as an average of two reconstructed samples respectively corresponding to the two smaller predicted samples;

derive a first maximum value as an average of the two greater predicted samples and a second maximum value as an average of two reconstructed samples respectively corresponding to the two greater predicted samples;

determine the first difference value as a difference between the first maximum value and the first minimum value, and determining the second difference value as a difference between the second maximum value and the second minimum value; and if the first difference value or the second difference value is less than a threshold, set each corrected predicted sample in the corrected predicted block to be equal to an averaged value of the second minimum value and the second maximum value; otherwise derive the corrected predicted block as the predicted block.

17. A non-transitory computer-readable storage medium storing a set of instructions that are executable by one or more processors of a device to cause the device to perform a video processing method, the video processing method comprising:

determining whether an inter predictor correction is enabled for a coding block; and when the inter predictor correction is enabled for the coding block, performing the inter predictor correction by:

obtaining a plurality of predicted samples from a top boundary and a left boundary of a predicted block corresponding to the coding block, wherein the predicted samples are within the predicted block;

obtaining a plurality of reconstructed samples from top neighboring reconstructed samples and left neighboring reconstructed samples of the coding block; and deriving a corrected predicted block based on the plurality of the predicted samples, the plurality of the reconstructed samples and the predicted block, wherein obtaining the plurality of the predicted samples and the plurality of the reconstructed samples comprises:

determining a horizontal position parameter and a vertical position parameter based on a coding mode of the coding block, wherein a value of the horizontal position parameter or a value of the vertical position parameter is equal to 4, 8 or 16;

determining a plurality of horizontal positions based on the horizontal position parameter or determining a plurality of vertical positions based on the vertical position parameter;

obtaining the plurality of the predicted samples from the top boundary of the predicted block based on the plurality of the horizontal positions or obtaining the plurality of the predicted samples from the left boundary of the predicted block based on the plurality of the vertical positions; and obtaining the plurality of the reconstructed samples from the top neighboring reconstructed samples based on the plurality of the vertical positions or and obtaining the plurality of the reconstructed samples from the left neighboring reconstructed samples based on the plurality of the vertical positions.

* * * * *